United States Patent
Koo et al.

(10) Patent No.: US 11,470,316 B2
(45) Date of Patent: Oct. 11, 2022

(54) METHOD AND DEVICE FOR PERFORMING TRANSFORMATION BY USING LAYERED-GIVENS TRANSFORM

(71) Applicant: LG ELECTRONICS INC., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/059,027

(22) PCT Filed: May 31, 2019

(86) PCT No.: PCT/KR2019/006607
§ 371 (c)(1),
(2) Date: Nov. 25, 2020

(87) PCT Pub. No.: WO2019/231291
PCT Pub. Date: Dec. 5, 2019

(65) Prior Publication Data
US 2021/0360247 A1  Nov. 18, 2021

Related U.S. Application Data

(60) Provisional application No. 62/692,893, filed on Jul. 2, 2018, provisional application No. 62/679,016, filed on May 31, 2018.

(51) Int. Cl.
*H04N 19/122* (2014.01)
*H04N 19/124* (2014.01)
(Continued)

(52) U.S. Cl.
CPC ......... *H04N 19/122* (2014.11); *H04N 19/124* (2014.11); *H04N 19/13* (2014.11); *H04N 19/176* (2014.11); *H04N 19/60* (2014.11)

(58) Field of Classification Search
CPC .... H04N 19/176; H04N 19/61; H04N 19/124; H04N 19/122; H04N 19/46;
(Continued)

(56) References Cited

U.S. PATENT DOCUMENTS

2019/0313102 A1* 10/2019 Cho ................. H04N 19/11

FOREIGN PATENT DOCUMENTS

KR          10-1362696 B2    2/2014
KR    10-2017-0051540 A     5/2017
(Continued)

OTHER PUBLICATIONS

Koo, et al. 2018.Description of SDR video coding technology proposal by LG Electronics, JVET-J0017-v1, Joint Video Experts Team (JVET) of ITU-T SG 16 WP 3 and ISO/IEC JTC 1/SC 29/WG 11, 10th Meeting.

*Primary Examiner* — Farhan Mahmud
(74) *Attorney, Agent, or Firm* — Dentons US LLP

(57) ABSTRACT

The present invention provides a method for reconstructing a video signal by using a layered-givens transform, comprising the steps of: generating a transform block by performing entropy decoding and inverse quantization on a current block; performing an inverse secondary transformation on a left top specific area of the transform block by using the layered-givens transform; performing an inverse primary transformation on the block on which the inverse secondary transformation has been performed; and reconstructing the current block by using the block on which the inverse primary transformation has been performed, wherein
(Continued)

the layered-givens transform includes a plurality of rotation layers and a permutation matrix.

13 Claims, 37 Drawing Sheets

(51) Int. Cl.
*H04N 19/13* (2014.01)
*H04N 19/176* (2014.01)
*H04N 19/60* (2014.01)

(58) Field of Classification Search
CPC ...... H04N 19/117; H04N 19/44; H04N 19/91; H04N 19/60; H04N 19/154
See application file for complete search history.

(56) References Cited

FOREIGN PATENT DOCUMENTS

WO 2017/142929 A1 8/2017
WO 2018/044125 A 3/2018

* cited by examiner

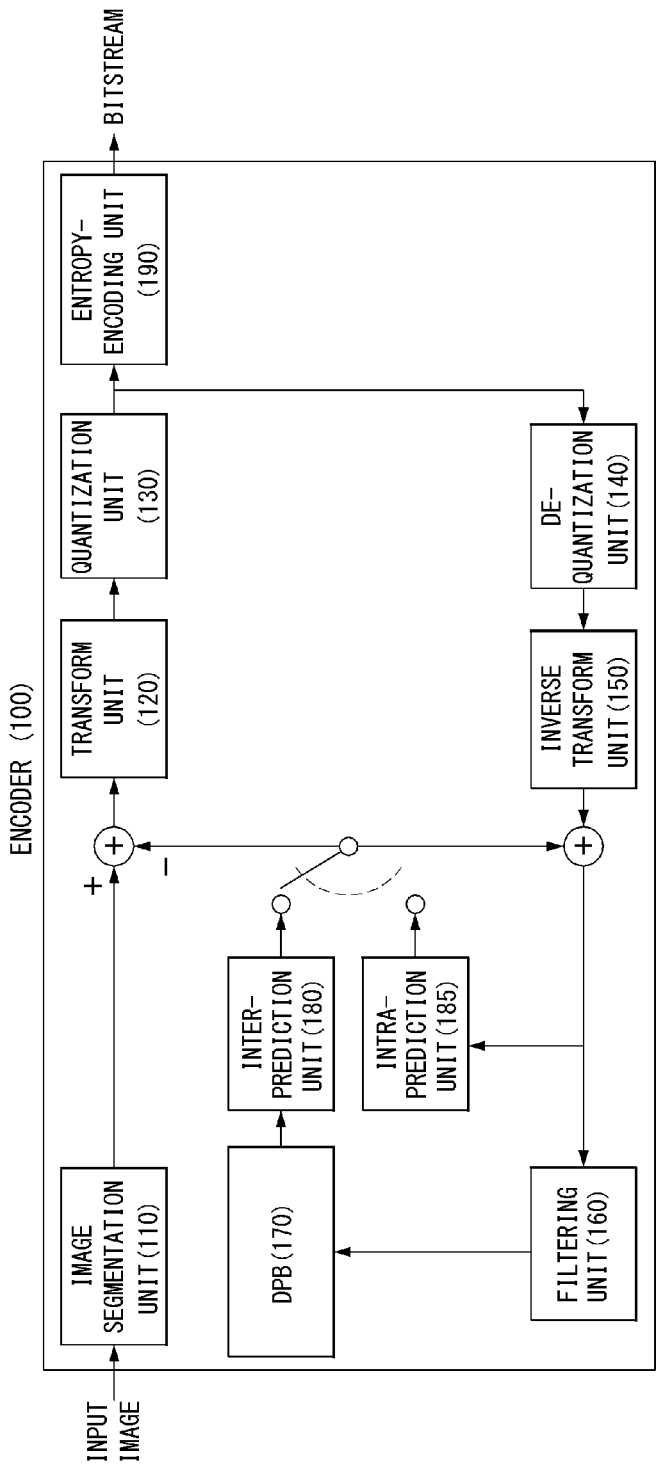
[FIG. 1]

[FIG. 2]
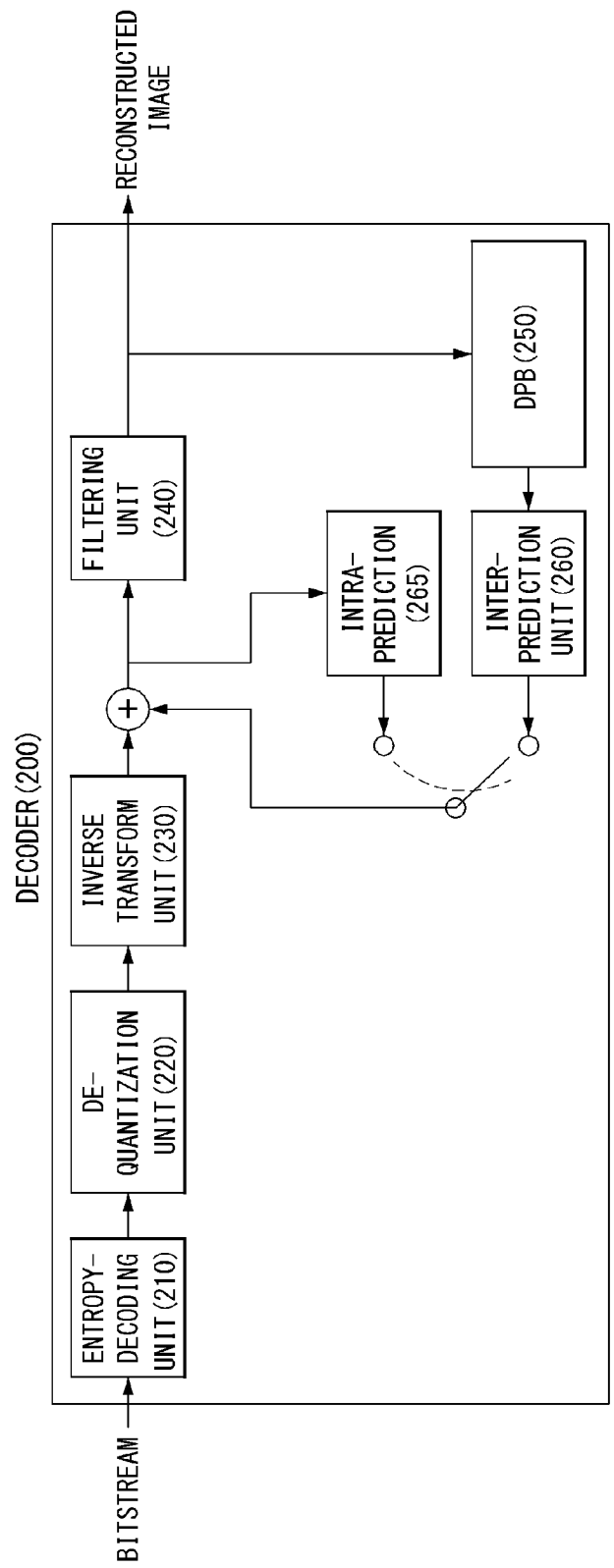

【FIG. 3A】
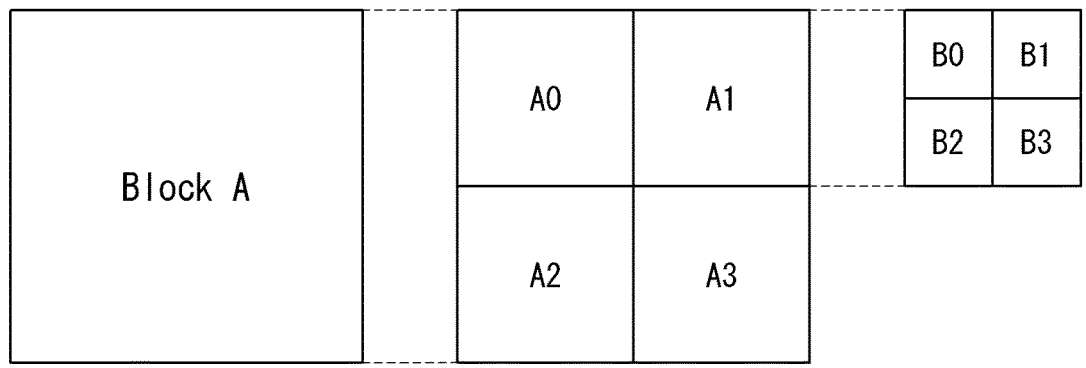
【FIG. 3B】
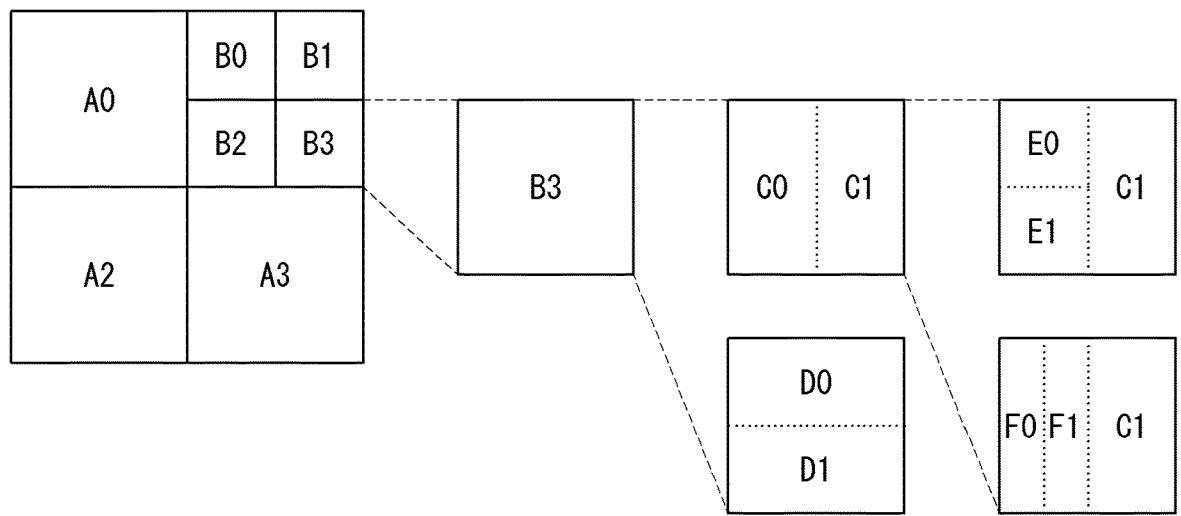

[FIG. 3C]
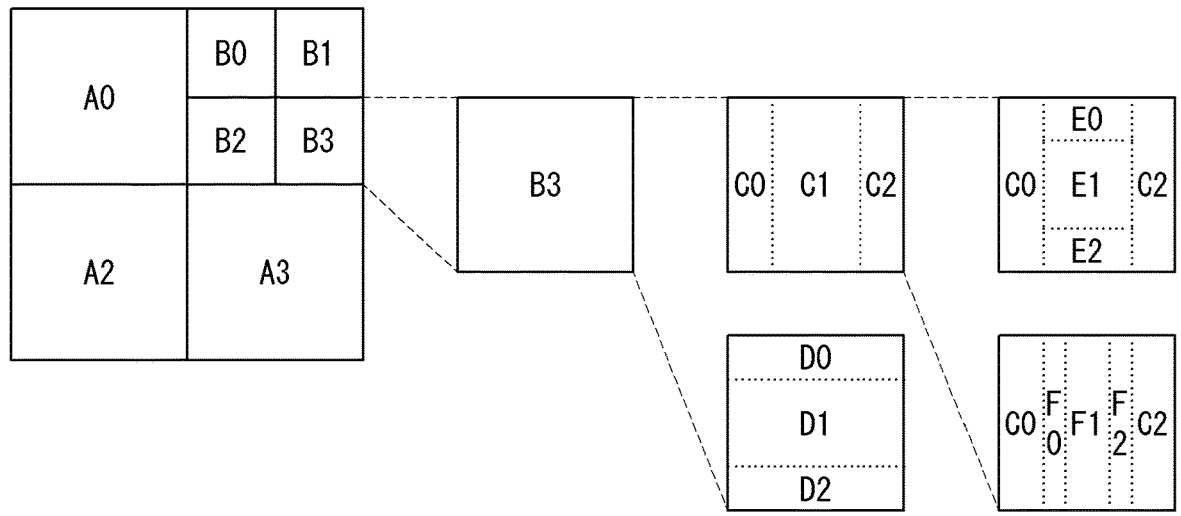
[FIG. 3D]
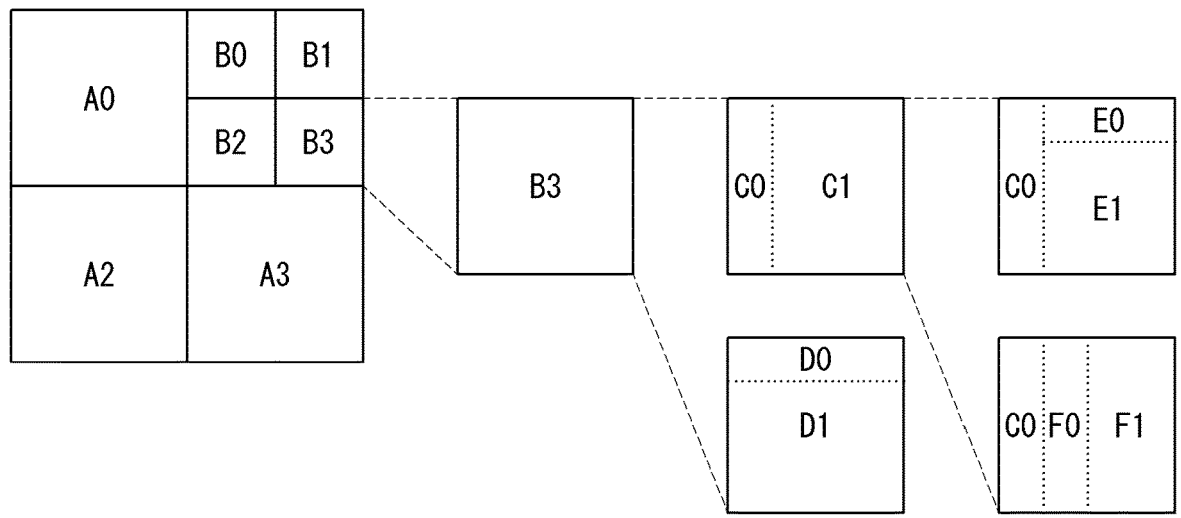

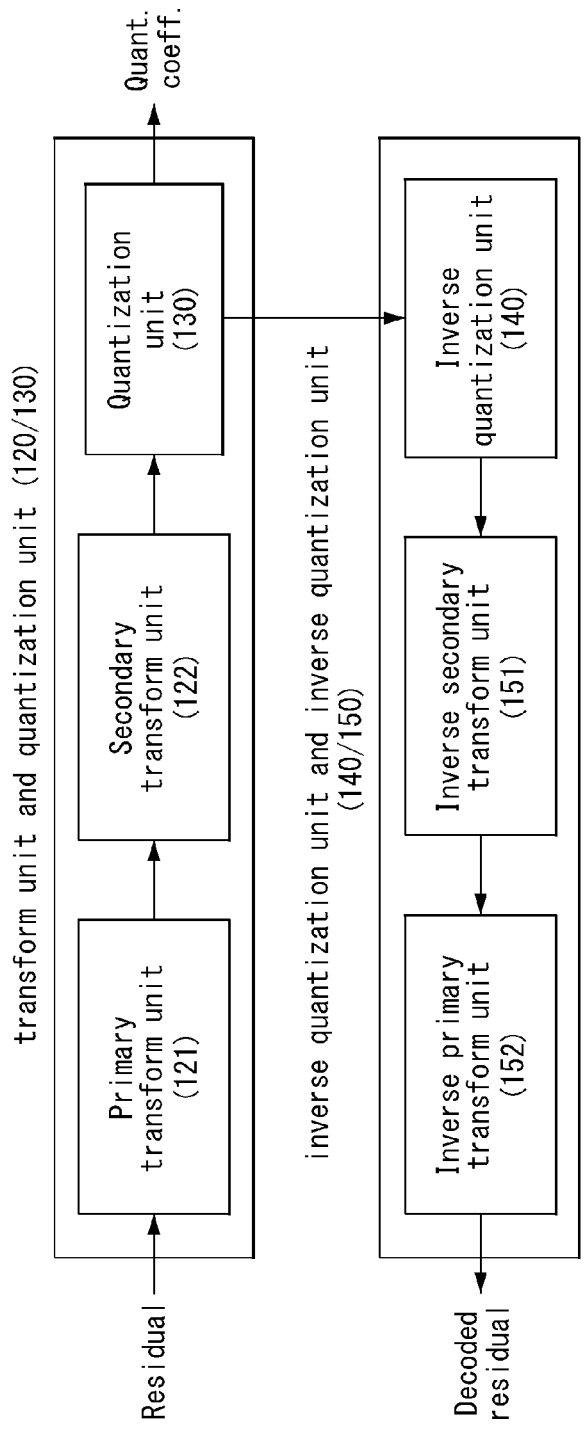
[FIG. 4]

[FIG. 5]
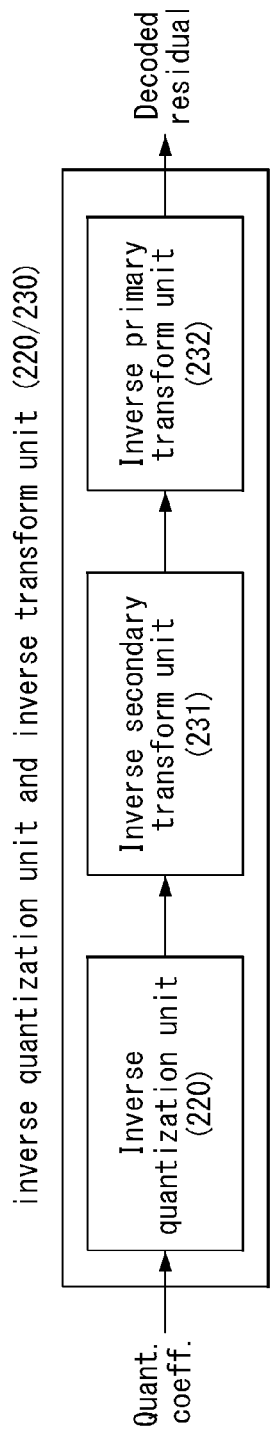

[FIG. 6]

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT5 | | |
| | 3 | DCT5 | DCT5 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT8 | | |
| | 3 | DCT8 | DCT8 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

[FIG. 7]
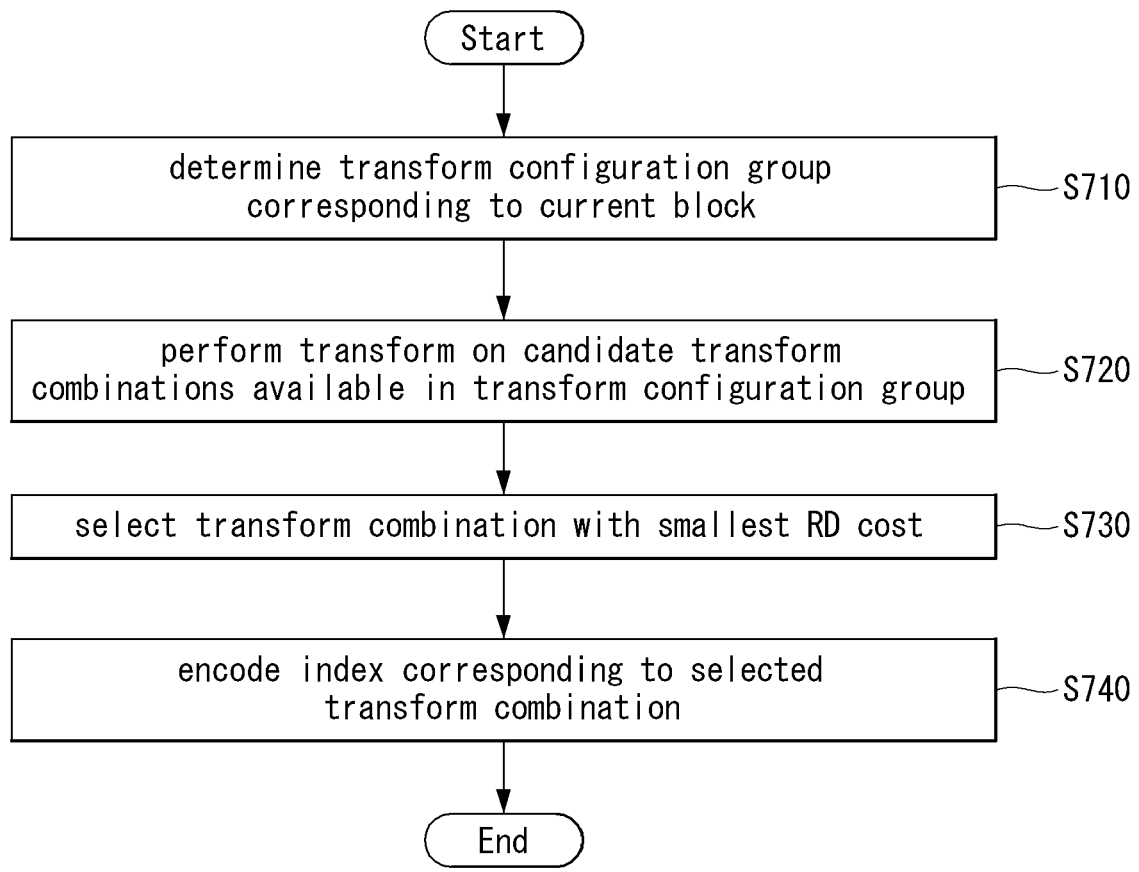

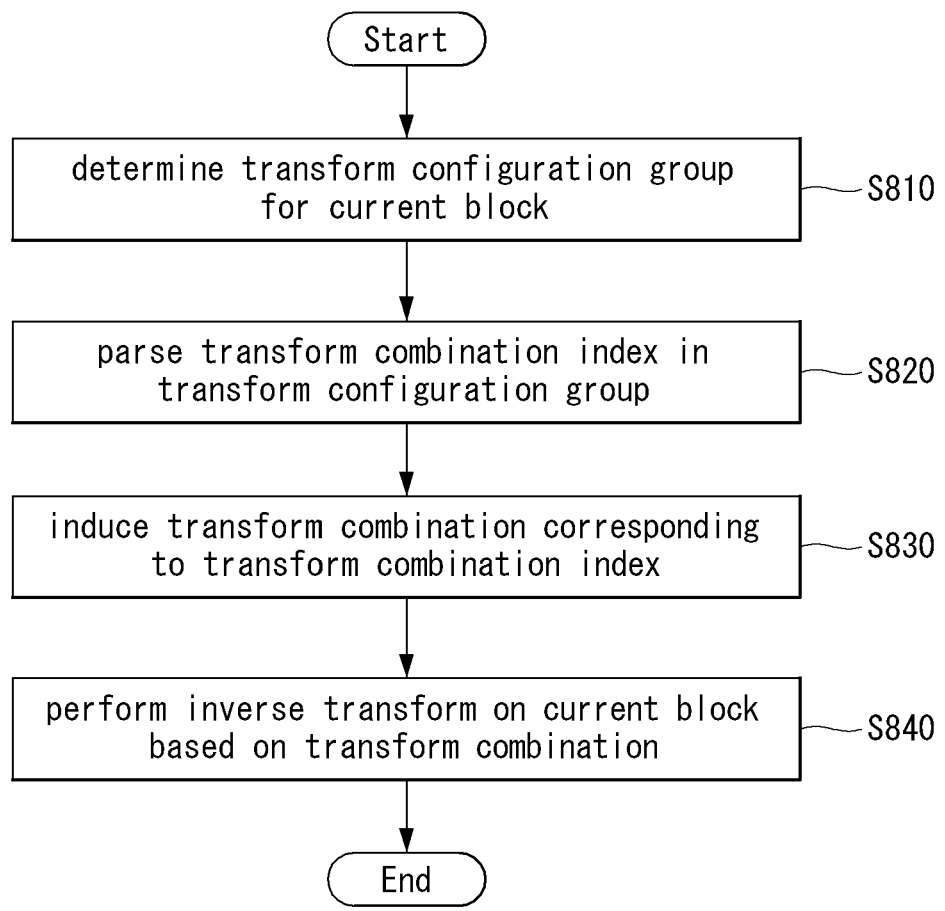
[FIG. 8]

[FIG. 9]
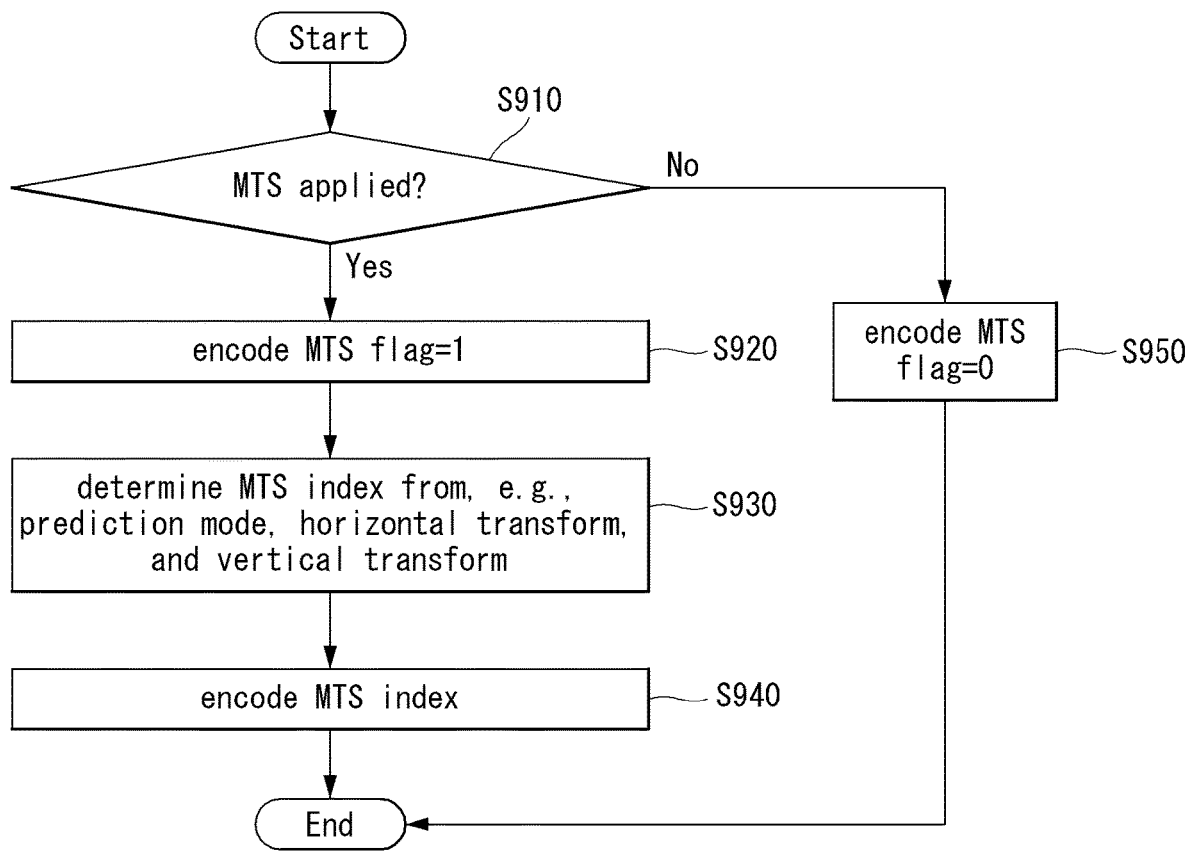

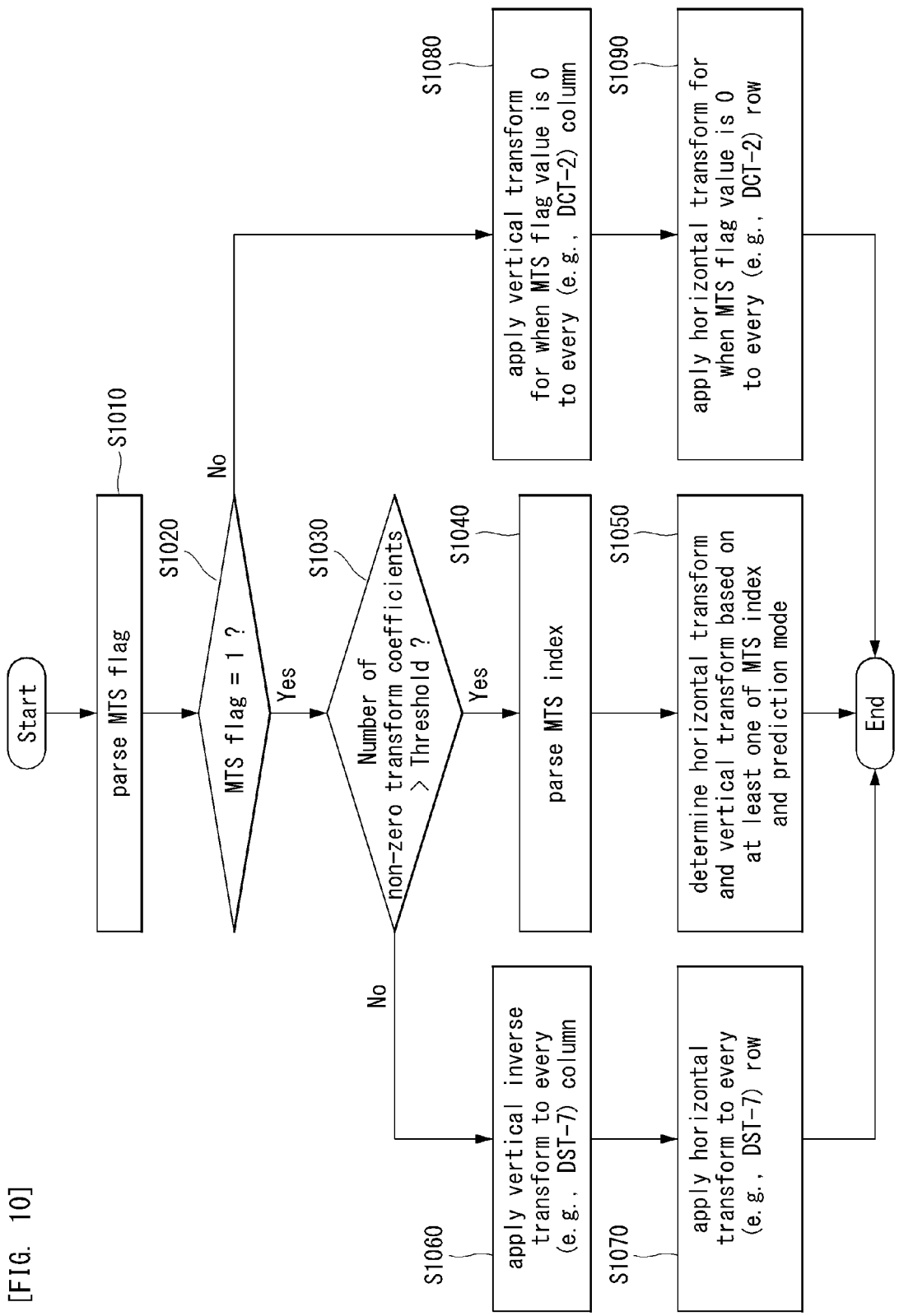
[FIG. 10]

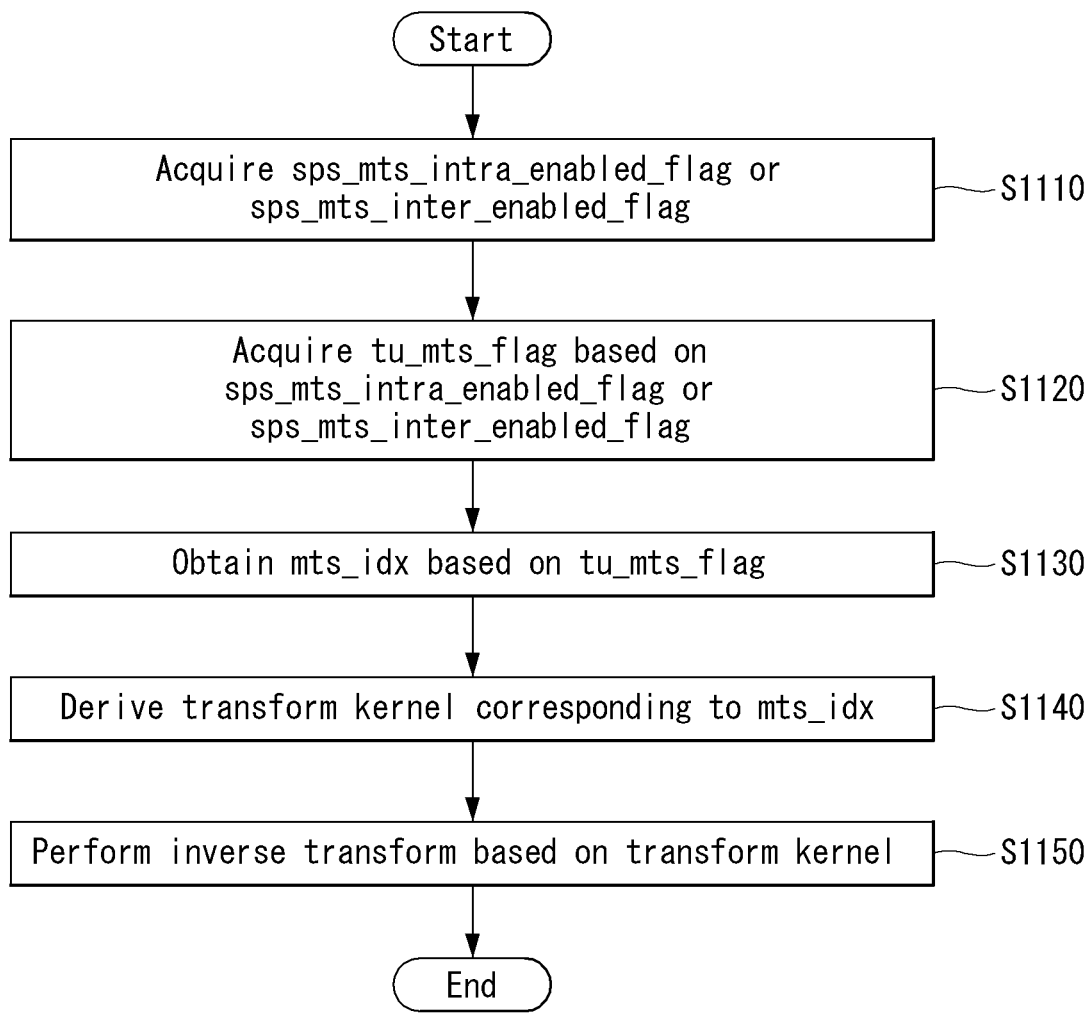
[FIG. 11]

[FIG. 12]
| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |
[FIG. 13]
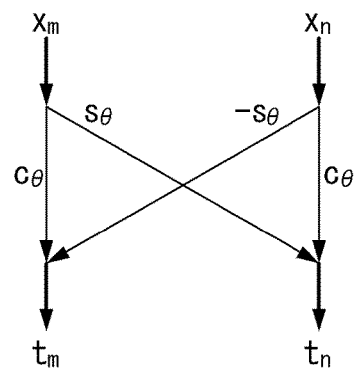

[FIG. 14]
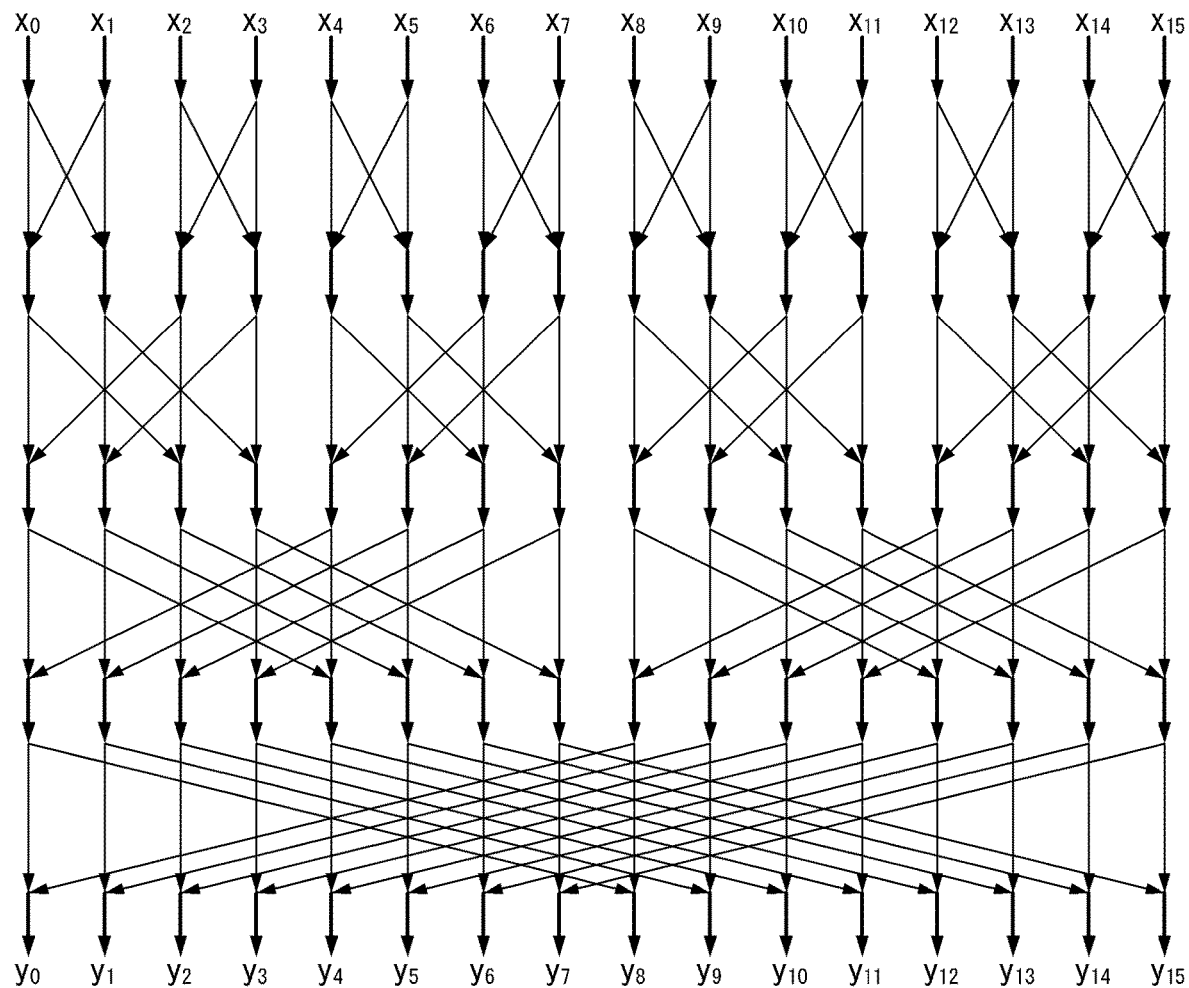

[FIG. 15]
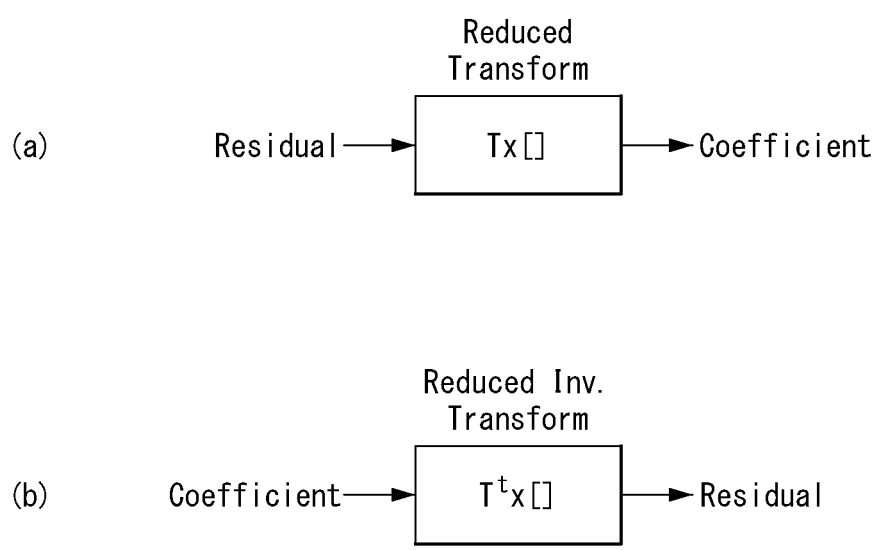

[FIG. 16]
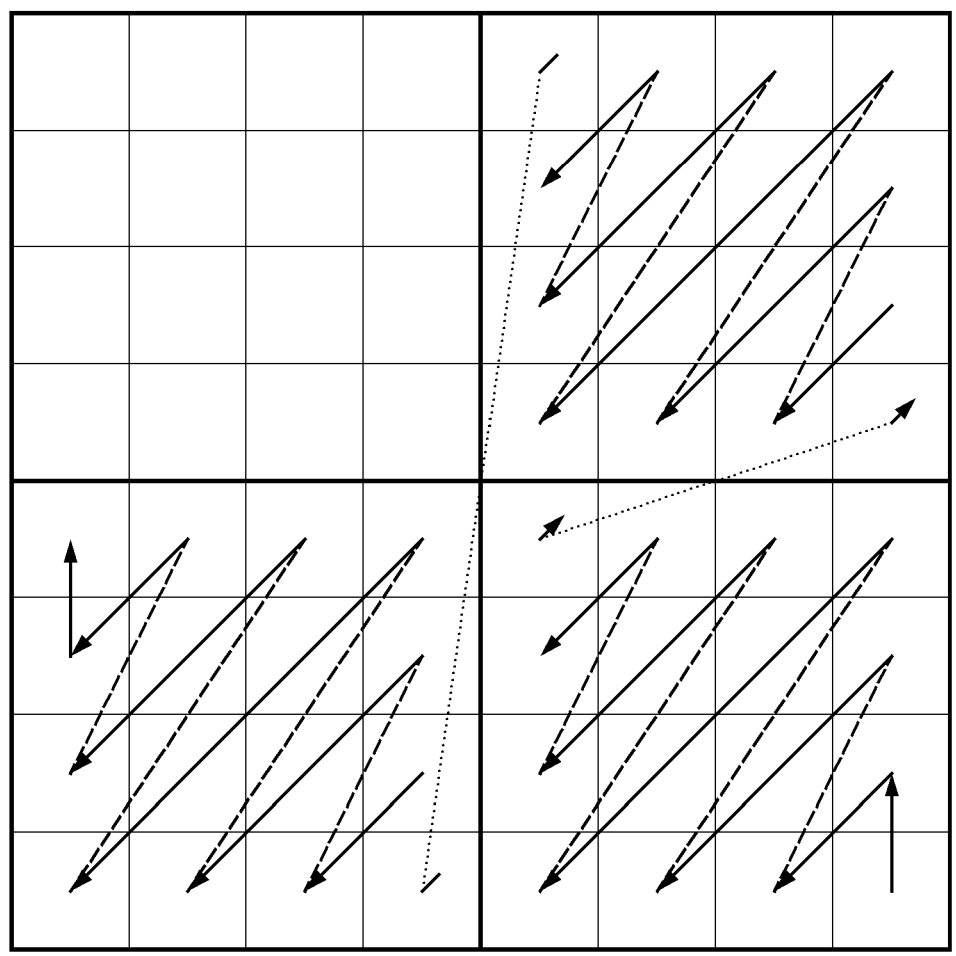

[FIG. 17]
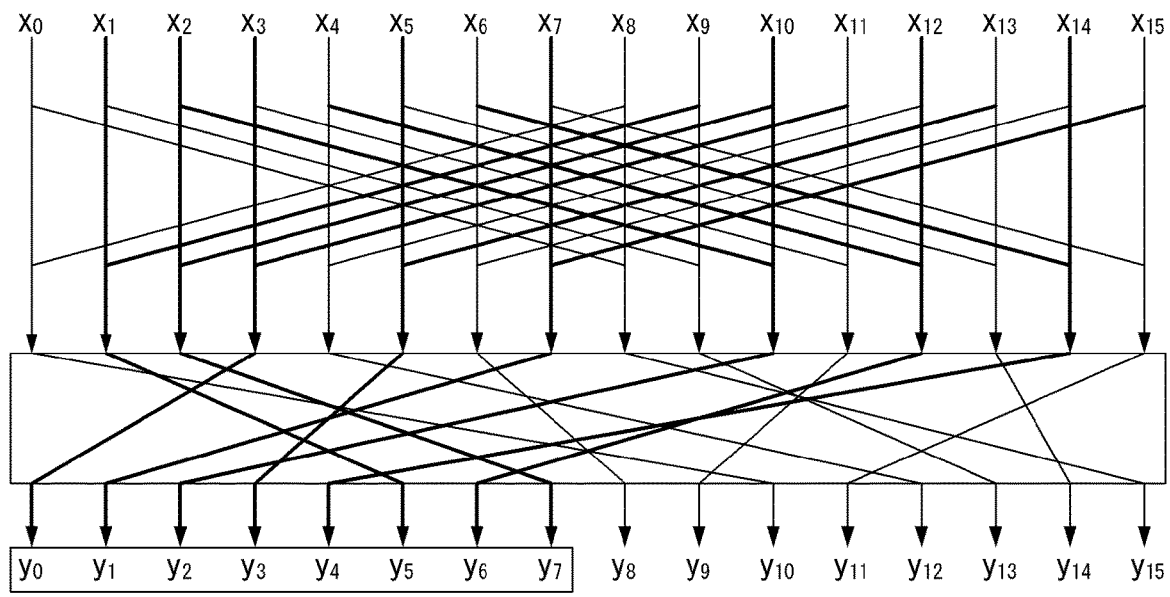
[FIG. 18]
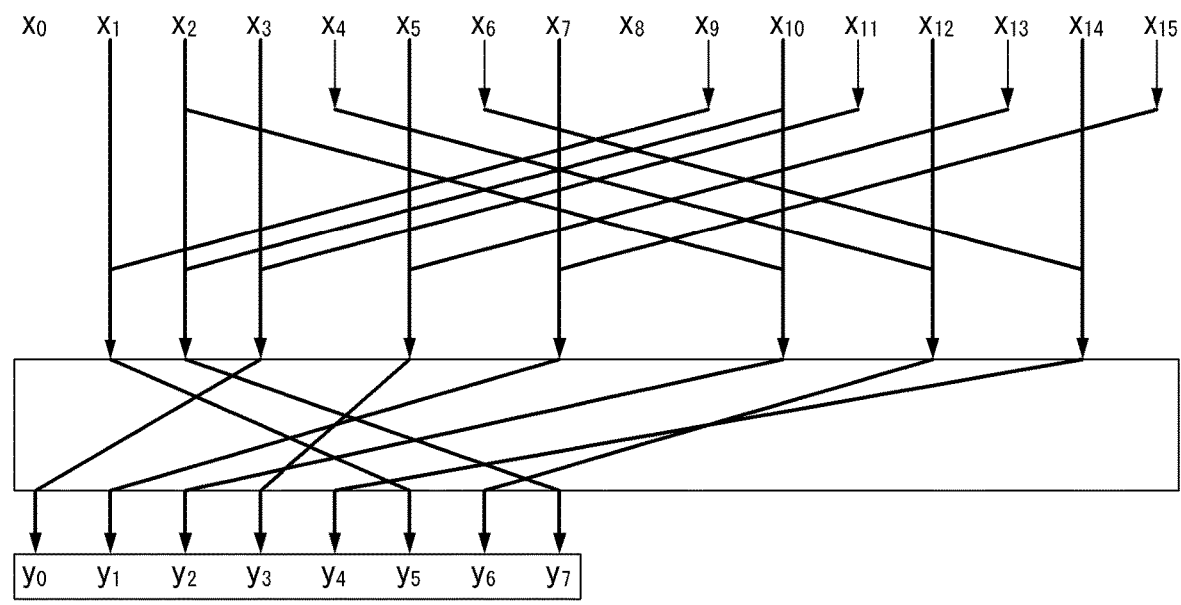

[FIG. 19]
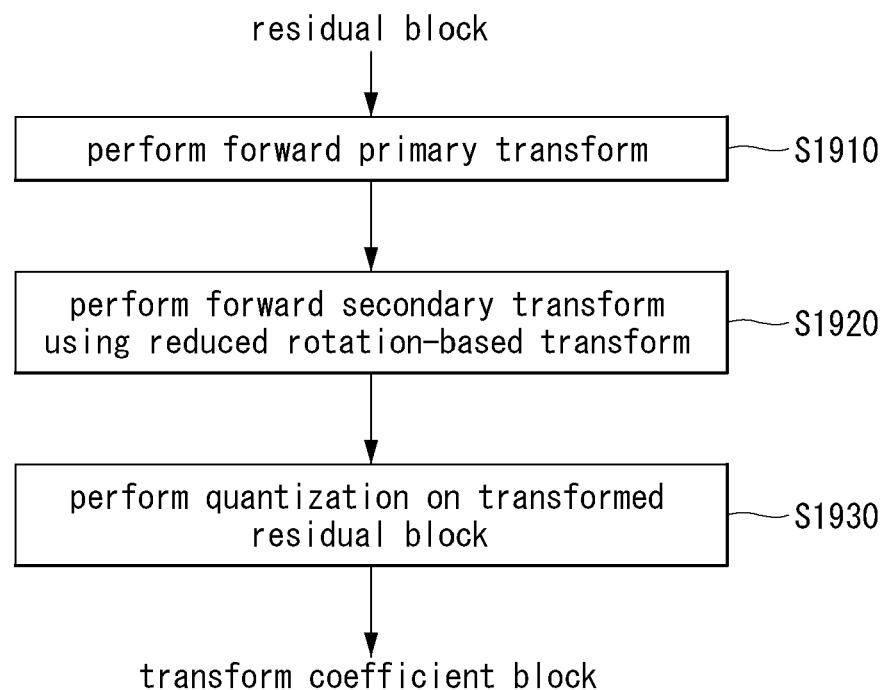

[FIG. 20]
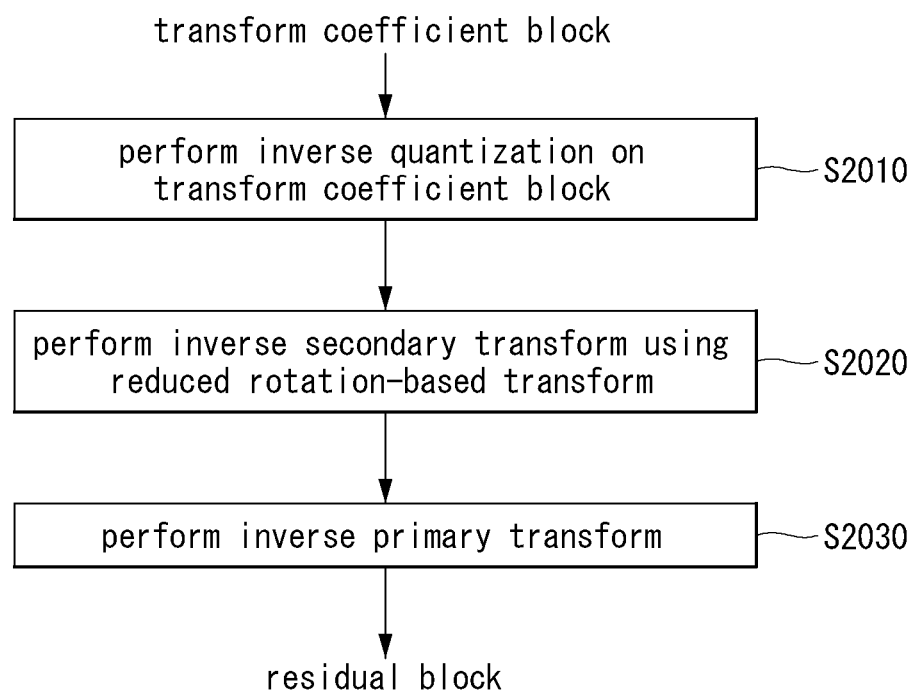

[FIG. 21]
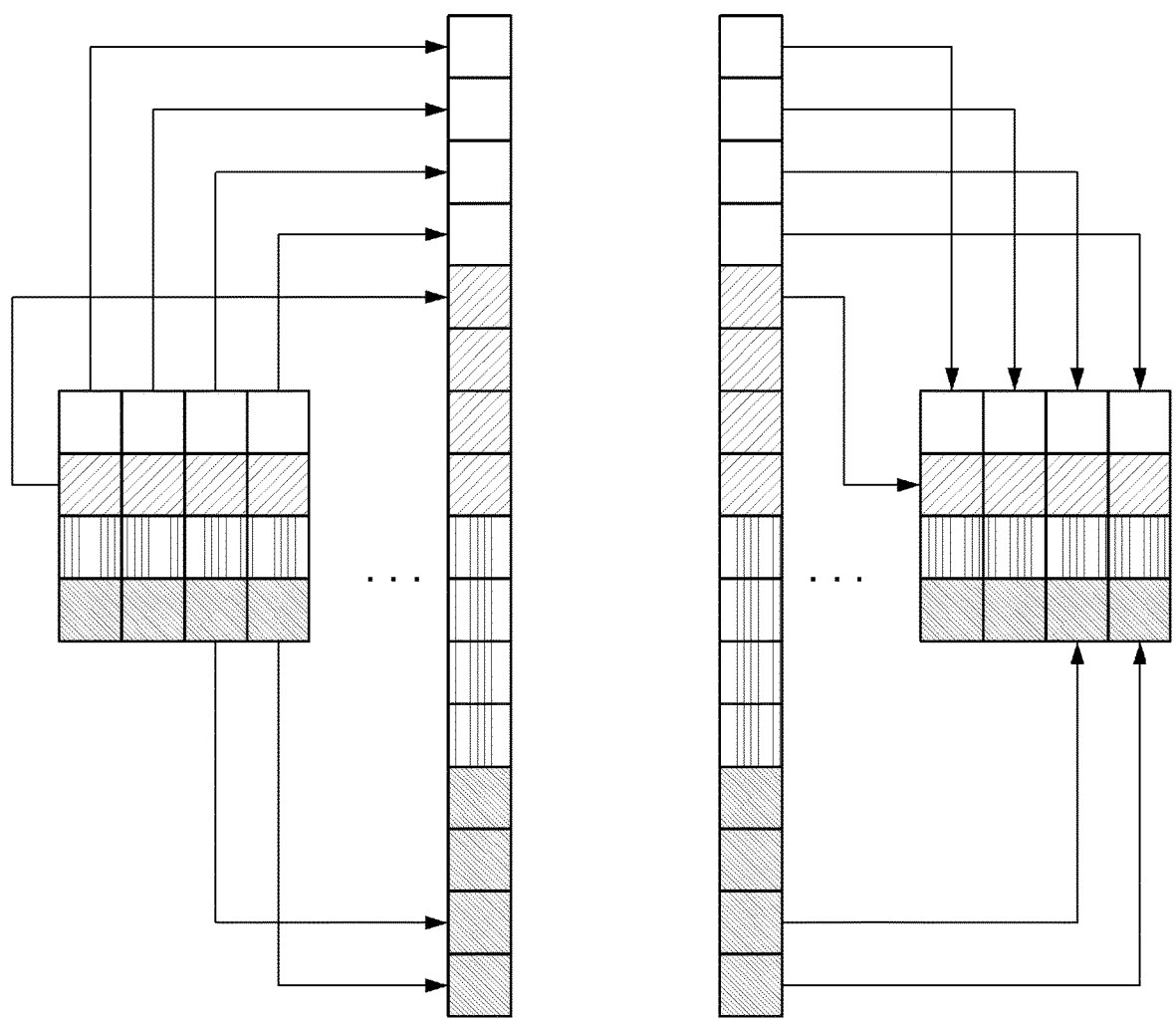

【FIG. 22】
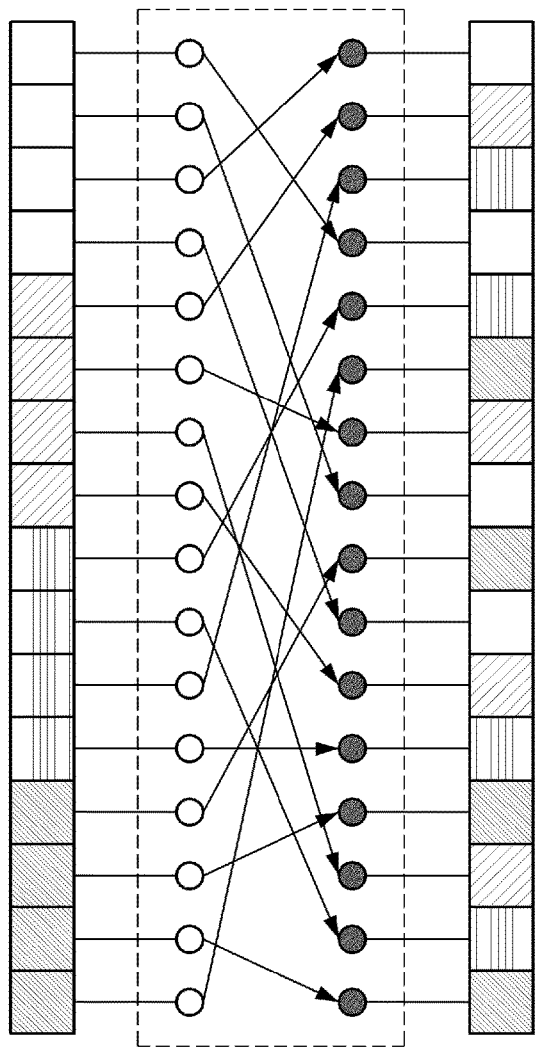
【FIG. 23】
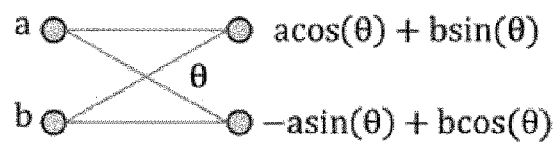
(a)
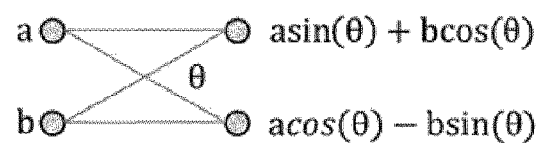
(b)

[FIG. 24]
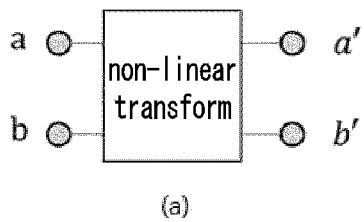
(a)
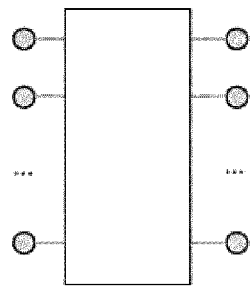
(b)
[FIG. 25]
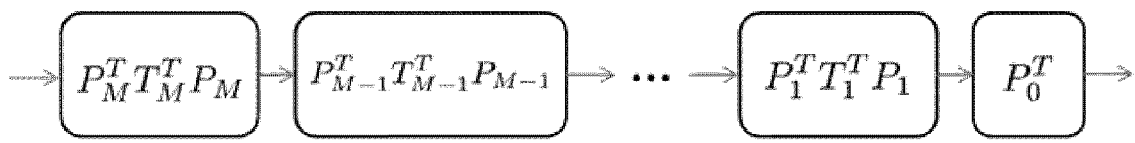
(a)
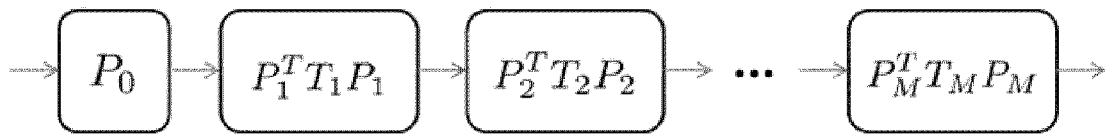
(b)

[FIG. 26]
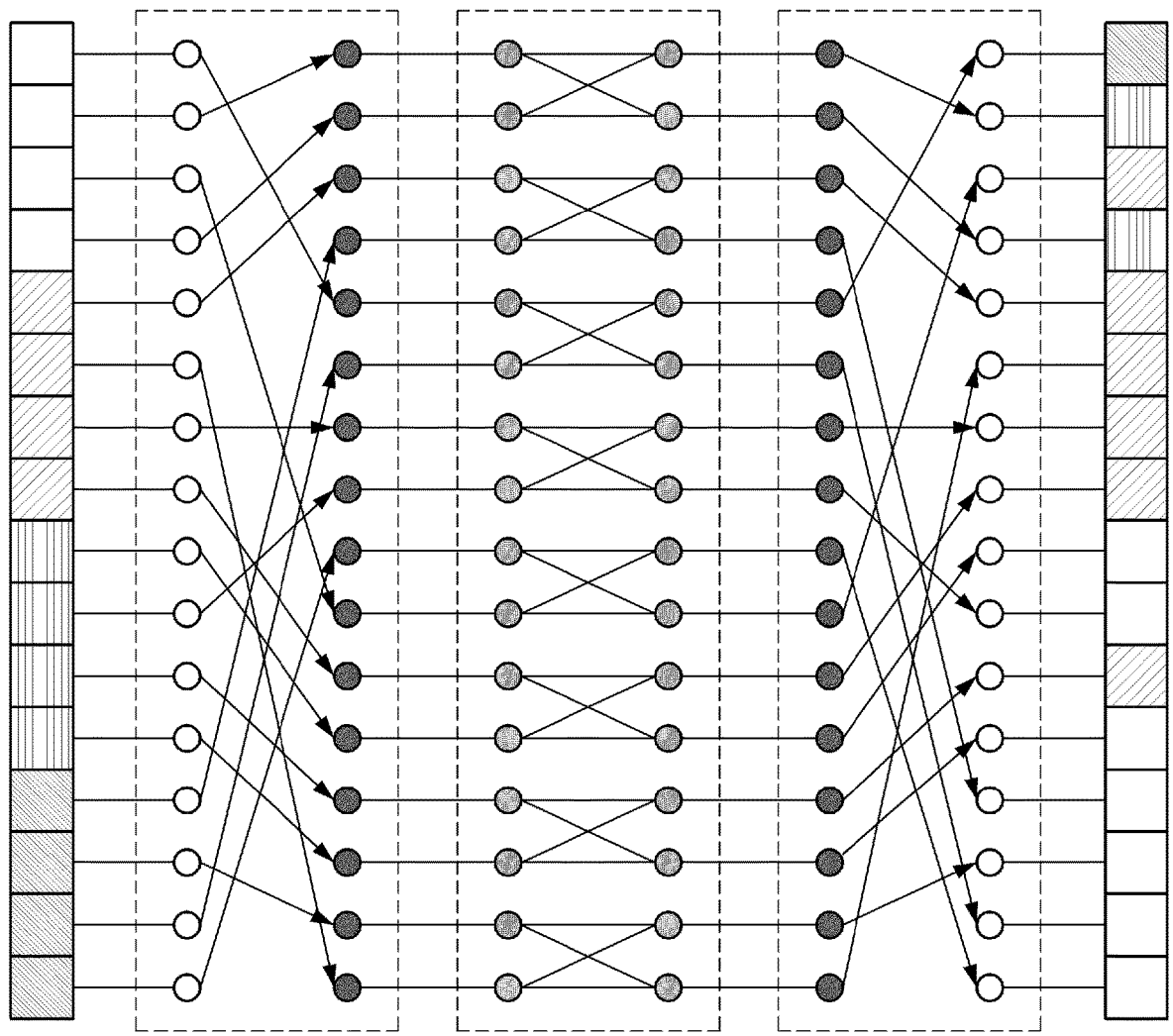

[FIG. 27]
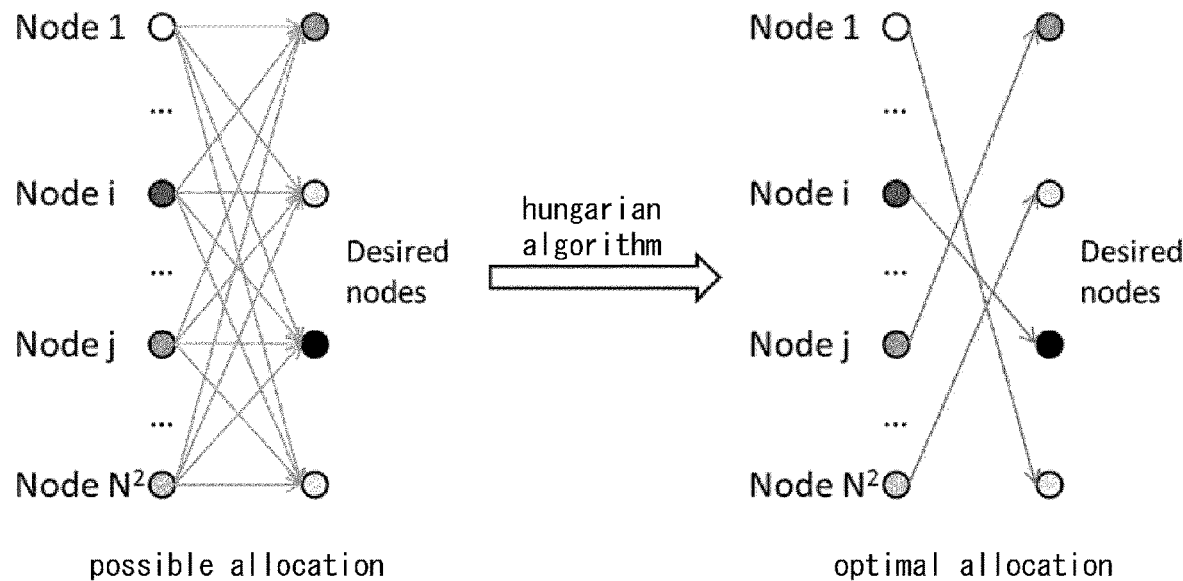
[FIG. 28]
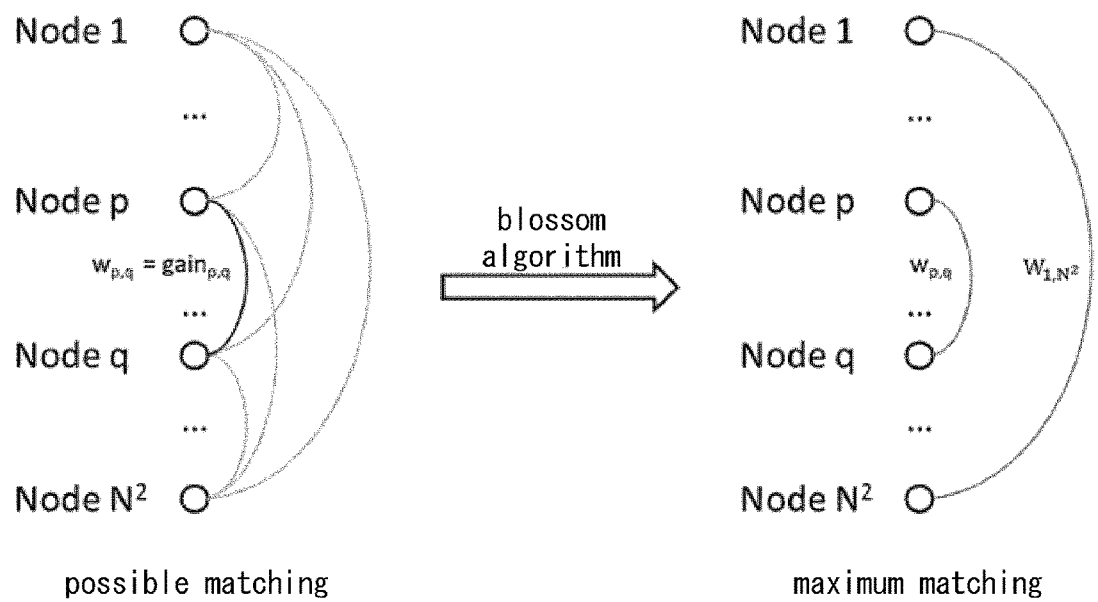

[FIG. 29]
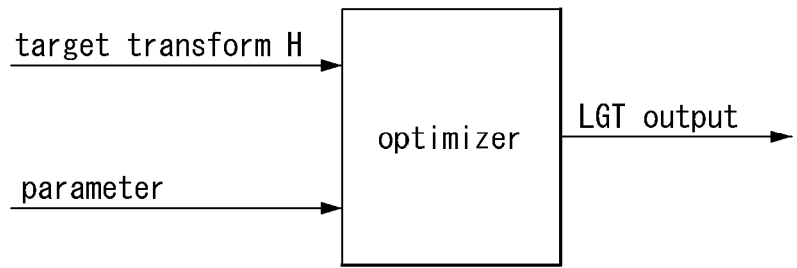
[FIG. 30]
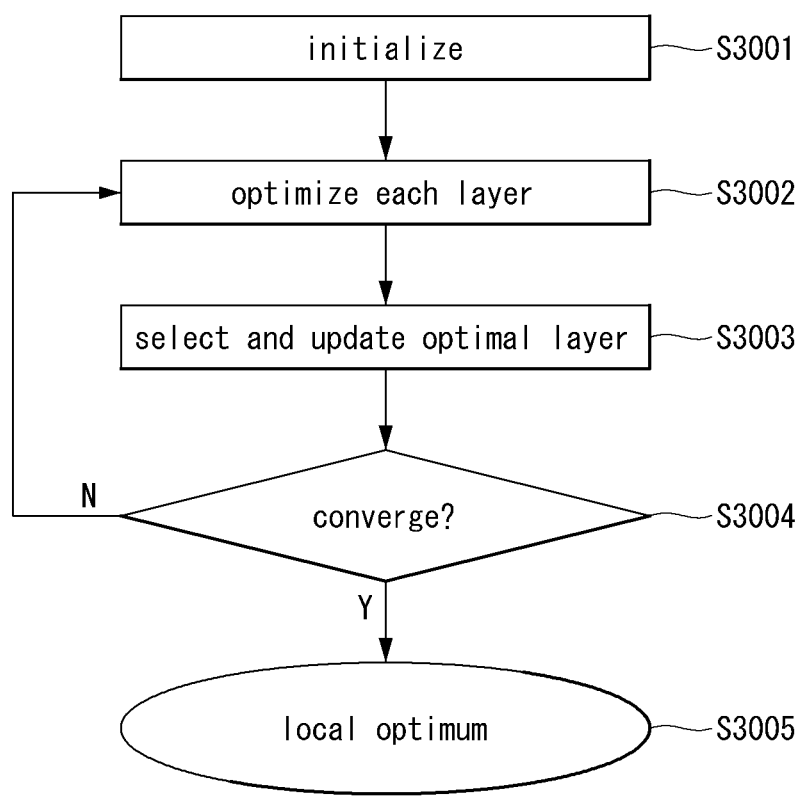

[FIG. 31]
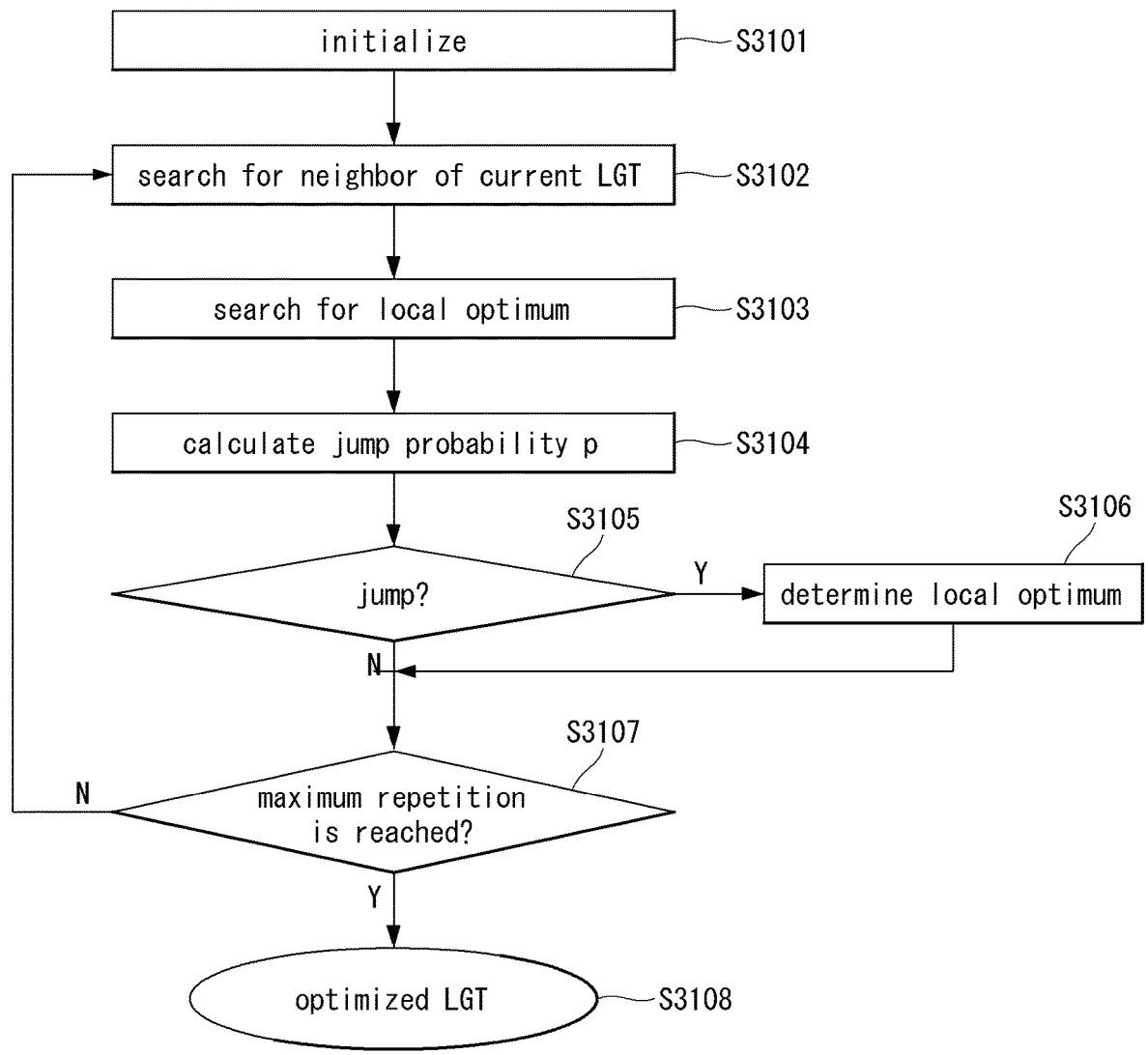

[FIG. 32]
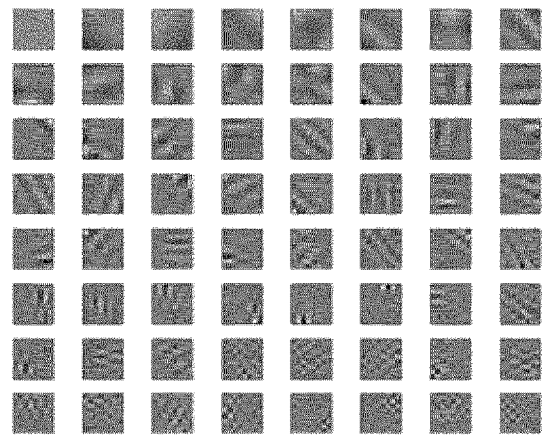
(a) Non-separable target basis
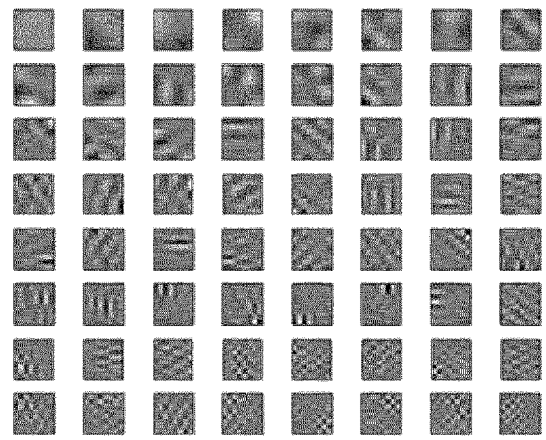
(b) IGT approximation
SNR = 8.70 dB
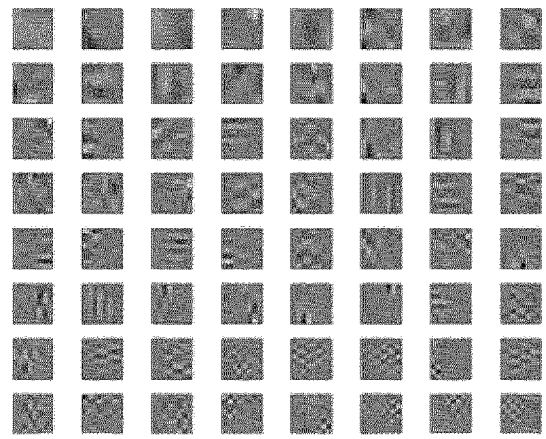
(c) RC approximation
SNR = 3.85 dB
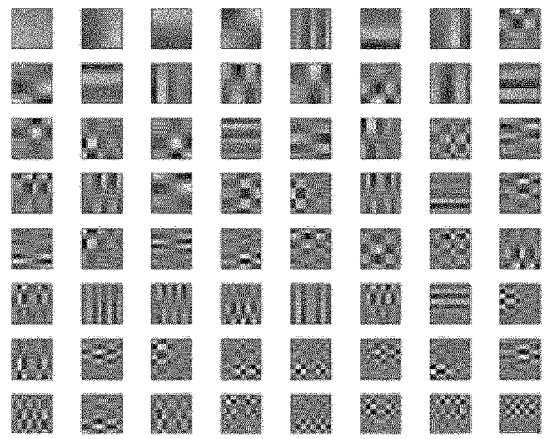
(d) Separable approximation
SNR = 0.28 dB 【FIG. 33】
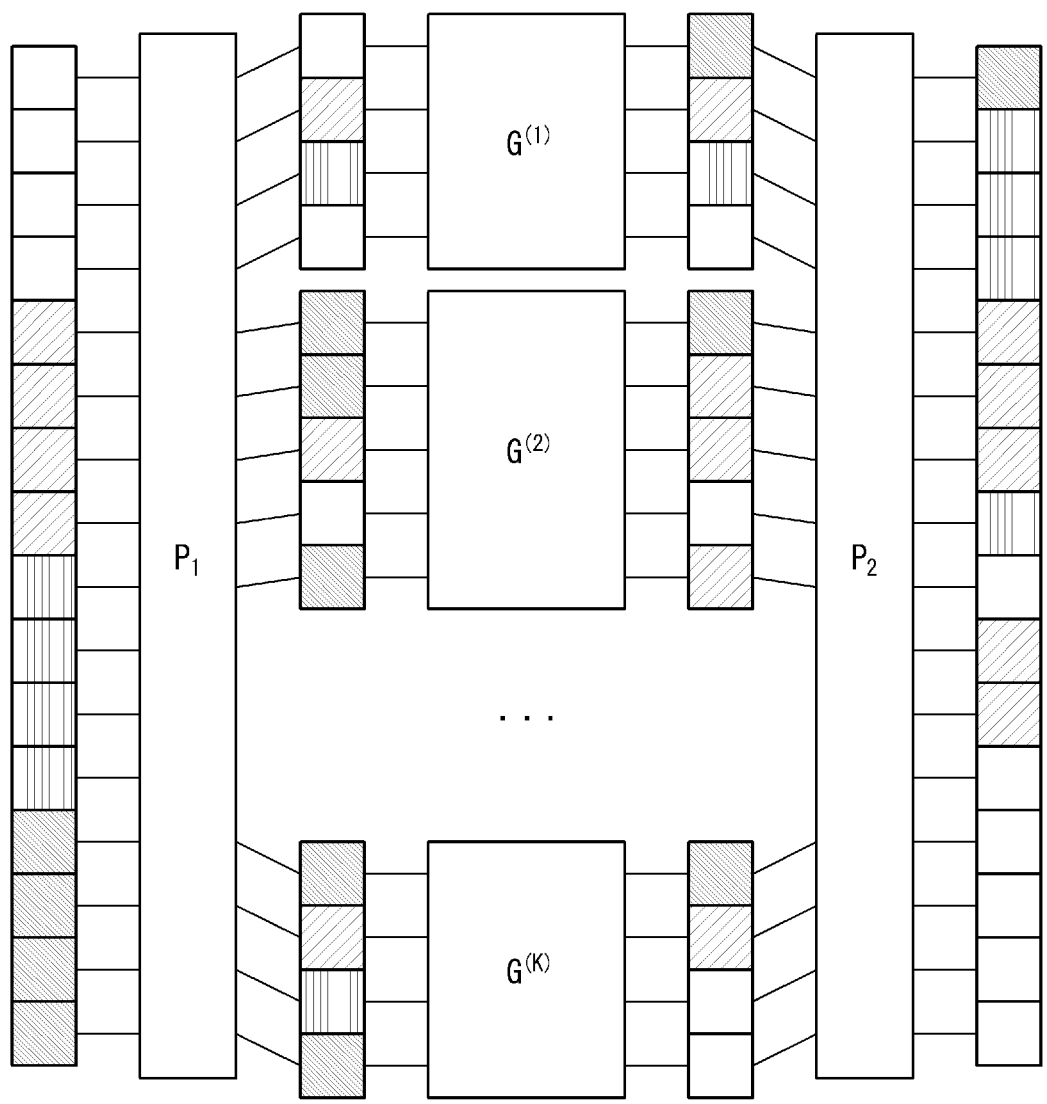

【FIG. 34】
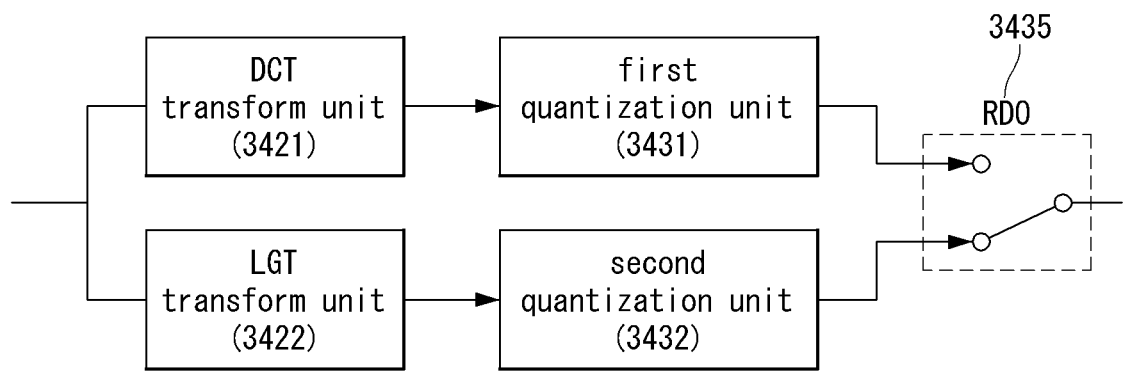
【FIG. 35】
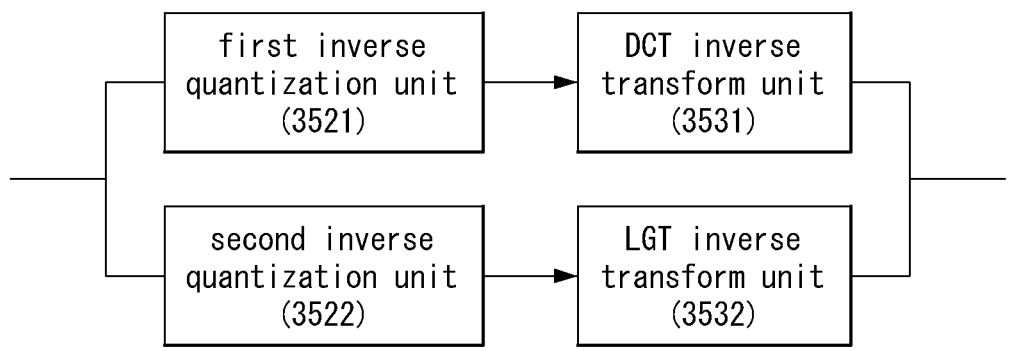

[FIG. 36]
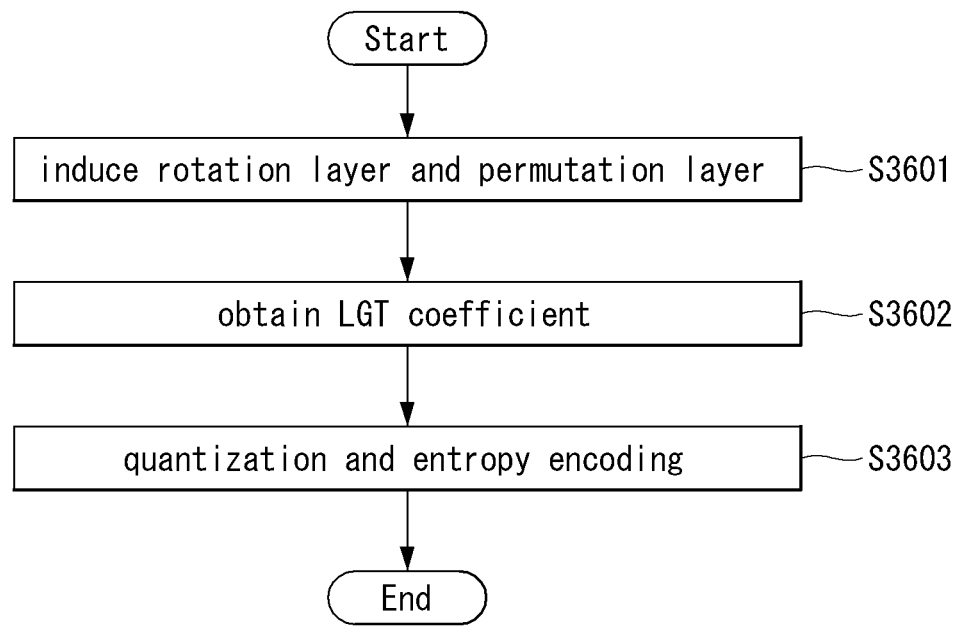

[FIG. 37]
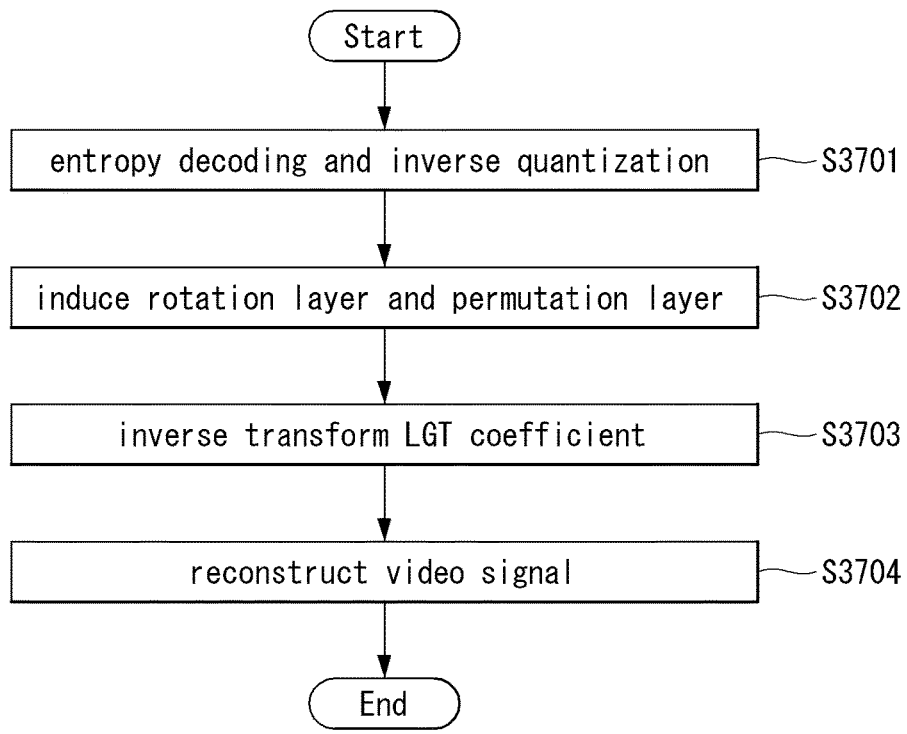
[FIG. 38]
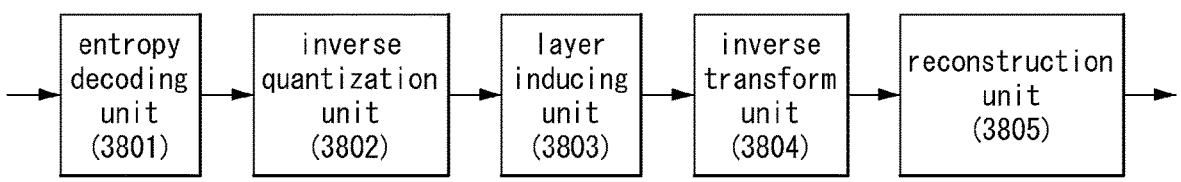

[FIG. 39]
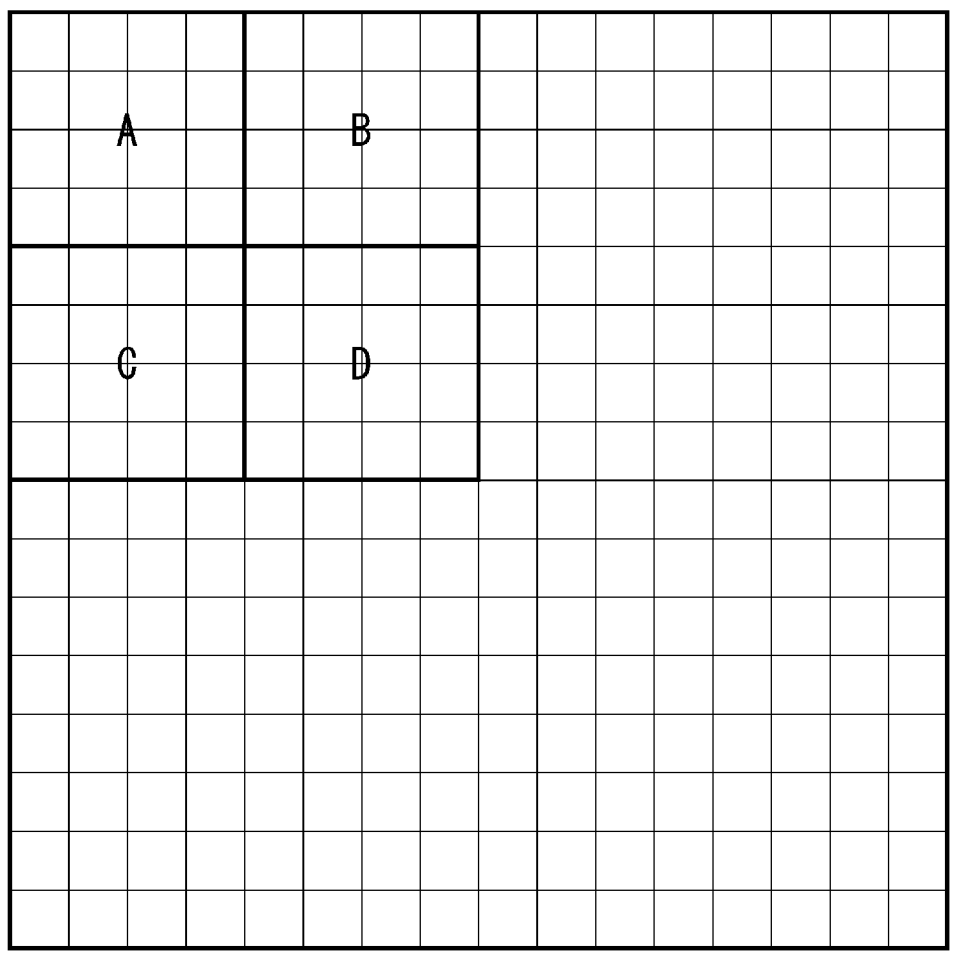

【FIG. 40】
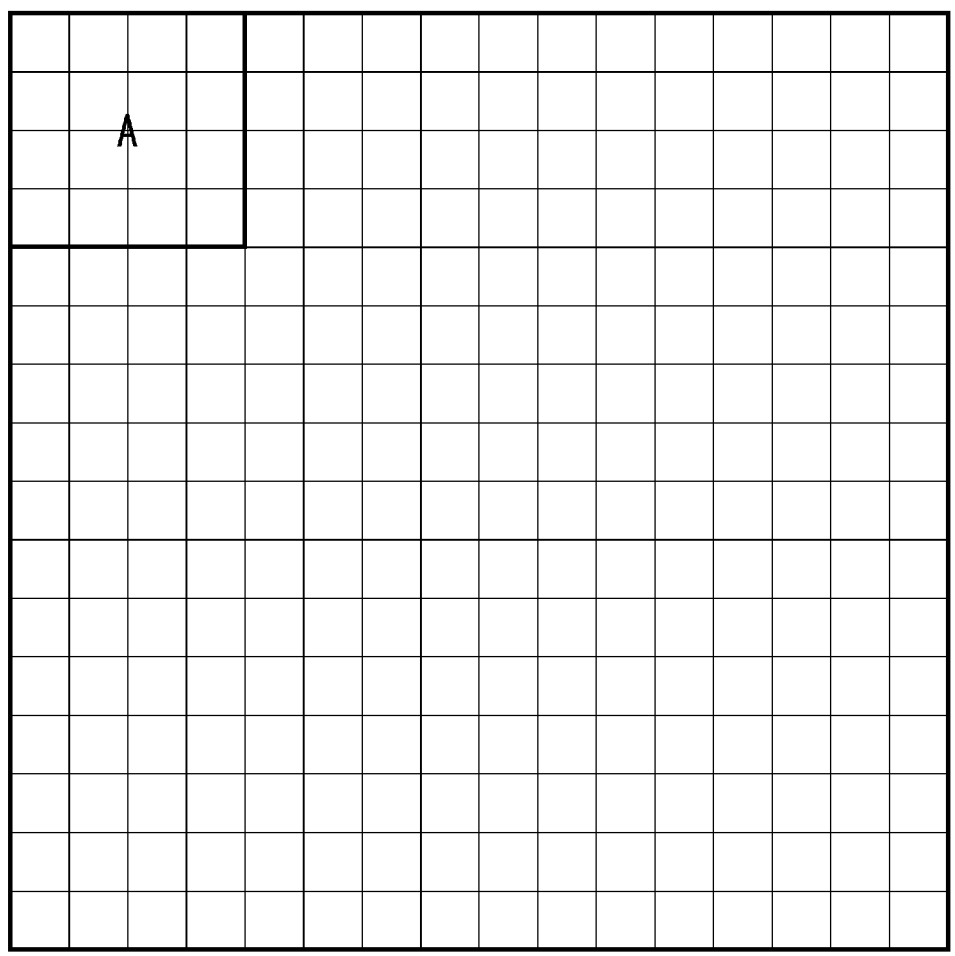

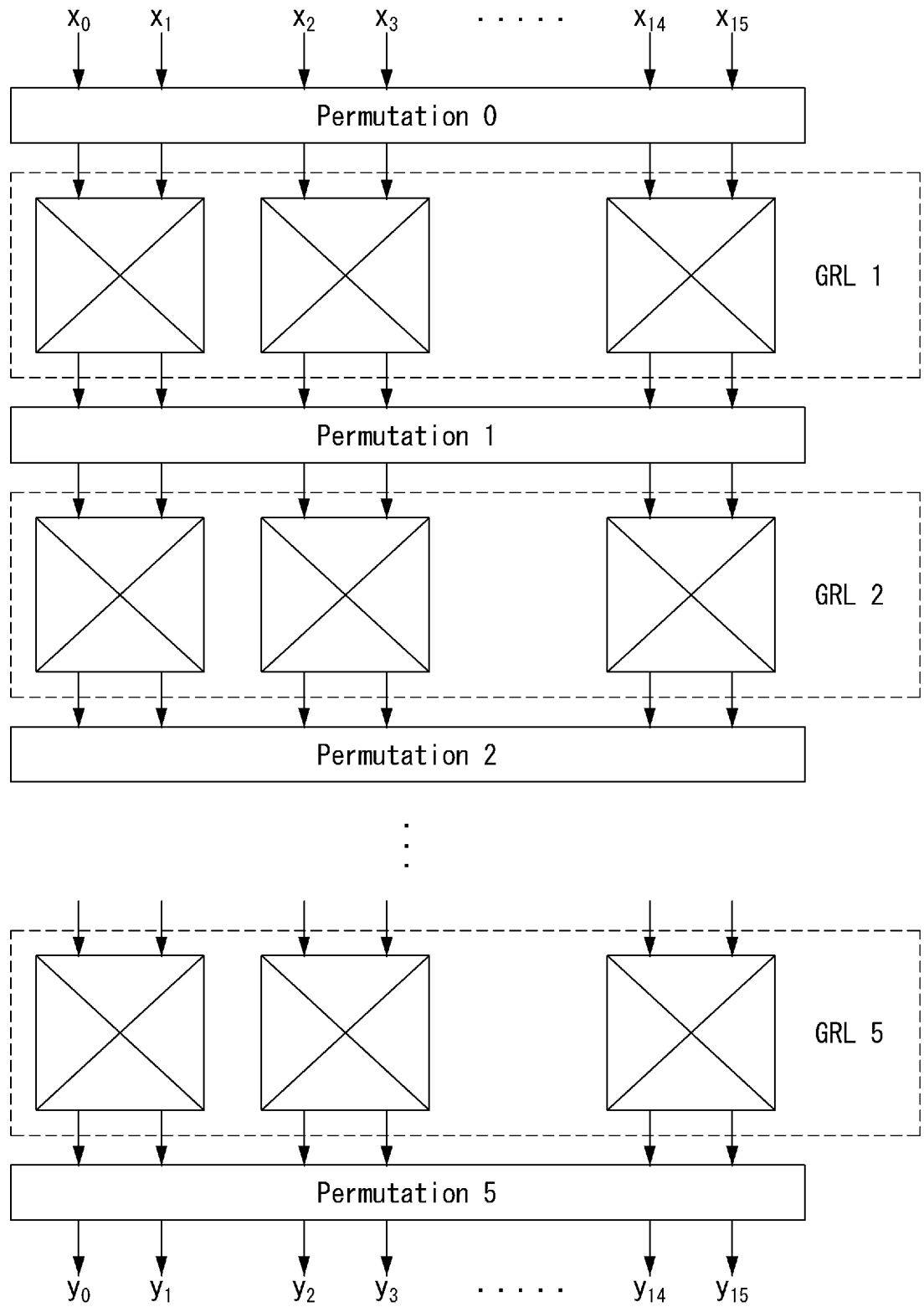
[FIG. 41]

[FIG. 42]
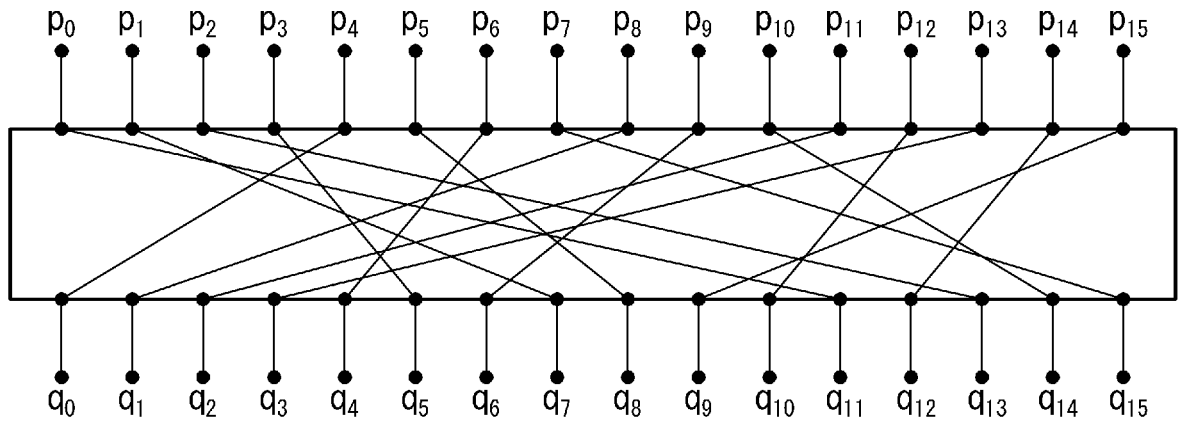
[FIG. 43]
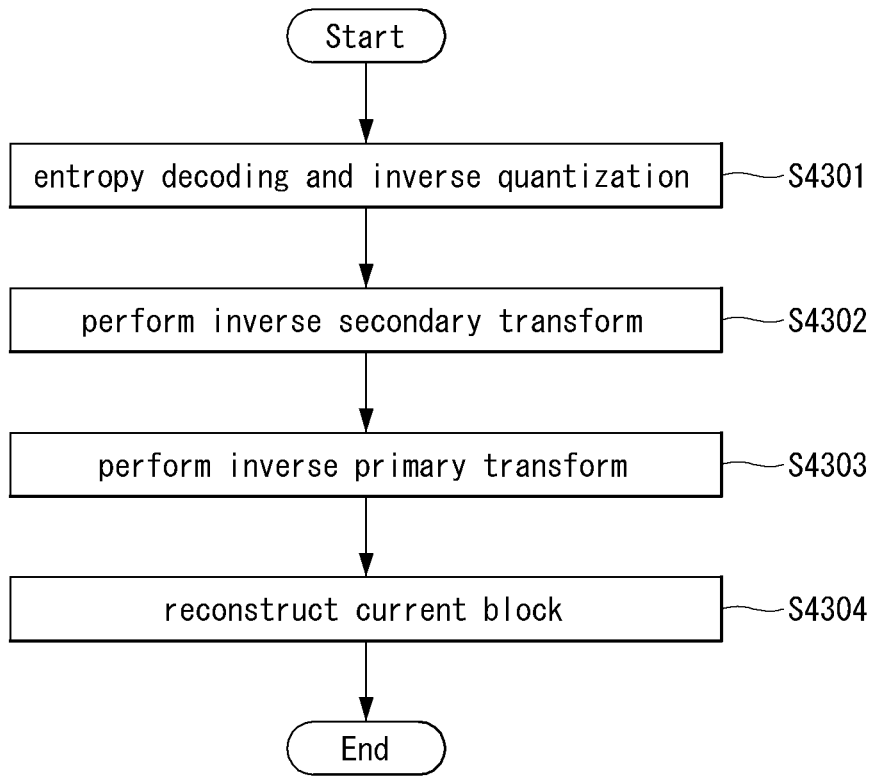

[FIG. 44]
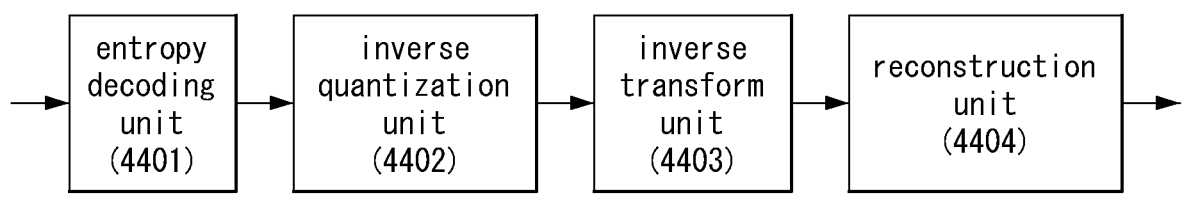
[FIG. 45]
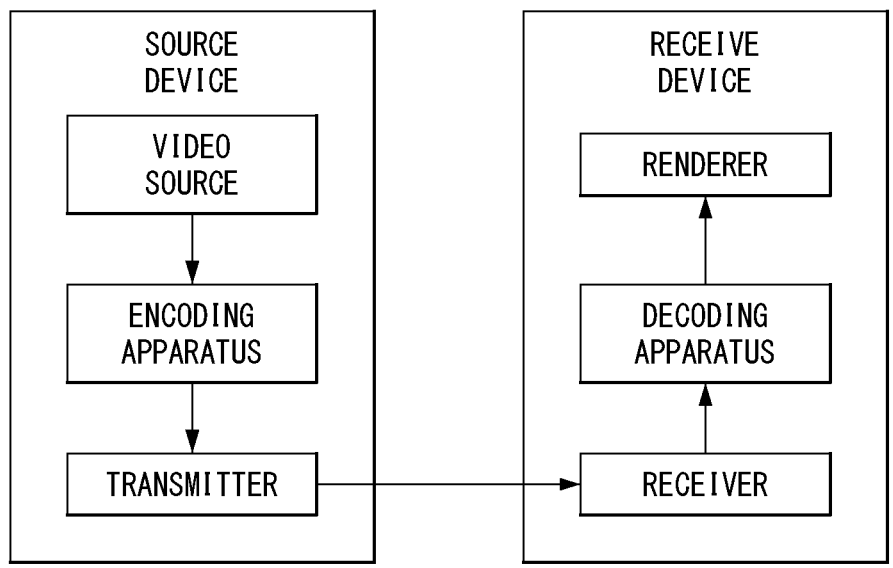

[FIG. 46]
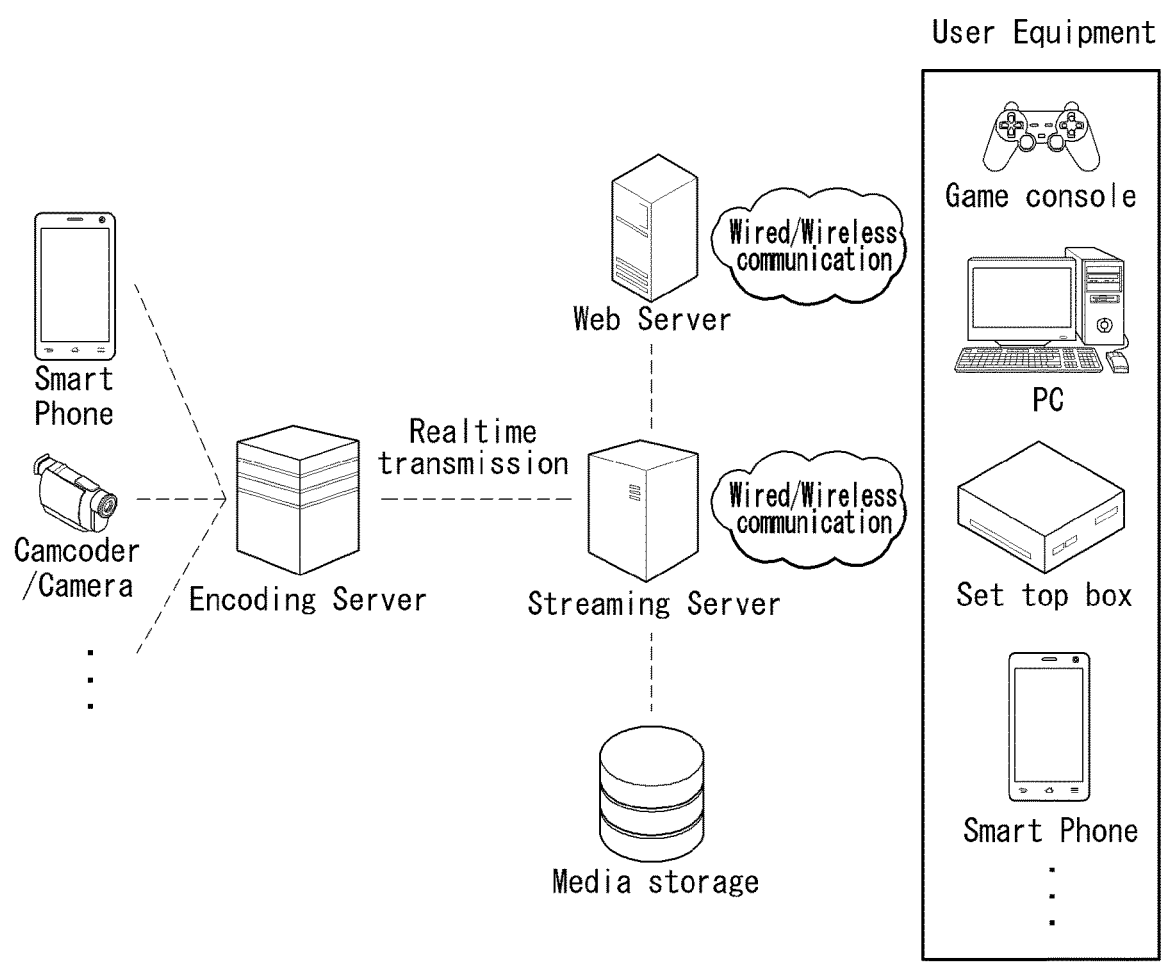

METHOD AND DEVICE FOR PERFORMING TRANSFORMATION BY USING LAYERED-GIVENS TRANSFORM

This application is the National Stage filing under 35 U.S.C. 371 of International Application No. PCT/KR2019/006607, filed on May 31, 2019, which claims the benefit of U.S. Provisional Applications No. 62/679,016, filed on May 31, 2018, and No. 62/692,893 filed on Jul. 2, 2018, the contents of which are all hereby incorporated by reference herein in their entirety.

TECHNICAL FIELD

The disclosure relates to a method and device for encoding/decoding video signals, and more specifically, to a method for performing a transform by applying a layered givens transform to a limited area, and a method for designing a layered givens transform of a specific size.

BACKGROUND ART

Compression encoding means a series of signal processing technologies for transmitting digitized information through a communication line or storing the information in a form suitable for a storage medium. Media, such as a picture, an image and voice, may be the subject of compression encoding. In particular, a technology performing compression encoding on an image is called video image compression.

Next-generation video content will have features of high spatial resolution, a high frame rate, and high dimensionality of scene representation. Processing such content will result in a tremendous increase in terms of memory storage, a memory access rate, and processing power. Therefore, there is a need to design a coding tool for processing next-generation video content more efficiently.

In particular, many image processing and compressing schemes have adapted separable transforms. For example, a Discrete Cosine Transform (DCT) provides good approximation to a Karhunen-Loeve transform (KLT) in response to a high inter pixel correlation, and it is used widely due to low complexity. Regardless of use of separable transforms, natural image compression has very different statistical properties, so better compression may be performed only by means of a complex transform applicable to variable statistical properties of signal blocks.

Actual implementations have been so far focused on separable approximation of such transforms in order to provide a low-complex reasonable coding gain. For example, a mode-dependent transform scheme is designed such that a separable KLT reduces complexity of a non-separable KLT for each mode. In another example, an asymmetric discrete sine transform (ADST) is integrated into a hybrid DCT/ADST scheme and designing a separable sparse orthonormal transform and the like has been considered.

DETAILED DESCRIPTION OF THE DISCLOSURE

Technical Problem

An object of the present invention proposes a method of designing a transform having significantly low computational complexity while showing compression performance similar to a target transform of high computational complexity.

Furthermore, an object of the present invention proposes a method of designing a layered Givens transform (LGT) approximate to a target transform when the target transform is given.

Furthermore, an object of the present invention proposes a method of approximating a non-separable transform using a layered Givens transform (LGT).

Furthermore, an object of the present invention proposes a method of performing optimization for each layer in order to design a layered Givens transform (LGT).

Furthermore, an object of the present invention proposes a method of optimizing layers configuring a layered Givens transform (LGT) using a Hungarian algorithm and a blossom algorithm.

The disclosure proposes a method for restrictively/selectively applying a layered givens transform (LGT) to a specific area.

The disclosure proposes a method for designing/implementing a layered givens transform (LGT) of a specific size for limited/selective application.

Objects of the disclosure are not limited to the foregoing, and other unmentioned objects would be apparent to one of ordinary skill in the art from the following description.

Technical Solution

According to an embodiment of the disclosure, a method for reconstructing a video signal using a layered givens transform comprises generating a transform block by performing entropy decoding and inverse quantization on a current block, performing an inverse secondary transform on a top left specific region of the transform block using the layered givens transform, performing an inverse primary transform on the inverse secondary-transformed block, and reconstructing the current block using the inverse primary-transformed block, wherein the layered givens transform includes a plurality of rotation layers and permutation matrixes.

Preferably, the top left specific region which undergoes the inverse secondary transform may be determined based on the size of the current block, and the inverse secondary transform may be performed using a 4×4 layered givens transform for the determined top left specific region.

Preferably, the top left specific region which undergoes the inverse secondary transform may be set to a top left 4×4 region of the transform block.

Preferably, the method may further include determining a transform set applied to the inverse secondary transform according to the intra prediction mode of the current block within a plurality of predefined transform sets and determining a transform applied to the inverse secondary transform within the determined transform set.

Preferably, the rotation layer may include a plurality of rotation matrixes, and the plurality of predefined transform sets may include angle information for the plurality of rotation matrixes included in the transforms in each transform set.

Preferably, the plurality of predefined transform sets may include permutation element information for a plurality of permutation matrixes included in the transforms in each transform set.

According to another embodiment of the disclosure, a device for reconstructing a video signal using a layered givens transform comprises an entropy decoding unit generating a quantized transform block by performing entropy decoding on a current block, an inverse quantization unit generating an inverse-quantized transform block by performing inverse quantization on the current block, an inverse transform unit performing an inverse secondary transform on a top left specific region of the inverse-quantized transform block using the layered givens transform and performing an inverse primary transform on the inverse secondary-transformed block, and a reconstruction unit reconstructing the current block using the inverse primary-transformed block, wherein the layered givens transform includes a plurality of rotation layers and permutation layers.

Preferably, the top left specific region which undergoes the inverse secondary transform may be determined based on the size of the current block, and the inverse secondary transform may be performed using a 4×4 layered givens transform for the determined top left specific region.

Preferably, the top left specific region which undergoes the inverse secondary transform may be set to a top left 4×4 region of the transform block.

Preferably, the inverse transform unit may determine a transform set applied to the inverse secondary transform according to the intra prediction mode of the current block within a plurality of predefined transform sets, and a transform applied to the inverse secondary transform may be determined within the determined transform set.

Preferably, the rotation layer may include a plurality of rotation matrixes, and the plurality of predefined transform sets may include angle information for the plurality of rotation matrixes included in the transforms in each transform set.

Preferably, the plurality of predefined transform sets may include permutation element information for a plurality of permutation layers included in the transforms in each transform set.

Advantageous Effects

According to an embodiment of the disclosure, coding performance may be improved by designing a transform having the same or similar compression efficiency as a given target transform at a significantly reduced computational complexity compared to the target transform.

In addition, according to an embodiment of the disclosure, it is possible to significantly reduce computational complexity and improve compression efficiency by limiting a region to which the layered givens transform (LGT) is applied.

Effects of the disclosure are not limited to the foregoing, and other unmentioned effects would be apparent to one of ordinary skill in the art from the following description.

BRIEF DESCRIPTION OF DRAWINGS

FIG. 1 is a block diagram schematically illustrating an encoder to encode video signals according to an embodiment of the disclosure.

FIG. 2 is a block diagram schematically illustrating a decoder to decode video signals according to an embodiment of the disclosure.

FIGS. 3A, 3B, 3C, and 3D are views illustrating block split structures by quad tree (QT), binary tree (BT), ternary tree (TT), and asymmetric tree (AT), respectively, according to embodiments of the disclosure.

FIG. 4 is a view schematically illustrating a transform and quantization unit 120/130 and an inverse quantization and inverse transform unit 140/150 in an encoder according to an embodiment of the disclosure.

FIG. 5 is a view schematically illustrating an inverse quantization and inverse transform unit 220/230 in a decoder according to an embodiment of the disclosure.

FIG. 6 is a table illustrating a transform configuration group to which a multiple transform selection (MTS) is applied, according to an embodiment of the disclosure.

FIG. 7 is a flowchart illustrating an encoding process of performing a multiple transform selection (MTS) according to an embodiment of the disclosure.

FIG. 8 is a flowchart illustrating a decoding process of performing a multiple transform selection (MTS) according to an embodiment of the disclosure.

FIG. 9 is a flowchart illustrating a process of encoding an MTS flag and an MTS index according to an embodiment of the disclosure.

FIG. 10 is a flowchart illustrating a decoding process of applying a horizontal or vertical transform to a row or column based on an MTS flag and an MTS index according to an embodiment of the disclosure.

FIG. 11 is a flowchart illustrating an example of performing an inverse transform based on a transform-related parameter according to an embodiment of the disclosure.

FIG. 12 is a table showing that a transform set is allocated for each intra prediction mode in NSST according to an embodiment of the disclosure.

FIG. 13 is a calculation flow diagram for givens rotation according to an embodiment of the disclosure.

FIG. 14 shows a one-round configuration in a 4×4 NSST composed of a givens rotation layer and permutations according to an embodiment of the disclosure.

FIG. 15 is a block diagram illustrating operations of a forward reduced transform and inverse reduced transform according to an embodiment of the disclosure.

FIG. 16 is a view illustrating a process of performing an inverse scans from the 64th to 17th according to an inverse scan order according to an embodiment of the disclosure.

FIG. 17 shows an example of displaying only permutation and calculation information involving an effective transform coefficient output when only half of the transform coefficients are selected after the last givens rotation layer and permutation according to an embodiment of the disclosure.

FIG. 18 shows an example of performing transform simplification by leaving only connection lines shown in FIG. 17, according to an embodiment of the disclosure.

FIG. 19 is a flowchart illustrating an example of encoding a video signal based on a reduced rotation-based transform according to an embodiment of the disclosure.

FIG. 20 is a flowchart illustrating an example of decoding a video signal based on a reduced rotation-based transform according to an embodiment of the disclosure.

FIG. 21 is a view illustrating a method for arranging two-dimensional data blocks in a one-dimensional array according to an embodiment of the disclosure.

FIG. 22 is a view illustrating an example in which a permutation matrix is applied according to an embodiment of the disclosure.

FIG. 23 is a view illustrating an example in which a rotation matrix is applied according to an embodiment of the disclosure.

FIG. 24 is a view illustrating an example transform according to an embodiment of the disclosure.

FIG. 25 is a view illustrating a method for applying a forward and inverse layered givens transform according to an embodiment of the disclosure.

FIG. 26 is a view illustrating an example method for applying a rotation layer according to an embodiment of the disclosure.

FIG. 27 is a view illustrating a method for determining a permutation layer using a Hungarian algorithm according to an embodiment of the disclosure.

FIG. 28 is a view illustrating a method for determining a rotation layer using a Blossom algorithm according to an embodiment of the disclosure.

FIG. 29 is a conceptual view illustrating a method for optimizing a layered givens transform according to an embodiment of the disclosure.

FIGS. 30 and 31 are flowcharts illustrating an algorithm for designing a layered givens transform according to an embodiment of the disclosure.

FIG. 32 illustrates approximations by an LGT transform, a row-column transform, and a separable transform according to an embodiment of the disclosure.

FIG. 33 is a view illustrating an example method for applying a reduced dimension LGT according to an embodiment of the disclosure.

FIG. 34 is a block diagram schematically illustrating a transform unit and a quantization unit in an encoder according to the disclosure.

FIG. 35 is a block diagram schematically illustrating an inverse transform unit and an inverse quantization unit in a decoder according to the disclosure.

FIG. 36 is a flowchart illustrating a process of performing encoding using a layered givens transform according to an embodiment of the disclosure.

FIG. 37 is a flowchart illustrating a process of performing decoding using a layered givens transform according to an embodiment of the disclosure.

FIG. 38 is a view more specifically illustrating a decoder according to the disclosure.

FIGS. 39 and 40 are views illustrating a low frequency region to which a 4×4 layered givens transform (LGT) is applied according to an embodiment of the disclosure.

FIG. 41 is a view illustrating a structure of a layered givens transform (LGT) according to an embodiment of the disclosure.

FIG. 42 illustrates an example permutation process according to an embodiment of the disclosure.

FIG. 43 is a flowchart illustrating an example of decoding a video signal based on a layered givens transform (LGT) according to an embodiment of the disclosure.

FIG. 44 illustrates a device for decoding a video signal based on a layered givens transform (LGT) according to an embodiment of the disclosure.

FIG. 45 illustrates a video coding system according to the disclosure.

FIG. 46 is a view illustrating a structure of a content streaming system according to an embodiment of the disclosure.

MODE FOR CARRYING OUT THE DISCLOSURE

Hereinafter, exemplary elements and operations in accordance with embodiments of the present invention are described with reference to the accompanying drawings, however, it is to be noted that the elements and operations of the present invention described with reference to the drawings are provided as only embodiments and the technical ideas and core elements and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly substituted and interpreted in each coding process. Further, partitioning, decomposition, splitting, and split, etc. may also be appropriately substituted and interpreted with each other for each coding process.

In this document, multiple transform selection (MTS) may mean a method for performing a transform using at least two or more transform types. This may be expressed as Adaptive Multiple Transform (AMT) or Explicit Multiple Transform (EMT), and mts_idx may be expressed as AMT_idx, EMT_idx, tu_mts_idx, AMT_TU_idx, EMT_TU_idx, transform index, or transform combination index, but the disclosure is not limited by such terms.

FIG. 1 shows a schematic block diagram of an encoder for encoding a video signal, according to one embodiment of the present invention.

Referring to FIG. 1, the encoder 100 may include an image segmentation unit 110, a transform unit 120, a quantization unit 130, a de-quantization unit 140, an inverse transform unit 150, a filtering unit 160, a decoded picture buffer (DPB) 170, an inter prediction unit 180, an intra prediction unit 185, and an entropy encoding unit 190.

The image segmentation unit 110 may divide an input image (or a picture or a frame) input to the encoder 100 into one or more process units. For example, the process unit may be a coding tree unit (CTU), a coding unit (CU), a prediction unit (PU) or a transform unit (TU).

However, the terms are used only for convenience of illustration of the present invention. The present invention is not limited to the definitions of the terms. In this specification, for convenience of illustration, the term "coding unit" is used as a unit used in a process of encoding or decoding a video signal, but the present invention is not limited thereto. Another process unit may be appropriately selected based on the contents of the present invention.

The encoder 100 may generate a residual signal by subtracting a prediction signal output by the inter prediction unit 180 or intra prediction unit 185 from the input image signal. The generated residual signal may be transmitted to the transform unit 120.

The transform unit 120 may apply a transform scheme to the residual signal, generating transform coefficients. The transform process may be applied to square blocks with a quadtree structure or blocks (squares or rectangles) split by a binary tree structure, a ternary tree structure, or an asymmetric tree structure.

The transform unit 120 may perform a transform based on a plurality of transforms (or transform combinations), and this transform method may be referred to as multiple transform selection (MTS). The MTS may be referred to as adaptive multiple transform (AMT) or enhanced multiple transform (EMT).

The MTS (or AMT, EMT) may mean a transform method performed based on a transform (or transform combinations) adaptively selected from a plurality of transforms (or transform combinations).

The plurality of transforms (or transform combinations) may include transforms (or transform combinations) described in connection with FIG. 6 of the disclosure. In the disclosure, the transform or transform type may be expressed as, for example, DCT-Type 2, DCT-II, DCT2, or DCT2.

The transform unit 120 may perform the following embodiments.

The disclosure provides a method and structure for simplifying the layered givens transform (LGT) or non-separable secondary transform (NSST) when only some of the transform coefficients are used.

In one embodiment, the transform unit 120 performs a forward primary transform on a current residual block and may perform a forward secondary transform on the block on which the forward primary transform has been performed using a reduced rotation-based transform.

Here, the reduced rotation-based transform means a transform by which N pieces of residual data (N×1 residual vectors) are input, and L (L<N) pieces of transform coefficient data (L×1 transform coefficient vectors) are output. The reduced rotation-based transform includes a givens rotation transform obtained by at least one permutation unit and a plurality of givens rotation layers.

In another embodiment, the encoder may determine whether to encode the transform index of the current residual block based on the position of the last non-zero transform coefficient in the current residual block. The transform index corresponds to the reduced rotation-based transform.

In another embodiment, when the last non-zero transform coefficient is located in a specific region, the transform index is not coded and, otherwise, the transform index is coded, and when the current residual block is N×N, if the reduced rotation-based transform is applied, the specific region represents the remaining regions except for a position where a non-zero transform coefficient may exist when the transform coefficients are arranged according to a scan order.

Specific embodiments related thereto are described below in greater detail.

The quantization unit 130 quantizes the transform coefficient and transmits the quantized coefficient to the entropy encoding unit 190. The entropy encoding unit 190 may entropy-encode a quantized signal and output it as a bit stream.

The transform unit 120 and the quantization unit 130 are described as separate functional units, but the present disclosure is not limited thereto and may be combined into one functional unit. In the case of the dequantization unit 140 and the inverse transform unit 150, similarly, they may be combined into one functional unit.

The quantized signal output by the quantization unit 130 may be used to generate a prediction signal. For example, the quantized signal may reconstruct a residual signal by applying dequantization and an inverse transform through the dequantization unit 140 and the inverse transform unit 150 within the loop. A reconstructed signal may be generated by adding the reconstructed residual signal to the prediction signal output by the inter-prediction unit 180 or the intra-prediction unit 185.

Meanwhile, artifacts which appear in a block boundary due to a quantization error generated in such a compression process may occur. Such a phenomenon are called blocking artifacts, which is one of important elements that evaluate picture quality. A filtering process may be performed in order to reduce such artifacts. Through such a filtering process, picture quality can be enhanced by removing blocking artifacts and also reducing an error of a current picture.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter prediction unit 180.

The inter prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter prediction unit 180 may interpolate signals between pixels on a subpixel basis using a low-pass filter. In this case, the subpixel may mean a virtual pixel generated by applying an interpolation filter. An integer pixel means an actual pixel within the reconstructed picture. The interpolation method may include linear interpolation, bi-linear interpolation and Wiener filter, etc.

The interpolation filter may be applied to the reconstructed picture to improve the accuracy of the prediction. For example, the inter prediction unit 180 may apply the interpolation filter to integer pixels to generate interpolated pixels. The inter prediction unit 180 may perform prediction using an interpolated block composed of the interpolated pixels as a prediction block.

Meanwhile, the intra prediction unit 185 may predict a current block by referring to samples in the vicinity of a block to be encoded currently. The intra prediction unit 185 may perform a following procedure to perform intra-prediction. First, the intra prediction unit 185 may prepare reference samples needed to generate a prediction signal. Thereafter, the intra prediction unit 185 may generate the prediction signal using the prepared reference samples. Thereafter, the intra prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter prediction unit 180 or the intra prediction unit 185 may be used to generate the reconstructed signal or used to generate the residual signal.

FIG. 2 shows a schematic block diagram of a decoder for decoding a video signal according to one embodiment of the present invention.

Referring to FIG. 2, the decoder 200 may include a parsing unit (not shown), an entropy decoding unit 210, a de-quantization unit 220, an inverse transform unit 230, a filtering unit 240, a decoded picture buffer (DPB) 250, an inter prediction unit 260 and an intra prediction unit 265.

A reconstructed video signal output by the decoder 200 may be reproduced using a playback device.

The decoder 200 may receive the signal output by the encoder as shown in FIG. 1. The received signal may be entropy-decoded via the entropy decoding unit 210.

The de-quantization unit 220 obtains a transform coefficient from an entropy-decoded signal using quantization step size information.

The inverse transform unit 230 obtains a residual signal by performing an inverse-transform for the transform coefficient.

Here, the disclosure provides a method for configuring a transform combination for each transform configuration group differentiated by at least one of the prediction mode, block size, or block shape, and the inverse transform unit 230 may perform an inverse transform based on a transform combination constructed according to the disclosure. Embodiments described herein may be applied.

The inverse transform unit 230 may perform the following embodiments.

The disclosure provides a method and structure for simplifying the layered givens transform (LGT) or non-separable secondary transform (NSST) when only some of the transform coefficients are used.

The inverse transform unit 230 may perform an inverse secondary transform on the transform block using a reduced rotation-based transform and may perform an inverse primary transform on the block which has undergone the inverse secondary transform.

Here, the reduced rotation-based transform means a transform by which N pieces of residual data (N×1 residual vectors) are input, and L (L<N) pieces of transform coefficient data (L×1 transform coefficient vectors) are output. The reduced rotation-based transform includes a givens rotation transform obtained by at least one permutation unit and a plurality of givens rotation layers.

In an embodiment, the decoder may obtain a transform index of the current block from the video signal and derive a reduced rotation-based transform corresponding to the transform index. In this case, whether to obtain the transform index may be determined based on the position of the last non-zero transform coefficient.

In an embodiment, when the last non-zero transform coefficient is located in a specific region, the transform index is not coded and, otherwise, the transform index is coded, and when the current block is N×N, if the reduced rotation-based transform is applied, the specific region represents the remaining regions except for a position where a non-zero transform coefficient may exist when the transform coefficients are arranged according to a scan order.

In one embodiment, the decoder may obtain the transform index of the current block from the video signal and derive a transform combination corresponding to the transform index.

Here, the transform index corresponds to any one of a plurality of transform combinations composed of a combination of DST7 and/or DCT8.

The transform combination is composed of a horizontal transform and a vertical transform, and the horizontal transform and the vertical transform correspond to either the DST7 or the DCT8. In this case, the reverse primary transform is performed using the transform combination.

The de-quantization unit 220 and the inverse transform unit 230 are described as separate functional units, but the disclosure is not limited thereto, and they may be combined into one functional unit.

A reconstructed signal is generated by adding the obtained residual signal to a prediction signal output from the inter prediction unit 260 or the intra prediction unit 265. The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter prediction unit 260.

In this specification, the same embodiments described regarding the transform unit 120 and each function unit of the encoder 100 may be applied to the inverse transform unit 230 and any corresponding function unit of the decoder.

FIGS. 3A, 3B, 3C, and 3D are views illustrating block split structures by quad tree (QT), binary tree (BT), ternary tree (TT), and asymmetric tree (AT), respectively, according to embodiments of the disclosure.

In video coding, one block may be split based on the quadtree (QT). One sub block split into by the QT may further be split recursively by the QT. The leaf block which is not any longer split by the QT may be split by at least one scheme of the binary tree (BT), ternary tree (TT), or asymmetric tree (AT). The BT may have two types of splitting, such as horizontal BT (2N×N, 2N×N) and vertical BT (N×2N, N×2N). The TT may have two types of splitting, such as horizontal TT (2N×½N, 2N×N, 2N×½N) and vertical TT (½N×2N, N×2N, ½N×2N). The AT may have four types of splitting, such as horizontal-up AT (2N×½N, 2N×3/2N), horizontal-down AT (2N×3/2N, 2N×½N), vertical-left AT (½N×2N, 3/2N×2N), and vertical-right AT (3/2N×2N, ½N×2N). The BT, TT, and AT each may be further split recursively using the BT, TT, and AT.

FIG. 3A shows an example of QT splitting. Block A may be split into four subblocks (A0, A1, A2, A3) by the QT. Subblock A1 may be split again into four subblocks (B0, B1, B2, B3) by the QT.

FIG. 3B shows an example of BT splitting. Block B3, which is not any longer split by the QT, may be split into vertical BT(C0, C1) or horizontal BT(D0, D1). Like block C0, each subblock may be further split recursively, e.g., in the form of horizontal BT(E0, E1) or vertical BT (F0, F1).

FIG. 3C shows an example of TT splitting. Block B3, which is not any longer split by the QT, may be split into vertical TT(C0, C1, C2) or horizontal TT(D0, D1, D2). Like block C1, each subblock may be further split recursively, e.g., in the form of horizontal TT(E0, E1, E2) or vertical TT (F0, F1, F2).

FIG. 3D shows an example of AT splitting. Block B3, which is not any longer split by the QT, may be split into vertical AT(C0, C1) or horizontal AT(D0, D1). Like block C1, each subblock may be further split recursively, e.g., in the form of horizontal AT(E0, E1) or vertical TT (F0, F1).

Meanwhile, the BT, TT, and AT may be used together for splitting. For example, the subblock split by the BT may be split by the TT or AT. Further, the subblock split by the TT may be split by the BT or AT. The subblock split by the AT may be split by the BT or TT. For example, after split by the horizontal BT, each subblock may be split by the vertical BT or, after split by the vertical BT, each subblock may be split by the horizontal BT. Although the order of splitting is different for the two types of splitting methods, the final shape after the splitting is the same.

When a block is split, various orders of searching for the block may be defined. Generally, a search is performed from the left to right or from the top to bottom. Searching for a block may mean the order of determining whether to further split each subblock split into or, if the block is not split any longer, the order of encoding each subblock, or the order of search when the subblock references other neighboring block.

FIG. 4 is a block diagram schematically illustrating the transform and quantization unit 120/130 and the inverse quantization and inverse transform unit 140/150 in the encoder, and FIG. 5 is a block diagram schematically illustrating the inverse quantization and inverse transform unit 220/230 in the decoder, according to an embodiment of the disclosure.

Referring to FIG. 4, the transform and quantization unit 120/130 may include a primary transform unit 121, a secondary transform unit 122, and a quantization unit 130. The inverse quantization and inverse transform unit 140/150 may include an inverse quantization unit 140, an inverse secondary transform unit 151, and an inverse primary transform unit 152.

Referring to FIG. 5, the inverse quantization and inverse transform unit 220/230 may include an inverse quantization unit 220, an inverse secondary transform unit 231, and an inverse primary transform unit 232.

In the disclosure, a transform may be performed through a plurality of steps. For example, as shown in FIG. 4, two steps of primary transform and secondary transform may be applied, or more transform steps may be applied depending on the algorithm. Here, the primary transform may be referred to as a core transform.

The primary transform unit 121 may apply a primary transform to the residual signal, wherein the primary transform may be previously defined as a table by the encoder and/or the decoder.

In the case of the primary transform, Discrete Cosine Transform type 2 (hereinafter, referred to as 'DCT2') may apply.

Alternatively, Discrete Sine Transform-type 7 (hereinafter referred to as 'DST7') may be applied only in a specific case. For example, DST7 may be applied to 4×4 blocks in the intra prediction mode.

In the case of the primary transform, combinations of several transforms (DST 7, DCT 8, DST 1, DCT 5) of multiple transform selection (MTS) may be applied. For example, FIG. 6 may apply.

The secondary transform unit 122 may apply a secondary transform to the primary-transformed signal, wherein the secondary transform may be previously defined as a table in the encoder and/or the decoder.

In an embodiment, in the secondary transform, a non-separable secondary transform (hereinafter referred to as 'NSST') may be conditionally applied. For example, the NSST may be applied only to intra prediction blocks and may have a transform set applicable to each prediction mode group.

Here, the prediction mode group may be set based on the symmetry for the prediction direction. For example, since prediction mode 52 and prediction mode 16 are symmetrical with respect to prediction mode 34 (diagonal direction), they may form one group and the same transform set may be applied thereto. Upon applying a transform on prediction mode 52, the transform is applied after transposing input data and this is why it has the same transform set as prediction mode 16.

Meanwhile, since the planar mode and DC mode lack directional symmetry, they have their respective transform sets, and each transform set may consist of two transforms. For the other directional modes, each transform set may consist of three transforms.

In another embodiment, in the case of the secondary transform, combinations of several transforms (DST 7, DCT 8, DST 1, DCT 5) of multiple transform selection (MTS) may be applied. For example, FIG. 6 may apply.

In another embodiment, DST7 may be applied as a secondary transform.

In another embodiment, the NSST may not be applied to the entire primary-transformed block, but may be applied only to a top-left 8×8 region. For example, if the size of the block is 8×8 or more, an 8×8 NSST is applied, and if it is less than 8×8, a 4×4 NSST is applied. In this case, after split into 4×4 blocks, the 4×4 NSST is applied to each.

In another embodiment, the 4×4 NSST may be applied even when 4×N/N×4 (N>=16).

The NSST, 4×4 NSST, and 8×8 NSST will be described below in more detail through FIGS. 12 to 15 and other embodiments.

The quantization unit 130 may perform quantization on the secondary-transformed signal.

The inverse quantization and inverse transform unit 140/150 may inversely perform the above-described process, and no duplicate description is given.

FIG. 5 is a view schematically illustrating an inverse quantization and inverse transform unit 220/230 in a decoder.

Referring to FIG. 5, the inverse quantization and inverse transform unit 220/230 may include an inverse quantization unit 220, an inverse secondary transform unit 231, and an inverse primary transform unit 232.

The inverse quantization unit 220 obtains a transform coefficient from the entropy-decoded signal using quantization step size information.

The inverse secondary transform unit 231 performs an inverse secondary transform on the transform coefficient. Here, the inverse secondary transform represents an inverse transform of the secondary transform described above in connection with FIG. 4.

In another embodiment, in the case of the secondary transform, combinations of several transforms (DST 7, DCT 8, DST 1, DCT 5) of multiple transform selection (MTS) may be applied. For example, FIG. 6 may apply.

The inverse primary transform unit 232 performs an inverse primary transform on the inverse secondary-transformed signal (or block) and obtains the residual signal. Here, the inverse primary transform represents an inverse transform of the primary transform described above in connection with FIG. 4.

According to an embodiment, in the case of the primary transform, combinations of several transforms (DST 7, DCT 8, DST 1, DCT 5) of multiple transform selection (MTS) may be applied. For example, FIG. 6 may apply.

In an embodiment of the disclosure, DST7 may be applied as a primary transform.

In another embodiment, DST8 may be applied as a primary transform.

The disclosure provides a method for configuring a transform combination for each transform configuration group differentiated by at least one of the prediction mode, block size, or block shape, and the inverse primary transform unit 232 may perform an inverse transform based on a transform combination constructed according to the disclosure. Embodiments described herein may be applied.

FIG. 6 is a table illustrating a transform configuration group to which a multiple transform selection (MTS) is applied, according to an embodiment of the disclosure.

In the disclosure, the jth transform combination candidate for the transform setting group Gi is expressed in pair as shown in Equation 1 below.

$$(H(G_i,j), V(G_i,j)) \quad \text{[Equation 1]}$$

Here, $H(G_i, j)$ denotes the horizontal transform for the jth candidate, and $V(G_i, j)$ denotes the vertical transform for the jth candidate. For example, in FIG. 6, $H(G_3, 2)$=DST7, $V(G_3, 2)$=DCT8 may be expressed. Depending on the context, the value assigned to $H(G_i, j)$ or $V(G_i, j)$ may be a nominal value for classifying the transforms or may be the index value indicating the corresponding transform or may be a two-dimensional (2D) matrix for the corresponding transform.

Further, in the disclosure, 2D matrix values for DCT and DST may be expressed as in Equations 2 to 3 below.

$$\text{DCT type 2: } C_N^{II}, \text{DCT type 8: } C_N^{VIII} \quad \text{[Equation 2]}$$

$$\text{DST type 7: } S_N^{VII}, \text{DST type 4: } S_N^{IV} \quad \text{[Equation 3]}$$

Here, whether it is DST or DCT is indicated by S or C, the type number is indicated by superscript in the form of a Roman numeral, and the subscript N indicates N×N conversion.

Further, the 2D matrix, such as $C_N^{II}$ and $S_N^{IV}$ assumes that the column vectors form a transform basis.

Referring to FIG. 6, the transform configuration groups may be determined based on the prediction mode, and there may be a total of six (G0 to G5) groups. G0 to G4 correspond to where intra prediction applies, and G5 represents transform combinations (or transform set or transform combination set) applied to the residual block generated by inter prediction.

One transform combination may consist of the horizontal transform (or row transform) applied to the rows of the two-dimensional block and the vertical transform (or column transform) applied to the columns of the two-dimensional block.

Here, each transform configuration group may include four transform combination candidates. The four transform combination candidates may be selected or determined via the transform combination indexes of 0 to 3, and the transform combination indexes may be encoded and transmitted from the encoder to the decoder.

According to an embodiment, the residual data (or residual signal) obtained via intra prediction may have different statistical features depending on intra prediction modes. Accordingly, as shown in FIG. 6, transforms other than normal cosine transforms (e.g., DCT-type 2 or DCT-2) may be applied for each intra prediction mode.

FIG. 6 shows a case of using 35 intra prediction modes and a case of using 67 intra prediction modes. A plurality of transform combinations may apply per transform configuration group differentiated in the intra prediction mode columns. For example, the plurality of transform combinations may be composed of four (row direction transform, column direction transform) combinations. As a specific example, in group 0, DST-7 and DCT-5 may be applied in both the row (horizontal) direction and the column (vertical) direction, so that a total of four combinations are possible.

Since a total of four transform kernel combinations may apply to each intra prediction mode, the transform combination index for selecting one of them may be transmitted per transform unit. In the disclosure, the transform combination index may be referred to as an MTS index and may be expressed as mts_idx.

In addition to the transform kernels shown in FIG. 6, DCT2 may be optimal for both the row direction and the column direction by the nature of the residual signal. Thus, a transform may be adaptively performed by defining an MTS flag per coding unit. Here, if the MTS flag is 0, DCT-2 may be applied to both the row direction and column direction and, if the MTS flag is 1, one of the four combinations may be selected or determined via the MTS index.

In an embodiment, when the MTS flag is 1, if the number of non-zero transform coefficients for one transform unit is not greater than a threshold value, the transform kernels of FIG. 6 are not applied and DST-7 may be applied for both the row and column directions. For example, the threshold value may be set to 2 but may be set to a different value based on the block size or the size of the transform unit. This is applicable to other embodiments of the specification.

In an embodiment, the transform coefficients are parsed, and if the number of non-zero transform coefficients is not greater than a threshold value, the amount of additional information transmission may be reduced by applying DST-7 without parsing the MTS index.

In an embodiment, when the MTS flag is 1, if the number of non-zero transform coefficients for one transform unit is greater than the threshold value, the MTS index may be parsed, and the horizontal transform and vertical transform may be determined based on the MTS index.

In one embodiment, the MTS may be applied only when the width and height of the transform unit are both 32 or less.

In one embodiment, FIG. 6 may be preset through off-line training.

In one embodiment, the MTS index may be defined as one index that may simultaneously indicate a combination of horizontal transform and vertical transform. Alternatively, the MTS index may separately define a horizontal transform index and a vertical transform index.

In one embodiment, the MTS flag or the MTS index may be defined at at least one level of a sequence, picture, slice, block, coding unit, transform unit, or prediction unit. For example, the MTS flag or the MTS index may be defined at at least one level of a sequence parameter set (SPS), a coding unit, or a transform unit. In addition, as an example, the syntax flag for enabling/disabling of MTS may be defined at at least one level of a sequence parameter set (SPS), a picture parameter set (PPS), or a slice header.

FIG. 7 is a flowchart illustrating an encoding process of performing a multiple transform selection (MTS) according to an embodiment of the disclosure.

Although the disclosure basically describes applying a transform separately for the horizontal direction and vertical direction, a transform combination may be constituted of on-separable transforms.

Alternatively, it may be composed of a combination of separable transforms and non-separable transforms. In this case, if a non-separable transform is used, transform selection per row/column direction or selection per horizontal/vertical direction is unnecessary and, only when a separable transform is selected, the transform combinations of FIG. 6 may come into use.

In addition, the methods proposed in the disclosure may be applied regardless of a primary transform or a secondary transform. In other words, there is no such a limitation that either should be applied but both may rather be applied. Here, the primary transform may mean a transform for first transforming the residual block, and the secondary transform may mean a transform for applying a transform to the block resultant from the primary transform.

First, the encoder may determine a transform configuration group corresponding to the current block (S710). Here, the transform configuration group may mean the transform configuration group of FIG. 6, but the disclosure is not limited thereto and may be configured with other conversion combinations.

The encoder may perform transforms using candidate transform combinations available in the transform configuration group (S720).

As a result of performing the transforms, the encoder may determine or select a transform combination having the lowest rate distortion (RD) cost (S730).

The encoder may encode a transform combination index corresponding to the selected transform combination (S740).

FIG. 8 is a flowchart illustrating a decoding process of performing a multiple transform selection (MTS) according to an embodiment of the disclosure.

First, the decoder may determine a transform configuration group for the current block (S810).

The decoder may parse (or obtain) a transform combination index from the video signal, wherein the transform combination index may correspond to any one of a plurality of transform combinations in the transform configuration group (S820). For example, the transform configuration group may include Discrete Sine Transform type 7 (DST7) and Discrete Cosine Transform type 8 (DCT8). The transform combination index may be referred to as an MTS index.

In an embodiment, the transform configuration group may be set based on at least one of a prediction mode, a block size, and a block shape of the current block.

The decoder may derive a transform combination corresponding to the transform combination index (S830). Here, the transform combination includes a horizontal transform and a vertical transform and may include at least one of the DST-7 and DCT-8.

Further, the transform combination may mean the transform combination described above in connection with FIG. 6, but the disclosure is not limited thereto. That is, it is possible to configure other transform combinations according to other embodiments of the present specification.

The decoder may perform an inverse transform on the current block based on the transform combination (S840). Where the transform combination consists of the row (horizontal) transform and the column (vertical) transform, the row (horizontal) transform may be applied first and, then, the column (vertical) transform may apply. However, the disclosure is not limited thereto, and its opposite way may be applied or, if consisting of only non-separable transforms, a non-separable transform may immediately be applied.

According to an embodiment, if the vertical transform or horizontal transform is DST-7 or DCT-8, the inverse transform of DST-7 or the inverse transform of DCT-8 may be applied per column and then per row.

According to an embodiment, in the vertical transform or horizontal transform, a different transform may apply per row and/or per column.

In an embodiment, the transform combination index may be obtained based on an MTS flag indicating whether MTS is performed. That is, the transform combination index may be obtained when MTS is performed according to the MTS flag.

In one embodiment, the decoder may identify whether the number of non-zero transform coefficients is greater than a threshold value. In this case, the transform combination index may be obtained when the number of non-zero transform coefficients is greater than the threshold value.

In one embodiment, the MTS flag or the MTS index may be defined at at least one level of a sequence, picture, slice, block, coding unit, transform unit, or prediction unit.

In an embodiment, the inverse transform may be applied only when the width and height of the transform unit are both 32 or less.

Meanwhile, according to another embodiment, the process of determining the transform configuration group and the step of parsing the transform combination index may simultaneously be performed. Alternatively, the step S810 may be preset in the encoder and/or the decoder and be omitted.

FIG. 9 is a flowchart illustrating a process of encoding an MTS flag and an MTS index according to an embodiment of the disclosure.

The encoder may determine whether multiple transform selection (MTS) is applied to the current block (S910).

If multiple transform selection (MTS) is applied, the encoder may perform encoding with the MTS flag=1 (S920).

Further, the encoder may determine an MTS index based on at least one of a prediction mode, a horizontal transform, and a vertical transform of the current block (S930). Here, the MTS index means an index indicating any one of a plurality of transform combinations for each intra prediction mode, and the MTS index may be transmitted for each transform unit.

When the MTS index is determined, the encoder may encode the MTS index (S940).

Meanwhile, when the multiple transform selection (MTS) is not applied, the encoder may perform encoding with the MTS flag=0 (S950).

FIG. 10 is a flowchart illustrating a decoding process of applying a horizontal or vertical transform to a row or column based on an MTS flag and an MTS index according to an embodiment of the disclosure.

The decoder may parse the MTS flag from the bitstream (S1010). Here, the MTS flag may indicate whether multiple transform selection (MTS) is applied to the current block.

The decoder may identify whether multiple transform selection (MTS) is applied to the current block based on the MTS flag (S1020). For example, the decoder may identify whether the MTS flag is 1.

If the MTS flag is 1, the decoder may identify whether the number of non-zero transform coefficients is greater than (or not less than) a threshold value (S1030). For example, the threshold value may be set to 2 but may be set to a different value based on the block size or the size of the transform unit.

When the number of non-zero transform coefficients is greater than the threshold value, the decoder may parse the MTS index (S1040). Here, the MTS index means an index indicating any one of a plurality of transform combinations for each intra prediction mode or inter prediction mode, and the MTS index may be transmitted for each transform unit. Or, the MTS index may mean an index indicating any one transform combination defined in a preset transform combination table. The preset transform combination table may mean FIG. 6, but the disclosure is not limited thereto.

The decoder may derive or determine a horizontal transform and a vertical transform based on at least one of the MTS index and the prediction mode (S1050).

Alternatively, the decoder may derive a transform combination corresponding to the MTS index. For example, the decoder may derive or determine a horizontal transform and a vertical transform corresponding to the MTS index.

Meanwhile, when the number of non-zero transform coefficients is not greater than the threshold value, the decoder may apply a predetermined vertical inverse transform for each column (S1060). For example, the vertical inverse transform may be an inverse transform of DST7.

Further, the decoder may apply a predetermined horizontal inverse transform for each row (S1070). For example, the horizontal inverse transform may be an inverse transform of DST7. That is, when the number of non-zero transform coefficients is not greater than the threshold value, a transform kernel pre-configured in the encoder or decoder may be used. For example, rather than one defined in the transform combination table as shown in FIG. 6, a transform kernel (e.g., DCT-2, DST-7, or DCT-8) widely in use may be used.

Meanwhile, when the MTS flag is 0, the decoder may apply a preset vertical inverse transform for each column (S1080). For example, the vertical inverse transform may be an inverse transform of DCT2.

Further, the decoder may apply a predetermined horizontal inverse transform for each row (S1090). For example, the horizontal inverse transform may be an inverse transform of DCT2. That is, when the MTS flag is 0, a transform kernel preset in the encoder or decoder may be used. For example, rather than one defined in the transform combination table as shown in FIG. 6, a transform kernel widely in use may be used.

FIG. 11 is a flowchart illustrating an example of performing an inverse transform based on a transform-related parameter according to an embodiment of the disclosure.

The decoder to which the disclosure is applied may acquire sps_mts_intra_enabled_flag or sps_mts_inter_enabled_flag (S1110). Here, sps_mts_intra_enabled_flag indicates whether tu_mts_flag is present in the residual coding syntax of the intra coding unit. For example, if sps_mts_intra_enabled_flag=0, tu_mts_flag does not exist in the residual coding syntax of the intra coding unit, and if sps_mts_intra_enabled_flag=0, tu_mts_flag is present in the residual coding syntax of the intra coding unit. And, sps_mts_inter_enabled_flag indicates whether tu_mts_flag is present in the residual coding syntax of the inter coding unit. For example, if sps_mts_inter_enabled_flag=0, tu_mts_ flag does not exist in the residual coding syntax of the inter coding unit, and if sps_mts_inter_enabled_flag=0, tu_mts_flag is present in the residual coding syntax of the inter coding unit.

The decoder may acquire tu_mts_flag based on sps_mts_intra_enabled_flag or sps_mts_inter_enabled_flag (S1120). For example, when sps_mts_intra_enabled_flag=1 or sps_mts_inter_enabled_flag=1, the decoder may acquire tu_mts_flag. Here, tu_mts_flag indicates whether multiple transform selection (hereinafter referred to as "MTS") is applied to the residual samples of the luma transform block. For example, if tu_mts_flag=0, the MTS is not applied to the residual samples of the luma transform block, and if tu_mts_flag=1, the MTS is applied to the residual samples of the luma transform block.

As another example, at least one of the embodiments of this document may be applied to the tu_mts_flag.

The decoder may obtain mts_idx based on tu_mts_flag (S1130). For example, when tu_mts_flag=1, the decoder may obtain mts_idx. Here, mts_idx indicates which transform kernel is applied to luma residual samples in the horizontal and/or vertical directions of the current transform block.

For example, for mts_idx, at least one of the embodiments of the present document may be applied. As a specific example, at least one of the embodiments of FIG. 6 may be applied.

The decoder may derive a transform kernel corresponding to mts_idx (S1140). For example, the transform kernel corresponding to the mts_idx may be defined separately for the horizontal transform and vertical transform.

As another example, different transform kernels may be applied to the horizontal transform and the vertical transform. However, the disclosure is not limited thereto, and the same transform kernel may be applied to the horizontal transform and the vertical transform.

In an embodiment, mts_idx may be defined as shown in Table 1-1 below.

TABLE 1-1

| mts_idx[ x0 ][ y0 ] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

The decoder may perform an inverse transform based on the transform kernel (S1150).

In FIG. 11, an embodiment of determining a transform kernel by acquiring tu_mts_flag in order to determine whether to apply MTS and then acquiring mts_idx according to the acquired tu_mts_flag value is mainly described, but the disclosure is not limited thereto. For example, the decoder may determine a transform kernel by directly parsing mts_idx without parsing tu_mts_flag. In this case, Table 1 described above may be used. That is, if the mts_idx value indicates 0, DCT-2 is applied in the horizontal/vertical direction, and if the mts_idx value indicates a value other than 0, DST-7 and/or DCT-8 may be applied according to the mts_idx value.

In another embodiment of the disclosure, a decoding process for performing a transform process is described.

The decoder may identify the transform size (nTbS) (S10). Here, the transform size nTbS may be a variable representing the horizontal sample size of the scaled transform coefficients.

The decoder may identify the transform kernel type (trType) (S20). Here, the transform kernel type (trType) may be a variable indicating the type of the transform kernel, and various embodiments of this document may be applied. The transform kernel type (trType) may include a horizontal transform kernel type (trTypeHor) and a vertical transform kernel type (trTypeVer).

Referring to Table 1-1, the transform kernel type (trType) being 0 may indicate DCT2, 1 may indicate DST7, and 2 may indicate DCT8.

The decoder may perform a transform matrix multiplication based on at least one of the transform size (nTbS) or the transform kernel type (S30).

As another example, if the transform kernel type is 1 and the transform size is 4, a predetermined transform matrix 1 may be applied when performing transform matrix multiplication.

As another example, if the transform kernel type is 1 and the transform size is 8, a predetermined transform matrix 2 may be applied when performing transform matrix multiplication.

As another example, if the transform kernel type is 1 and the transform size is 16, a predetermined transform matrix 3 may be applied when performing transform matrix multiplication.

As another example, if the transform kernel type is 1 and the transform size is 32, a predefined transform matrix 4 may be applied.

Similarly, if the transform kernel type is 2 and the transform size is 4, 8, 16, or 32, each of the predefined transform matrixes 5, 6, 7, and 8 may be applied, respectively.

Here, each of the predefined transform matrixes 1 to 8 may correspond to any one of various types of transform matrixes. As an example, a transform matrix of the type illustrated in FIG. 6 may be applied.

The decoder may derive a transform sample (or transform coefficient) based on transform matrix multiplication (S40).

Each of the above embodiments may be used, but the disclosure is not limited thereto, and the above-described embodiments may be combined with other embodiments of the present specification.

FIG. 12 is a table showing that a transform set is allocated for each intra prediction mode in NSST according to an embodiment of the disclosure.

The secondary transform unit may apply a secondary transform to the primary-transformed signal, wherein the secondary transform may be previously defined as a table in the encoder and/or the decoder.

In an embodiment, in the secondary transform, a non-separable secondary transform (hereinafter referred to as 'NSST') may be conditionally applied. For example, the NSST may be applied only to intra prediction blocks and may have a transform set applicable to each prediction mode group.

Here, the prediction mode group may be set based on the symmetry for the prediction direction. For example, since prediction mode 52 and prediction mode 16 are symmetrical with respect to prediction mode 34 (diagonal direction), they may form one group and the same transform set may be applied thereto. Upon applying a transform on prediction mode 52, the transform is applied after transposing input data and this is why it has the same transform set as prediction mode 16.

Meanwhile, since the planar mode and DC mode lack directional symmetry, they have their respective transform sets, and each transform set may consist of two transforms. For the other directional modes, each transform set may consist of three transforms. However, the disclosure is not limited thereto, and each transform set may include a plurality of transforms.

In an embodiment, a transform set table different from that shown in FIG. 12 may be defined. For example, as shown in Table 1-2 below, a transform set may be determined from a table predefined according to an intra prediction mode (or an intra prediction mode group). A syntax indicating a specific transform within the transform set determined according to the intra prediction mode may be signaled from the encoder to the decoder.

TABLE 1-2

| IntraPredMode | Tr. set index |
| --- | --- |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |

TABLE 1-2-continued

| IntraPredMode | Tr. set index |
| --- | --- |
| 24 <= IntraPredMode <= 44 | 3 |
| 45 <= IntraPredMode <= 55 | 2 |
| 56 <= IntraPredMode | 1 |

Referring to Table 1-2, a predefined transform set may be allocated to grouped intra prediction modes (or intra prediction mode group). Here, the IntraPredMode value may be a mode value transformed in consideration of Wide Angle Intra Prediction (WAIP).

FIG. 13 is a calculation flow diagram for givens rotation according to an embodiment of the disclosure.

In an embodiment, the NSST may not be applied to the entire primary-transformed block, but may be applied only to a top-left 8×8 region. For example, if the block size is 8×8 or more, 8×8 NSST may be applied, and if it is less than 8×8, 4×4 NSST may be applied. In the latter case, after divided into 4×4 blocks, the 4×4 NSST may be applied to each.

In another embodiment, the 4×4 NSST may be applied even when 4×N/N×4 (N>=16).

Both 8×8 NSST and 4×4 NSST follow the transform combination configuration described in the disclosure and, since they are non-separable transforms, the 8×8 NSST receives 64 pieces of data and outputs 64 pieces of data, and the 4×4 NSST has 16 inputs and 16 outputs.

Both 8×8 NSST and 4×4 NSST consist of hierarchical combinations of givens rotations. A matrix corresponding to one givens rotation is shown in Equation 4 below, and the matrix product is shown in Equation 5 below.

$$R_\theta = \begin{bmatrix} \cos\theta & -\sin\theta \\ \sin\theta & \cos\theta \end{bmatrix}$$ [Equation 4]

$$t_m = x_m \cos\theta - x_n \sin\theta$$
$$t_n = x_m \sin\theta + x_n \cos\theta$$ [Equation 5]

As shown in FIG. 13, since one givens rotation rotates two pieces of data, in order to process 64 pieces of data (for 8×8 NSST) or 16 pieces of data (for 4×4 NSST), each requires a total of 32 or 8 givens rotations.

Thus, a bundle of 32 or 8 givens rotations forms a givens rotation layer. Output data for one givens rotation layer is transmitted as input data for the next givens rotation layer through a predetermined permutation.

FIG. 14 shows a one-round configuration in a 4×4 NSST composed of a givens rotation layer and permutations according to an embodiment of the disclosure.

FIG. 14 shows an example in which for 4×4 NSST, four givens rotation layers are sequentially processed. As shown in FIG. 14, output data for one givens rotation layer is transferred as input data for a next givens rotation layer through predetermined permutation (i.e., shuffling).

As shown in FIG. 14, the pattern permutated is regularly determined, and in the case of 4×4 NSST, four givens rotation layers and their corresponding permutations are combined to form one round.

In the case of 8×8 NSST, 6 givens rotation layers and their corresponding permutations form one round. 4×4 NSST goes through 2 rounds, and 8×8 NSST goes through 4 rounds. Although different rounds use the same permutation pattern, different givens rotation angles are applied. Thus, it is needed to store the angle data for all the givens rotations constituting each transform.

In the last step, final one more transform is performed on the data output via the givens rotation layers, and information for the permutation is stored separately for each transform. In the forward NSST, the corresponding permutation is performed last, and in the inverse NSST, the corresponding inverse permutation is applied first.

The inverse NSST performs, in inverse order, the givens rotation layers and the permutations applied to the forward NSST and takes a minus (−) value for the angle of each givens rotation and rotates.

FIG. 15 is a block diagram illustrating operations of a forward reduced transform and inverse reduced transform according to an embodiment of the disclosure.

Assuming that the orthogonal matrix representing one transform has an N×N form, the reduced transform (hereinafter referred to as an 'RT') leaves only R basis vectors among the N transform basis vectors (R<N). The matrix for the forward RT that generates the transform coefficients is given as in Equation 6 below.

$$T_{R \times N} = \begin{bmatrix} t_{11} & t_{12} & t_{13} & & t_{1N} \\ & & \cdots & & \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$ [Equation 6]

Since the matrix for the inverse RT becomes a transpose matrix of the forward RT matrix, the application of the forward RT and the inverse RT is schematically shown in FIG. 15 above.

Assuming that RT is applied to the top left 8×8 block of the transform block that has undergone the primary transform, the RT may be referred to as an 8×8 reduced secondary transform (8×8 RST).

When R is 16 in Equation 6, the forward 8×8 RST has a 16×64 matrix form, and the inverse 8×8 RST has a 64×16 matrix form.

The same transform set configuration as in FIG. 12 may be applied to the 8×8 RST as well. That is, a corresponding 8×8 RST may be applied according to the transform set in FIG. 12.

In one embodiment, when one transform set in FIG. 12 is composed of two or three transforms according to the intra prediction mode, one of up to four transforms including the one where the secondary transform is not applied may be selected. Here, one transform may be seen as an identity matrix.

When indexes 0, 1, 2, and 3, respectively, are assigned to the four transforms, a syntax element referred to as NSST index may be signaled for each transform block, designating a corresponding transform. That is, for the top left 8×8 block, the 8×8 NSST in the case of NSST and 8×8 RST in the case of RST configuration may be designated via the NSST index. Further, in this case, index 0 may be assigned to the identity matrix, i.e., when no secondary transform is applied.

When the forward 8×8 RST as shown in Equation 6 is applied, 16 effective transform coefficients are generated, so that the 64 pieces of input data constituting the 8×8 region may be regarded as reduced to 16 pieces of output data. From the perspective of the 2D area, only ¼ of the area is filled with effective transform coefficients. Therefore, the top left region as shown in FIG. 16 may be filled with 16 pieces of output data obtained by applying the forward 8×8 RST.

FIG. 16 is a view illustrating a process of performing an inverse scans from the 64th to 17th according to an inverse scan order according to an embodiment of the disclosure.

FIG. 16 shows an example in which scanning is performed from the 17th coefficient to the 64th coefficient (in the forward scan order) when the forward scan order starts from 1. However, since FIG. 16 shows an inverse scan, this indicates that the inverse scan is performed from the 64th to 17th.

Referring to FIG. 16, the top left 4×4 region is a region of interest (ROI) to which an effective transform coefficient is allocated, and the remaining regions are empty. That is, the remaining regions may be filled with 0's as default.

If there is a non-zero effective transform coefficient in any region other than the ROI region of FIG. 16, this means that the 8×8 RST is not applied and, in such a case, the corresponding NSST index coding may be omitted.

Conversely, if there is no non-zero transform coefficient in a region other than the ROI region of FIG. 16 (when 0's are assigned for the other regions than the ROI region when 8×8 RST is applied), there is a possibility that 8×8 RST has been applied, so that the NSST index may be coded.

As such, conditional NSST index coding may be performed after the residual coding process because it is required to check the presence or absence of a non-zero transform coefficient.

The disclosure proposes a method for reducing complexity by removing unnecessary operations and simplifying the structure by reducing the number of transform coefficients from N to R as when RT is applied while maintaining a givens rotation-based structure such as LGT or NSST.

Further, since the feature of reducing the number of effective transform coefficients is the same as that of RST, the same or similar method as RST may be applied to NSST index coding or residual coding.

FIG. 17 shows an example of displaying only permutation and calculation information involving an effective transform coefficient output when only half of the transform coefficients are selected after the last givens rotation layer and permutation according to an embodiment of the disclosure.

FIG. 18 shows an example of performing transform simplification by leaving only connection lines shown in FIG. 17, according to an embodiment of the disclosure.

In reduced secondary transform (RST), the number of transform coefficients may be reduced by decreasing the number of transform basis vectors and, thus, optimization may be carried out based on the fact that the number of transform coefficients generated is reduced even in the case of NSST index coding and residual coding. In particular, in RST, a transform having the form of a non-square matrix is configured by selecting only some of the corresponding transform basis vectors from transforms represented as a square matrix.

The method for reducing the number of generated transform coefficients is not limited to the type of transform. That is, as in RST, the number of transform coefficients generated after configuring a non-square matrix through selection of transform basis vectors from a square matrix may be reduced, or only some of the transform coefficients output from other forms of transforms may be taken to reduce the number of transform coefficients.

For example, the NSST has the structure in which N pieces of data are input and N pieces of data are output. However, instead of N, only L (<N) outputs may be taken, and the same or similar signaling and entropy coding optimization as the RST embodiment described above may be then applied thereto. The same method may be applied to LGT as well as NSST.

If only L outputs are left for NSST, the remaining (N-L) outputs become unnecessary, so that all computational operations for the (N-L) outputs may be removed. For example, if the last givens rotation layer is calculated as shown in FIG. 17 and only 8 outputs are selected (as indicated by bold lines) after permutation, it is possible to remove unnecessary operations as in FIG. 18.

If necessary, it is possible to remove unnecessary operations in a serial manner even in the previous givens rotation layers. That is, since $x_0$ and $x_8$ are unused data in FIG. 18, the operations related to generating $x_0$ and $x_8$ in the previous givens rotation layer may be removed.

As described in the RST embodiment, as the number of transform coefficients is reduced, when RST is applied, no non-zero transform coefficient exists in a specific region. That is, there are no effective transform coefficients.

Therefore, the following NSST index coding method is possible. Here, the NSST index may represent not only NSST but also any other type of transform.

1) When an NSST index is coded after residual coding, if a non-zero transform coefficient exists in the specific region (remaining blocks except for the top left 4×4 block in FIG. 16), the RST is not applied so that the NSST index may not be coded.

2) Where the NSST index is coded before the residual coding ends, if it is identified whether the RST is applied through the NSST index, it is not necessary to code all information on the transform coefficient for the specific region. In relation thereto, two coding schemes are possible as follows.

2-1) When NSST index coding is performed prior to coding for the last non-zero transform coefficient location, significance map information (e.g., sig_coeff_flag) is not transmitted for the specific region.

2-2) When NSST index coding is performed later than coding for the last non-zero transform coefficient position, whether or not to perform NSST index coding may be determined according to the position of the last non-zero transform coefficient. That is, since the RST is not applied when the position of the last non-zero transform coefficient position is in the specific region, NSST index coding may be omitted. Further, when the position of the last non-zero transform coefficient comes into a certain area (e.g., when (0,0) indicates a DC position it is located inside the top left 2×2 region), RST may be considered not to be applied and NSST Index coding may be omitted.

In terms of reducing the number of generated transform coefficients, the NSST index coding method for RST may also be applied to LGT or NSST.

The disclosure will be described below using a square block of N×N pixels. However, the disclosure is not limited thereto, and may be extended to data of non-square blocks, multiple dimensions, and non-pixel types, as well as square blocks. Thus, a more adaptive transform may be carried out.

In order to apply a non-separable transform, two-dimensional data blocks (or two-dimensional arrays) may be arranged in a one-dimensional array. For example, blocks having a size of 4×4 may be arranged in a row-first lexicographic order. Further, they may be arranged in column order in each row. Alternatively, they may be arranged in a column-first order. However, the disclosure is not limited thereto, and the encoder/decoder may arrange the 2D blocks in a 1D array in various ways other than the lexicographic order.

In the disclosure, the layered givens transform may be applied to any N×N transform. In general, non-separable transforms have higher compression performance than separable transforms, but are difficult to implement quickly and require high computational complexity. The layered givens transform may be applied to separable transforms or non-separable transforms.

When a data vector x is given, a vector y that satisfies y=P*x may be obtained by shuffling the elements of the vector x. Here, the permutation matrix P is an orthogonal matrix and satisfies Equation 7 below.

$$P^T P = I \quad \text{[Equation 7]}$$

The encoder/decoder may shuffle the data vector by applying a permutation matrix. By performing such shuffling, subsequent operations may be efficiently performed. For example, the non-zero transform coefficients may be concentrated in a specific region through shuffling.

LGT may be expressed as Equation 8 below.

$$G = G_M G_{M-1} \ldots G_2 G_1 P_0$$

$$G^T = P_0^T T G_1^T G_2^T \ldots G_{M-1}^T G_M^T \quad \text{[Equation 8]}$$

Matrix G represents the inverse LGT, and $G^T$ represents the forward LGT. Here, $G_i$ (i=1,2, . . . , M) is the givens rotation layer (or a rotation layer, or a rotation matrix), and $P_0$ is the permutation layer (or permutation matrix). The integer M may have an arbitrary value, such as 1, 2, 5, 10, log N, or N, for example. All matrixes of Equation 8 may be N×N square matrixes.

$G_i$ may be expressed as Equations 9 and 10 below.

$$G_i = Q_i^T T_i Q_i, i = 1, 2, \ldots, M \quad \text{[Equation 9]}$$

$$T_i = \begin{bmatrix} R_{i,0} & 0 & \cdots & 0 \\ 0 & R_{i,1} & \cdots & 0 \\ \cdots & \cdots & \cdots & \cdots \\ 0 & 0 & \cdots & R_{i,\frac{N}{2}-1} \end{bmatrix}, R_{i,j} = \begin{bmatrix} \cos\theta_{i,j} & -\sin\theta_{i,j} \\ \sin\theta_{i,j} & \cos\theta_{i,j} \end{bmatrix} \quad \text{[Equation 10]}$$

Here, Qi is the permutation matrix, and Ri,j is the pairwise rotation matrix (i.e., givens rotation matrix). That is, the givens rotation layer Gi may be composed of a combination of a permutation matrix and a rotation matrix.

In Equation 8, Gi may be decomposed as in Equations 9 and 10, Qi is the permutation matrix, Ti is the block diagonal matrix that performs givens rotation with each two pieces of input data paired, and Ri,j is the pairwise rotation matrix (i.e., givens rotation matrix).

Assuming that the output data y is obtained when the forward LGT is applied to the input data x (N×1 vector) from Equation 8, the equation of $y=G^T x$ is established. The output data vector y becomes an N×1 vector, and if only L data elements among the N data elements are left (that is, only L transform coefficients are left), the output vector is y' which is the L×1 vector, and y' may be expressed as in Equation 11 below.

$$y' = G^T x = P_0' G_1^T G_2^T \ldots G_{M-1}^T G_M^T x \quad \text{[Equation 11]}$$

$P_0' = M_0 P_0^T$, where $M_0$ is an L×M matrix

Here, $M_0$ represents a matrix for selecting L inputs among N inputs, and duplicate selection is not allowed. For (N, L)=(4, 2), an example of $M_0$ is given as in Equation 12 below.

$$M_0 = \begin{bmatrix} 1 & 0 & 0 & 0 \\ 0 & 1 & 0 & 0 \end{bmatrix}$$ [Equation 12]

The example of Equation 12 shows a case where L transform coefficients appearing first are selected, and this may be generalized and expressed as Equation 13 below.

$$M_0 = [I_L 0_{L \times (N-L)}]$$ [Equation 13]

Here, $I_L$ represents the L×L identity matrix, and $0_{L \times (N-L)}$ represents the L×(N-L) zero matrix.

Since Gi in Equation 11 is the same as that in Equation 8, it may be seen as performed in the same manner as the existing LGT except for the last $P_0'$ permutation.

However, since only L outputs of the total N outputs are left, unnecessary operations that are not related to the L outputs may be removed as in the first embodiment, thereby reducing the amount of calculation compared to the case of using the N outputs as they are.

Upon designing the forward LGT to obtain the L×1 vector y' using the N×1 vector x as an input, the number of outputs may be gradually reduced whenever undergoing $G_i^T$ unlike in Equation 11 above.

Thus, when the number of inputs for $G_i^T$ is $N_i$, and the number of outputs is $N_{i-1}$, $G_i^T$ may be represented as in Equation 14 below ($N_i \leq N_{i-1}$).

$$G_i^T = Q_i^T T_i^T Q_i = M_i Q_i^T T_i^T Q_i$$ [Equation 14]

Here, $M_i$ plays a role to select $N_{i-1}$ outputs among the $N_i$ outputs obtained by applying $Q_i^T T_i^T Q_i$ as the $N_{i-1} \times N_i$. $M_i$ may also be configured to select the first $N_{i-1}$ outputs as shown in Equation 15, like in Equation 13 above.

$$M_i = [I_{N_{i-1}} 0_{N_{i-1} \times (N_i - N_{i-1})}]$$ [Equation 15]

In Equation 14, to meet the relationship $L = N_0 \leq N_1 \leq \ldots \leq N_{M-1} \leq N_M = N$, $N_i$ may be configured. Assuming that $M_i$ is fixed (matrixes for which outputs are selected in each Gi step), it is enough to store only information about $Q_i$, $T_i$, and $P_0$ so as to specify the LGT. $Q_i$ may be regarded as permutation information with Ni entries (Ni×Ni permutation matrix), $T_i$ may be specified by Ni/2 angles, and $P_0$ is (as the L×L permutation matrix, it has only one 1 for each row and column) is the permutation information with L position values. Based on Equation 14, $G^T$ may be expressed as Equation 16 below.

$$\begin{aligned}
G^T &= P_0 G_1^T G_2^T \cdots G_{M-1}^T G_M^T = \\
&\quad P_0 (M_1 Q_1^T T_1^T Q_1)(M_2 Q_2^T T_2^T Q_2) \cdots \\
&\quad (M_{M-1} Q_{M-1}^T T_{M-1}^T Q_{M-1})(M_M Q_M^T T_M^T Q_M) \\
&= (P_0 M_1 Q_1^T) \cdot T_1^T \cdot (Q_1 M_2 Q_2^T) \cdot T_2^T \cdot \\
&\quad (Q_2 M_3 Q_3^T) \cdot \ldots \cdot (Q_{M-2} M_{M-1} Q_{M-1}^T) \cdot \\
&\quad T_{M-1}^T \cdot (Q_{M-1} M_M Q_M^T) \cdot T_M^T \cdot Q_M \\
&= P_0' \cdot T_1^T \cdot P_1 \cdot T_2^T \cdot P_2 \cdot \ldots \cdot P_{M-2} \cdot \\
&\quad T_{M-1}^T \cdot P_{M-1} \cdot T_M^T \cdot P_M
\end{aligned}$$ [Equation 16]

Here, $P_0'$ is the L×N1 matrix, $P_i$ is the $N_i \times N_{i+1}$ matrix, and $P_M$ is the N×N. The $P_0'$, $P_i$, and $P_M$ matrixes play a role to select some (L, $N_i$, and N, respectively) among all the inputs, and may be expressed as L, $N_i$, and N position values, respectively. In this case, the input index value selected per output may be regarded as a position value.

Thus, as in Equation 16, one LGT may also be specified with $P_0'$, $P_i$ (i=1, 2, ..., M-1), $P_M$, and $T_i^T$ (i=1, 2, ..., M) and, for $T_i^T$ (i=1, 2, ..., M), each may be represented with $N_i/2$ angles.

Further, in Equation 16 above, if $M_i$ (i=1, 2, ..., M) is the same as in the N×N identity matrix, it becomes identical to the LGT so that the LGT may also be specified with P0', Pi (i=1, 2, ..., M-1), $P_M$, and $T_i^T$ (i=1, 2, ..., M) as in Equation 16.

According to an embodiment, in the case where (N, L)=(64, 16), if No to NM are all even numbers, a non-decreasing sequence with a length of M+1 which starts with 16 and ends with 64 may be assigned from $N_0$ to $N_M$. As an example where M=12, $N_0$ to $N_M$ may be set as in Equation 17 below.

1) $(N_0, N_1, N_2, N_3, N_4, N_5, N_6, N_7, N_8, N_9, N_{10},$ [Equation 17]

$N_{11}, N_{12}) = (16, 16, 16, 16, 16,$ $16, 16, 64, 64, 64, 64, 64, 64)$

2) $(N_0, N_1, N_2, N_3, N_4, N_5, N_6, N_7, N_8, N_9,$ $N_{10}, N_{11}, N_{12}) = (16, 20, 24, 28,$ $32, 36, 40, 44, 48, 52, 56, 60, 64)$

3) $(N_0, N_1, N_2, N_3, N_4, N_5, N_6, N_7, N_8,$ $N_9, N_{10}, N_{11}, N_{12}) =$ $(16, 16, 16, 16, 16, 40, 40, 40, 40, 64, 64, 64, 64)$

In this case, any even-numbered non-decreasing sequence starting with 16 and ending with 64 is also possible. For such a non-decreasing sequence, $P_0'$, $P_i$ (i=1, 2, ..., M-1), $P_M$, and $T_i^T$ (i=1, 2, ..., M) in Equation 16 may be set, and $P_0$, $M_i$, $Q_i$, and $T_i$ (i=1, 2, ..., M) in Equation 16 may be set.

As described above, since some of the outputs of each givens rotation layer are selected by Mi, operations that are not related to the selected outputs may be removed, and the number of the rotations constituting $T_i^T$ may also be reduced as compared with the LGT for which the number of input data is the same as the number of output data, as described above in connection with FIGS. 17 and 18, so that the overall computational amount is decreased.

As an example of $M_i$, it may be configured to sequentially select output values appearing first as in Equation 15 above. $M_i$ has only one element which is 1 for each row and, for each column, it may only one or more elements which are 1's.

FIG. 19 is a flowchart illustrating an example of encoding a video signal based on a reduced rotation-based transform according to an embodiment of the disclosure.

The encoder performs a forward primary transform on the current residual block (S1910). The forward primary transform may be referred to as a primary transform or a core transform. As an embodiment, the encoder may perform the forward primary transform using the above-described MTS. Further, the encoder may transmit an MTS index indicating a specific MTS among MTS candidates to the decoder. In this case, the MTS candidate may be configured based on the prediction mode of the current block.

Further, as an embodiment, a secondary transform determination method may be determined depending on the primary transform determination method. Various combinations of the primary transform and the secondary transform may be determined according to the intra prediction mode.

The encoder may rearrange the 2D blocks according to the result of the primary transform into a 1D signal. In this case, they may be arranged in row-first or column-first order.

The encoder performs a forward secondary transform using the reduced rotation-based transform (S1920). The 1D signal output as a result of the forward secondary transform may be rearranged into 2D blocks.

The encoder may perform quantization on the rearranged 2D blocks (S1930).

An embodiment of the disclosure provides a method for encoding a video signal based on a reduced rotation-based transform.

The encoder may perform a forward primary transform on the current residual block.

By using the reduced rotation-based transform, it is possible to perform a forward secondary transform on the blocks which have undergone the forward primary transform. Here, the reduced rotation-based transform means a transform by which N pieces of residual data (N×1 residual vectors) are input, and L (L<N) pieces of transform coefficient data (L×1 transform coefficient vectors) are output.

According to an embodiment, the reduced rotation-based transform may include a givens rotation transform obtained by at least one permutation unit and a plurality of givens rotation layers.

Quantization and entropy encoding may be performed on the blocks which have undergone the forward secondary transform.

In an embodiment, the encoder may determine whether to encode the transform index of the current residual block based on the position of the last non-zero transform coefficient in the current residual block. In this case, the transform index corresponds to the reduced rotation-based transform.

In an embodiment, if the last non-zero transform coefficient is located in a specific region, the transform index is not coded, otherwise, the transform index is coded. In this case, when the current residual block is N×N, if the reduced rotation-based transform is applied, the specific region represents the remaining regions except for a position where a non-zero transform coefficient may exist when the transform coefficients are arranged according to a scan order.

An embodiment of the disclosure provides a device for encoding a video signal based on a reduced rotation-based transform.

The encoder may include: a transform unit that performs a forward primary transform on a current residual block and performs a forward secondary transform on the block which has undergone the forward primary transform by using the reduced rotation-based transform; a quantization unit that performs quantization on the block which has undergone the forward secondary transform; and an entropy encoding unit that performs entropy encoding on the quantized block.

Here, the reduced rotation-based transform means a transform by which N pieces of residual data (N×1 residual vectors) are input, and L (L<N) pieces of transform coefficient data (L×1 transform coefficient vectors) are output. The reduced rotation-based transform includes a givens rotation transform obtained by at least one permutation unit and a plurality of givens rotation layers.

FIG. 20 is a flowchart illustrating an example of decoding a video signal based on a reduced rotation-based transform according to an embodiment of the disclosure.

The decoder performs inverse quantization on the transform coefficient block (S2010).

The decoder performs an inverse secondary transform using the reduced rotation-based transform (S2020).

Here, the inverse secondary transform has the same structure as the forward secondary transform using the reduced rotation-based transform of FIG. 19, but applies the givens rotation layer units and the permutation units in an opposite order of the forward secondary transform.

Each givens rotation layer in the inverse secondary transform has an opposite rotation angle compared to the corresponding givens rotation layer in the forward secondary transform. That is, if each givens rotation angle constituting the givens rotation layer in the forward secondary transform is θ, the corresponding givens rotation angle in the inverse secondary transform becomes −θ.

Further, if the N×N matrix representing one permutation unit in the forward secondary transform is P (assuming N inputs and N outputs), the matrix representing the corresponding permutation unit in the inverse secondary transform becomes PT. However, since P may not be a square matrix, multiplying P may reduce the number of outputs, whereas multiplying $P^T$ may increase the number of outputs.

More specifically, if indexes for the givens rotation layers in the forward secondary transform are 1 to L and are applied in the order of 1 to L, they are applied in the order of L to 1 in the inverse secondary transform and, for application to the permutation blocks, they are applied in the opposite direction.

The decoder performs an inverse primary transform on the result of the inverse secondary transform (S2030).

An embodiment of the disclosure provides a method for reconstructing a video signal based on a reduced rotation-based transform.

The decoder may obtain a transform block by performing entropy decoding and inverse quantization on the current block.

The decoder may perform an inverse secondary transform on the transform block by using the reduced rotation-based transform. Here, the reduced rotation-based transform means a transform by which N pieces of residual data (N×1 residual vectors) are input, and L (L<N) pieces of transform coefficient data (L×1 transform coefficient vectors) are output. The reduced rotation-based transform includes a givens rotation transform obtained by at least one permutation unit and a plurality of givens rotation layers.

The decoder may perform an inverse primary transform on the block that has undergone the inverse secondary transform.

The decoder may reconstruct the video signal using the block which has undergone the inverse primary transform.

In an embodiment, the decoder may further include the steps of obtaining a transform index of the current block from the video signal and deriving a reduced rotation-based transform corresponding to the transform index. Here, whether to obtain the transform index may be determined based on the position of the last non-zero transform coefficient.

In an embodiment, if the last non-zero transform coefficient is located in a specific region, the transform index is not coded, otherwise, the transform index is coded. In this case, when the current block is N×N, if the reduced rotation-based transform is applied, the specific region represents the remaining regions except for a position where a non-zero transform coefficient may exist when the transform coefficients are arranged according to a scan order.

In one embodiment, the decoder may obtain the transform index of the current block from the video signal and derive a transform combination corresponding to the transform index. Here, the transform index corresponds to any one of a plurality of transform combinations composed of a combination of DST7 and/or DCT8. The transform combination is composed of a horizontal transform and a vertical transform, and the horizontal transform and the vertical transform correspond to either the DST7 or the DCT8. In this case, the reverse primary transform is performed using the transform combination.

Further, the embodiments of FIG. 6 may be applied to the transform combination.

An embodiment of the disclosure provides a device for reconstructing a video signal based on a reduced rotation-based transform.

The device may include a transform unit that obtains a transform block by performing entropy decoding and inverse quantization on the current block, performs an inverse secondary transform on the transform block using the reduced rotation-based transform, and performs the inverse primary transform on the block that has undergone the inverse secondary transform and a reconstruction unit that reconstructs the current block by using the block which has undergone the inverse primary transform.

Here, the reduced rotation-based transform means a transform by which N pieces of residual data (N×1 residual vectors) are input, and L (L<N) pieces of transform coefficient data (L×1 transform coefficient vectors) are output. The reduced rotation-based transform includes a givens rotation transform obtained by at least one permutation unit and a plurality of givens rotation layers.

A method for designing/deriving a layered givens transform (LGT) will be described below in more detail.

Transform coding is one of the most important tools used for current image and video compression. A transform coefficient is generated by linearly transforming data using a transform. The generated transform coefficient is quantized and entropy-encoded and then transmitted to a decoder. The decoder reconstructs data by performing entropy decoding and dequantization and then inverse-transforming the transform coefficient using an inverse transform. In general, a transform is selected as an orthonormal transform that accepts a simple inverse transform and quantization. In particular, in the case of image and video data, it is very common to use a separable discrete cosine transform (DCT), a discrete sine transform (DST) and other similar transforms.

As an example, in the case of data of an N×N block, in general, a separable transform may require computation of N3. On the other hand, if taking the case where DCT-2 transform is used as an example, when a separable transform used has a fast implementation, a computation count may be reduced to N2*log N.

In order to improve compression efficiency, it is important to make a transform coefficient independent statistically by designing the statistics of input data so that the statistics are matched more effectively. For example, compression can be improved using a Karhunen-Loeve transform (KLT) or a sparse orthonormal transform (SOT). However, such a transform corresponds to a non-separable transform having a difficult fast implementation. That is, if such a non-separable transform is to be applied, N4 computation is necessary.

The present invention proposes a method of designing a version having easy computation of a general transform. Specifically, the present invention proposes a method of designing a layered Givens transform (LGT) approximate to a target transform when the target transform is given.

According to the present invention, a transform having the same or similar compression efficiency as or to a given target transform in significantly reduced computational complexity compared to the target transform can be designed.

Hereinafter, the present invention will be described using a square block of N×N pixels. However, the present invention is not limited thereto and may be extended to non-square blocks, data of multiple dimensions and a non-pixel type in addition to the square block. Accordingly, a more adaptive transform can be performed.

In the present invention, a target transform H applicable to an N×N block may be approximated by a layered Givens transform configured with a combination of a rotation layer and a permutation layer. In the present invention, the layered Givens transform may be called a layered transform, but the present invention is not limited to the term.

Definition of Layered Givens Transform (LGT)

Hereinafter, a matrix expression of an N×N image or video block and transform is described. In the description of the present invention, it is assumed that N2 is an even number, for convenience of description.

FIG. 21 is an embodiment to which the present invention is applied and is a diagram illustrating a method of arranging two-dimensional data blocks in the form of a one-dimensional array.

In order to apply a non-separable transform, two-dimensional (or two-dimensional array) data blocks may be arranged in the form of a one-dimensional array. For example, blocks of a 4×4 size may be arranged in row-first lexicographic order, as shown in FIG. 21. Furthermore, the blocks may be arranged in column order within each row. Although not shown in FIG. 21, the blocks may be arranged in column-first order. However, the present invention is not limited thereto. The encoder/decoder may arrange two-dimensional blocks in the form of a one-dimensional array using various methods in addition to the lexicographic order.

In the present invention, a layered Givens transform may be applied to a given N×N transform. In general, a non-separable transform has high compression performance compared to a separable transform, but has a difficult fast implementation and requires high computational complexity. Accordingly, embodiments of the present invention are described based on a case where a target transform is a non-separable transform, but the present invention is not limited thereto. That is, a layered Givens transform may be applied to a separable transform and may be applied to a non-separable transform.

A general non-separable transform H applicable to an N×N block may be represented as an N2×N2 matrix. A method proposed in the present invention may be used to approximate a non-orthogonal transform, but it is assumed that a target transform H satisfies orthonormal, that is, Equation 1 below, for convenience of description.

$$H^T H = I, \qquad \text{[Equation 18]}$$

In this case, HT indicates a transpose matrix of H, and I indicates an identity matrix of N2×N2. Furthermore, an N2×N2 permutation matrix P is an orthonormal matrix and satisfies Equation 19.

$$P^T P = I, \qquad \text{[Equation 19]}$$

Each row of P may include a single element not 0. When a data vector x is given, a vector y satisfying y=P*x may be obtained by shuffling the elements of the vector x.

FIG. 22 is an embodiment to which the present invention is applied and is a diagram illustrating an example in which a permutation matrix is applied.

The encoder/decoder may shuffle data vectors by applying a permutation matrix as shown in FIG. 22. Subsequent computation can be efficiently performed by performing such shuffling. For example, non-zero coefficients may be concentrated on a specific area through shuffling.

The present invention proposes a method of finding a layered Givens transform G(N2×N2) approximated to H when the target transform H is given. G may be represented like Equation 20.

$$G = G_M G_{M-1} \ldots G_1 P_0 \qquad \text{[Equation 20]}$$

In this case, Gi(N2×N2) (wherein i=1,2, ..., M) is a Givens rotation layer (or rotation layer, rotation matrix), and P0(N2×N2) is a permutation layer (or permutation matrix). An integer M may have a given value, for example, 1, 2, 5, 10, log N, N. Gi may be represented like Equation 21.

$$G_i = P_i^T \begin{bmatrix} T_{i,1} & 0 & \cdots & 0 \\ 0 & T_{i,2} & & \\ \vdots & & \ddots & \\ 0 & & & T_{i,\frac{N^2}{2}} \end{bmatrix} P_i \qquad \text{[Equation 21]}$$

In this case, Pi(N2×N2) is a permutation matrix, and T(i,j) is a pairwise rotation matrix (i.e., Givens rotation matrix). That is, the Givens rotation layer Gi may be configured with a combination of the permutation matrix and the rotation matrix. T(i,j) is described based on the following drawing.

FIG. 23 is an embodiment to which the present invention is applied and is a diagram illustrating an example in which a rotation matrix is applied.

Referring to FIG. 23(a), the rotation matrix T(i,j) may be represented like Equation 22.

$$T_{i,j} = \begin{bmatrix} \cos(\theta_{i,j}) & \sin(\theta_{i,j}) \\ -\sin(\theta_{i,j}) & \cos(\theta_{i,j}) \end{bmatrix} \qquad \text{[Equation 22]}$$

Referring to FIG. 23(b), in an embodiment of the present invention, T(i,j), such as Equation 6, may be taken into consideration in order to permit reflection along with rotation (i.e., rotation plus reflection). That is, in an embodiment of the present invention, T(i,j) may form pairwise rotation and rotation plus reflection.

$$T_{i,j} = \begin{bmatrix} \sin(\theta_{i,j}) & \cos(\theta_{i,j}) \\ \cos(\theta_{i,j}) & -\sin(\theta_{i,j}) \end{bmatrix} \qquad \text{[Equation 23]}$$

FIG. 24 is a diagram illustrating an example of a transform to which the present invention is applied.

In an embodiment of the present invention, as shown in FIG. 24(a), T(i,j) may be configured as a general two-dimensional non-linear transform that receives two inputs and outputs two outputs.

Furthermore, in an embodiment of the present invention, as shown in FIG. 24(b), T(i,j) may be configured as a linear transform or non-linear transform having two or more dimensions.

Furthermore, as shown in FIG. 24, the LGT of the present invention may include a linear transform or non-linear transform of a two-dimensional or multi-dimension.

If Equation 22 or Equation 23 is used, the rotation matrix Ti may be represented like Equation 24.

$$T_i = \begin{bmatrix} T_{i,1} & 0 & \cdots & 0 \\ 0 & T_{i,2} & & \\ \vdots & & \ddots & \\ 0 & & & T_{i,\frac{N^2}{2}} \end{bmatrix} \qquad \text{[Equation 24]}$$

A forward general transform (i.e., target transform H) may obtain a transform coefficient general using Equation 25 with respect to the data vector x.

$$c_{general} = H^T x \qquad \text{[Equation 25]}$$

Meanwhile, the LGT may obtain an LGT transform coefficient cLGT using Equation 26.

$$c_{LGT} = G^T x = P_0^T G_1^T \ldots G_M^T x \qquad \text{[Equation 26]}$$

An inverse transform of the transform coefficient generated by Equation 8 and Equation 9 may be performed by Equation 27.

$$x = Hc_{general}$$

$$x = Gc_{iGT} = G_M \ldots G_1 P_0 c_{iGT} \qquad \text{[Equation 27]}$$

FIG. 25 is an embodiment to which the present invention is applied and is a diagram illustrating a method of applying forward and backward layered Givens transforms.

Referring to FIG. 25(a), the encoder may obtain an LGT transform coefficient by applying a forward LGT transform. Specifically, the encoder may obtain an LGT transform coefficient by sequentially applying a rotation layer and a permutation layer to input data x, as shown in FIG. 25(a).

Referring to FIG. 25(b), the encoder/decoder may reconstruct x by applying a backward LGT transform to the LGT transform coefficient. Specifically, the decoder may reconstruct (or obtain) x by sequentially applying a permutation layer and a rotation layer to the LGT transform coefficient, as shown in FIG. 25(b).

FIG. 26 is an embodiment to which the present invention is applied and is a diagram illustrating a method of applying a rotation layer.

Referring to FIG. 26, a Givens rotation layer Gi may be configured with a combination of a permutation matrix and a rotation matrix. The encoder/decoder may apply the permutation matrix in order to efficiently apply pairwise rotation. The encoder/decoder may apply the rotation matrix to shuffled data and then reversely shuffle the shuffled data.

In an embodiment of the present invention, a target transform H may be a KLT, a sparse orthonormal transform (SOT), a curvelet transform, a contourlet transform or a complex wavelet transform.

Design of Layered Givens Transform (LGT)

When a target transform H is given, a layered Givens transform G may be designed using Equation 28.

$$\min_G \|H - G\|_F \qquad \text{[Equation 28]}$$

In this case, $\|\cdot\|_F$ indicates Frobenius norm. Equation 28 is an optimization problem of G matched with the target transform H. Assuming that Tr{A} is a trace of a matrix A, Equation 28 may be represented like Equation 29. In this case, the trace indicates the sum of diagonal components of the matrix.

$$\|H - G\|_F^2 = Tr\{H^T H\} - 2Tr\{H^T G\} + Tr\{G^T G\} \qquad \text{[Equation 29]}$$

As in the above assumption, Equation 29 may be arranged like Equation 30 because H and G are orthonormal.

$$\|H-G\|_F^2 = 2N^2 - 2Tr\{H^T G\} \qquad [\text{Equation 30}]$$

General minimization can be obtained by accommodating a weight vector w having a positive element. In this case, the weight vector indicates the importance of each basis vector (i.e., each column of H) within H. In this case, the importance may be determined based on the frequency of each component. Accordingly, when the weight vector W is taken into consideration, the minimization problem of Equation 28 may be represented like Equation 31.

$$\min_G \|(H-G)W\|_F \qquad [\text{Equation 31}]$$

In this case, the weight matrix W(N2×N2) may be represented like Equation 32.

$$W(k,l) = \begin{cases} w^{1/2}(k), & k = l \\ 0, & k \neq l \end{cases} \qquad [\text{Equation 32}]$$

The optimization problem of Equation 28 or Equation 31 comes down to the optimization problem of layers configuring a layered Givens transform. Hereinafter, a method of determining (or deriving) a permutation layer P0 is described.

Equation 31 may be arranged like Equation 33 using trace attributes.

$$\begin{aligned}\|(H-G)W\|_F^2 &= 2Tr\{W^T W\} - \\ & 2Tr\{W^T H^T G_M G_{M-1} \cdots G_1 P_0 W\} \\ &= 2Tr\{W^T W\} - \\ & 2Tr\{WW^T H^T G_M G_{M-1} \cdots G_1 P_0\}\end{aligned} \qquad [\text{Equation 33}]$$

In this case, it is assumed that other variables other than P0 have been fixed. A minimization problem of Equation 33 is a maximization problem of $2Tr\{WW^T H^T G_M G_{M-1} \cdots G_1 P_0\}$. In this case, P0 may be determined using a Hungarian algorithm. This is described based on the following drawing.

FIG. 27 is an embodiment to which the present invention is applied and is a diagram illustrating a method of determining a permutation layer using a Hungarian algorithm.

Referring to FIG. 27, the encoder/decoder may determine optimal assignment not overlapped between nodes using the Hungarian algorithm. Specifically, in Equation 33, $2Tr\{WW^T H^T G_M G_{M-1} \cdots G_1 P_0\}$ indicates the sum of diagonal matrices of $WW^T H^T G_M G_{M-1} \cdots G_1 P_0$. The encoder/decoder may calculate optimal assignment that maximizes the $WW^T H^T G_M G_{M-1} \cdots G_1 P_0$ through a Hungarian method.

In an embodiment of the present invention, a blossom method may be used to design a permutation matrix.

Hereinafter, a method of determining a Givens rotation layer Gi is described.

As described in Equation 20, the layered Givens transform G may be configured with a combination of a Givens rotation layer and a permutation layer. In this case, G may include one or more Givens rotation layers. In order to optimize, the i-th Givens rotation layer Gi of a plurality of given layers, Equation 31 may be arranged like Equation 34.

$$\begin{aligned}\|(H-G)W\|_F^2 &= \|HW - G_M G_{M-1} \cdots \\ & G_i \cdots G_1 P_0 W\|_F^2 \\ &= \|G_{i+1}^T \cdots G_M^T HW - \\ & G_i G_{i-1} \cdots G_1 P_0 W\|_F^2 \\ &= \|\hat{H}_i - G_i R_i\|_F^2 \\ &= Tr\{\hat{H}_i^T \hat{H}_i\} - \\ & 2Tr\{\hat{H}_i^T G_i R_i\} + Tr\{R_i^T R_i\}\end{aligned} \qquad [\text{Equation 34}]$$

In this case, $\hat{H}_i = G_{i+1}^T \cdots G_M^T HW$, and $R_i = G_{i-1} \cdots G_1 P_0 W$. Gi selects a pair of rows in Ri, and rotates the selected pair in order to match the selected pair with a pair of co-located rows within $\hat{H}_i$. An optimal Gi may be determined by selecting the best pair and the best rotation angle that minimize Equation 34. First, the encoder/decoder may calculate the best rotation angle of each pair by configuring a pair gain, and may determine pairs that maximize the sum of pair gains. A method of determining a rotation angle through the configuration of a pair gain is first described.

It is assumed that Gi has selected rows p and q as a j-th pair to be rotated by T(i,j). Furthermore, r(i,p) and r(i,q) determine the rows p and q of Ri, and h(i,p) and h(i,q) determine the rows p and q of $\hat{H}_i$. Equation 34 may be represented like Equation 35 based on the rows.

$$\begin{aligned}\left\| \begin{bmatrix} h_{i,p} \\ h_{i,q} \end{bmatrix} - \begin{bmatrix} \cos(\theta_{i,j}) & \sin(\theta_{i,j}) \\ -\sin(\theta_{i,j}) & \cos(\theta_{i,j}) \end{bmatrix} \begin{bmatrix} r_{i,p} \\ r_{i,q} \end{bmatrix} \right\|_F^2 &= \\ \|h_{i,p}\|^2 + \|h_{i,q}\|^2 + \|r_{i,p}\|^2 + \|r_{i,q}\|^2 & - \\ 2\cos(\theta_{i,j})(h_{i,p} r_{i,p}^T + h_{i,q} r_{i,q}^T) - 2\sin(\theta_{i,j})(h_{i,p} r_{i,q}^T - h_{i,q} r_{i,p}^T) & \end{aligned} \qquad [\text{Equation 35}]$$

An optimal rotation angle θ(i,j) may be determined as a value that minimize Equation 18. Some equations of Equation 35 may be defined as c(i,p,q) and s(i,p,q) as in Equation 36.

$$c_{i,p,q} = h_{i,p} r_{i,p}^T + h_{i,q} r_{i,q}^T$$

$$s_{i,p,q} = h_{i,p} r_{i,q}^T - h_{i,q} r_{i,p}^T \qquad [\text{Equation 36}]$$

When Gi selects the rows p and q, the optimal rotation angle θ(i,j) satisfies Equation 37.

$$\cos(\theta_{i,j}) = c_{i,p,q}/(c_{i,p,q}^2 + s_{i,p,q}^2)^{1/2}, \sin(\theta_{i,j}) = s_{i,p,q}/(c_{i,p,q}^2 + s_{i,p,q}^2)^{1/2} \qquad [\text{Equation 37}]$$

Equation 35 may be arranged like Equation 38 using Equations 36 and 37.

$$\|h_{i,p}\|^2 + \|h_{i,q}\|^2 + \|r_{i,p}\|^2 + \|r_{i,q}\|^2 - 2(c_{i,p,q}^2 + s_{i,p,q}^2)^{1/2} \qquad [\text{Equation 38}]$$

That is, when a case where the rows p and q are selected as a pair and rotated in order to obtain an optimal Gi is taken into consideration, an optimization gain is the same as $2(c_{i,p,q}^2 + s_{i,p,q}^2)^{1/2}$ compared to a case where Givens rotation is not performed. Accordingly, the pair gain of the Givens rotation may be defined like Equation 39.

$$\text{gain}(i,p,q) = (c_{i,p,q}^2 + s_{i,p,q}^2)^{1/2} \qquad [\text{Equation 39}]$$

A pair gain for the case of rotation plus reflection may be obtained by interchanging r(i,p) and r(i,q) in Equation 35 or 36. In this case, the final pair gain gain(i,p,q) may be determined (or set) as a gain having a maximum value among two pair gains calculated in the case of rotation and the case of rotation plus reflection.

In an embodiment of the present invention, the pair gain gain(i,p,q) may be modified by taking into consideration computational complexity and memory complexity. For example, the pair gain may be calculated using $2(c_{i,p,q}^2 + s_{i,p,q}^2)$ instead of $2(c_{i,p,q}^2 + s_{i,p,q}^2)^{1/2}$ of Equation 39.

In an embodiment of the present invention, the pair gain gain(i,p,q) may be calculated by taking into consideration only a limited set of $\theta(i,j)$. For example, the encoder/decoder may take into consideration $\theta(i,j)$ that satisfies $\theta_{i,j} \in \{\varphi_1, \varphi_2, \ldots, \varphi_K\}$ instead of all $\theta(i,j)$ satisfying $0 \leq \theta_{i,j} < 2\pi$. In this case, $\varphi_k$ may be different angles that satisfy $0 \leq \varphi_k < 2\pi$. $\theta(i,j)$ that minimizes Equation 35 may be determined based on the $\theta(i,j)$. For example, $\varphi_k$ may be $k*(2\pi/m)$. In this case, m may be the number of all angles.

In an embodiment of the present invention, the pair gain gain(i,p,q) may be calculated by permitting a specific pair (or limited pair) p and q. For example, the pair gain may be modified like Equation 40 in order to limit memory access, a cache miss, etc.

$$\begin{cases} \text{gain}(i, p, q) & |p - q| \leq \Delta \\ -\infty & \text{otherwise} \end{cases} \quad \text{[Equation 40]}$$

In this case, $\Delta$ is a given value, and may have a value, for example, 1, 10, 17, 123, 1024, 2048. Furthermore, for example, the pair gain may be calculated using Equation 41.

$$\text{gain}(i, p, q) = \begin{cases} \text{gain}(i, p, q) & |p - q| \leq \Delta \\ -\infty & \text{otherwise} \end{cases} \quad \text{[Equation 41]}$$

In this case, f(p,q) may correspond to a general function.

Next, the encoder/decoder may derive an optimal Givens rotation layer Gi by determining total pairs that maximize the sum of pair gains.

The optimization of Gi may be achieved by maximizing the sum of pair gains with respect to all non-intersecting pairs. This may come down to a problem of maximum matching in the graph theory.

In this case, it is assumed that the indices of N2 rows are determined as the vertexes of the graph. Furthermore, it is assumed that the pair gain gain(i,p,q)=gain(i,e) of Equation 39 is the weight of an edge $e(e=\{p,q\})$ within the entire edge set E within the graph.

The encoder/decoder may determine an edge set $\Omega$ satisfying a condition in which each vertex corresponds to one edge in E, that is, a vertex does not overlap in several edges, and may determine $\Omega$ in which the sum of edge weights within the $\Omega$ becomes a maximum. This may be represented like Equation 42.

$$\max_{\Omega \subset E} \Sigma_{e_k \in \Omega} \text{gain}(i, e_k) \text{ such that } e_k \cap e_l = \emptyset, \quad \text{[Equation 42]}$$

$$\forall e_k, e_l \in \Omega, k \neq l$$

In this case, ek and el indicate edges within the entire edge set E. Referring to Equation 42, edges may be determined so that a total sum of pair gains of edges becomes a maximum within the edge $\Omega$ in which each vertex corresponds to one edge. Such a maximum matching problem can be solved using a blossom algorithm. This is described based on the following drawing.

FIG. 28 is an embodiment to which the present invention is applied and is a diagram illustrating a method of determining a rotation layer using a blossom algorithm.

Referring to FIG. 28, the encoder/decoder may find a maximum matching pair of non-overlapped edges using the blossom algorithm. In other words, the encoder/decoder may determine edges having a total maximum pair gain (or weight) of non-overlapped edges using the blossom algorithm.

The encoder/decoder may determine an optimal N2/2 number of pairs using the above-described method and calculate T(i,j) based on an optimal rotation (or rotation plus reflection) angle of each pair. Accordingly, an optimal Gi can be derived.

Design Algorithm of Layered Givens Transform (LGT)

As a solution to the LGT design problem of Equation 31, the present invention proposes an algorithm for designing a layered Givens transform approximate to a target transform.

FIG. 29 is an embodiment to which the present invention is applied and is a conceptual view for illustrating a method of optimizing a layered Givens transform.

Referring to FIG. 29, the optimizer of a layered Givens transform outputs an optimized LGT using a target transform H (or desired transform H) and related parameters as input. The optimizer may be implemented as an element including the encoder and the decoder.

The algorithm for designing a layered Givens transform may include the following six algorithms (or procedures).

The first is the optimization algorithm of a permutation layer P0.

TABLE 2

| | |
|---|---|
| 1. | Use Hungarian method to minimize (equation 16) in terms of $P_0$. |

Table 2 shows an example of the optimization algorithm of P0. This is described specifically.

1. Determine P0 that minimizes Equation 33 using the Hungarian method

The second is the optimization algorithm of a Givens rotation layer Gi.

TABLE 3

| | |
|---|---|
| 1. | Calculate pair gains gain(i, p, q) for all possible pairings. |
| 2. | Use Blossom method to maximize (equation 42) in terms of matchings. |
| 3. | Use the optimal pairs to construct $P_i$, optimal $T_{i,j}$, and $G_i$. |

Table 3 shows an example of the optimization algorithm of Gi. This is described specifically.

1. Calculate the pair gains(i,p,q) of all possible pairs.

2. Determine non-overlapped optimal pairs that maximize Equation 42 using the blossom method.

3. Configure Pi, optimal T(i,j) and Gi using optimal pairs.

The third is a Descent algorithm. In the Descent algorithm, the above-described optimization algorithm of P0 is called, and an optimal layer matched with a target transform H is derived while changing a Givens rotation layer. The Descent algorithm may have initial LGT G0 as input. Alternatively, it is assumed that the initial LGT G0 has been given.

TABLE 4

| 1. | Set m = 0, err(0) = $\|(H - G^0)W\|_F^2$ |
|---|---|
| 2. | Repeat |
|   |   m = m + 1 |
|   |   Optimize $P_0$ |
|   |   Update $P_0$ in $G^{m-1}$ to construct candidate $G_c^{m, 0}$ |
|   |   calculate updated error $err_0(m) = \|(H - G_c^{m, 0})W\|_F^2$ |
|   |   for k = 1:M |
|   |     Optimize $G_k$ |
|   |     Update $G_k$ in $G^{m-1}$ to construct candidate $G_c^{m, k}$ |
|   |     Calculate updated error $err_k(m) = \|(H - G_c^{m, k})W\|_F^2$ |
|   |   end for |
|   |     k' = $\min_k\{err_k(m)\}$ |
|   |     $G^m = G_c^{m, k'}$ |
|   |     err(m) = $err_{k'}(m)$. |
|   | Until err(m − 1) − err(m) < ϵ |
| 3. | Output G = $G^m$ |

Table 4 shows an example of the Descent algorithm. This is described specifically.

1. As in Equation 43, an initial value is set.

$$m=0, \mathrm{err}(0)=\|(H-G^0)W\|_F^2 \quad [\text{Equation 43}]$$

In this case, m indicates the number of times that iteration is performed in order to find an optimal value as a variable for counting. Furthermore, an err( ) function indicates a matching error for a target transform. The approximation of the target transform may become higher as the err( ) value becomes smaller.

2. The following steps are repeated until Equation 44 is satisfied.

$$\mathrm{err}(m-1)-\mathrm{err}(m) \leq \epsilon \quad [\text{Equation 44}]$$

In this case, ϵ is a sufficiently small value and indicates a threshold. As ϵ increases, an optimal value may be found based on a less iteration number (i.e., fast converge). As ϵ decreases, an approximation degree of the target transform may become higher.

(1) m is increased by 1. That is, m is set as an m+1 value.

(2) P0 is optimized. In this case, the optimization algorithm of the above-described P0 may be performed.

(3) An LGT candidate $G_c^{m,0}$ is constructed by updating P0 within Gm−1 with the optimized P0. That is, $G_c^{m,0}$ having the updated P0 is used in Gm−1. In this case, Gm−1 is not changed.

(4) An error err0(m) for $G_c^{m,0}$ is calculated using Equation 45.

$$\mathrm{err}_0(m)=\|(H-G_c^{m,0})W\|_F^2 \quad [\text{Equation 45}]$$

(5) The following steps a), b), c) are repeated until k becomes m from 1.

a) Gk is optimized. In this case, the above-described optimization algorithm of Gi may be performed.

b) A candidate $G_c^{m,k}$ is constructed by updating Gk with Gm−1 with the optimized Gk. That is, $G_c^{m,k}$ having the updated Gk is used in Gm−1. In this case, Gm−1 is not changed.

c) An error errk(m) for the $G_c^{m,k}$ is calculated using Equation 46.

$$\mathrm{err}_k(m)=\|(H-G_c^{m,k})W\|_F^2 \quad [\text{Equation 46}]$$

(6) k' is set as k that minimizes an error value using Equation 47.

$$k'=\min_k\{\mathrm{err}_k(m)\} \quad [\text{Equation 47}]$$

(7) Gm is set as $G_c^{m,k'}$.

(8) An error err(m) is set as errk'(m).

3. A layered Givens transform G is set as Gm.

The fourth is a random neighbor search algorithm. In the random neighbor search algorithm, in order to determine an optimal value more effectively, some layers are set as a random value and the above-described Descent algorithm is called. The random neighbor search algorithm may have G as its input. Alternatively, it is assumed that G has been given.

TABLE 5

| 1. | Randomly select M/2 + 1 layers in G |
|---|---|
| 2. | Set the selected layers in G to identity matrix to construct $G'_{init}$ |
| 3. | G' = descent algorithm($G'_{init}$) |
| 4. | Return G' |

Table 5 shows an example of the random neighbor search algorithm. This is described specifically.

1. M/2+1 layers are randomly selected from G. However, the number of selected layers is one example, and the present invention is not limited thereto.

2. Ginit' is constructed by configuring the selected layers as an identity matrix.

3. G' is set as the output of the Descent algorithm having Ginit' as input.

4. G' is returned.

The fifth is a simulated annealing algorithm. In the simulated annealing algorithm, the random neighbor search algorithm is called. An optimal value is found while repeatedly comparing a derived solution (i.e., new optimal value) with the existing solution by applying the random neighbor search algorithm. The simulated annealing algorithm may have initial LGT G0 as its input. Alternatively, it is assumed that the initial LGT G0 has been given.

TABLE 6

| 1. | Set m = 0, err(0) = $\|(H - G^0)W\|_F^2$ |
|---|---|
| 2. | G(cur) = $G^0$, err(cur) = err(0) |
| 3. | Repeat |
|   |   m = m + 1 |
|   |     $G^m$ = find random neighbor(G(cur)) |
|   |   Calculate err(m) = $\|(H - G^m)W\|_F^2$ |
|   |     accept = decide acceptance(err(m), err (cur), m) |
|   |     if (accept) |
|   |   G(cur) = $G^m$, err (cur) = err(m) |
|   |   end if |
|   | Until m > maximum number of iterations |
| 4. | Output G = G(cur) |

Table 6 shows an example of the simulated annealing algorithm. This is described specifically.

1. As in Equation 48, an initial value is set.

$$m=0, \mathrm{err}(0)=\|(H-G^0)W\|_F^2 \quad [\text{Equation 48}]$$

2. A current layered Givens transform G(cur) is set as G0, and a current error err(cur) is set as err(0).

3. The following steps a), b), c), d), e) are repeated until m is greater than or equal to a maximum number of iterations.

a) m is increased by 1. That is, m is set as an m+1 value.

b) Gm is set as the output of the random neighbor search algorithm having G(cur) as its input.

C) An error err(m) for Gm is calculated using Equation 49.

$$\mathrm{err}(m)=\|(H-G^m)W\|_F^2 \quad [\text{Equation 49}]$$

d) A variable accept indicating acceptance is set as the output of an acceptance determination algorithm having err(m), err(cur) and m as its input. The acceptance determination algorithm is described later.

e) When an accept value is 1, G(cur) is set as Gm, and err(cur) is set as err(m).

4. G(cur) is output.

The sixth is an acceptance determination algorithm. In the acceptance determination algorithm, whether a newly obtained solution (i.e., optimal value) will be selected is determined based on the probability. The acceptance determination algorithm may have err(m), err(cur), an iteration number m as its input. Alternatively, it is assumed that err(m), err(cur), an iteration number m have been given.

TABLE 7

| 1. | Calculate current temperature t by m, e.g., $t = \log\left(\frac{MAX\_ITER\_COUNT}{m}\right)$ |
|---|---|
| 2. | Determine acceptance probability p by err(m), err(cur) and t, e.g., p = exp((err(cur) − err(m))/t) |
| 3. | Generate Bernoulli random variable A ~ Ber(p) |
| 4. | If A = 1, return accept; else, return reject. |

Table 7 shows an example of the acceptance determination algorithm. This is described specifically.

1. A current temperature t is calculated based on m. For example, t may be calculated using Equation 50.

$$t = \log\left(\frac{MAX\_ITER\_COUNT}{m}\right) \qquad \text{[Equation 50]}$$

In this case, MAX_ITER_COUNT indicates a maximum number of iterations. As the iteration number increases, a t value may be reduced.

2. The acceptance probability p is determined based on err(m), err(cur) and t.

For example, p may be calculated using Equation 51.

$$p = \exp((err(cur) - err(m))/t) \qquad \text{[Equation 51]}$$

Referring to Equation 51, although a difference between error values according to an optimal value newly obtained through the random neighbor search algorithm is the same, it may not be accepted when the t value is low.

3. A Bernoulli random variable A is generated based on the determined acceptance probability p.

4. accept is returned when A is 1, and reject is returned if not. Alternatively, an A value is set as the accept value.

FIGS. 30 and 31 are embodiments to which the present invention is applied and are flowcharts for illustrating an algorithm for designing a layered Givens transform.

The above-described Descent algorithm may be performed according to steps, such as those shown in FIG. 30.

The encoder/decoder performs initialization (S3001).

A variable m indicating the number of iterations and an err( ) function indicating the matching error of a target transform are initialized using Equation 43. The err( ) function may be initialized using a given initial LGT.

The encoder/decoder performs optimization on each of layers configuring the LGT (S3002).

As described above, the encoder/decoder may derive an optimal layer matched with a target transform H0∥while changing the layers one by one.

The encoder/decoder updates the LGT using an optimal layer selected in step S3002 (S3003).

The encoder/decoder determines whether an error value converges based on the updated LGT (S3004).

If, as a result of the determination in step S3004, the error value does not converge, an iteration is performed until the error value converges by performing step S3002 again (S3005).

If, as a result of the determination in step S3005, the error value converges, the determined optimal LGT is determined as the local optimum.

An optimized LGT may be obtained by the above-described Descent algorithm. However, the optimized LGT may have a limit that it converges without reaching the global optimum having a higher approximation for a target transform than the local optimum because several layers are not optimized at once and can be optimized and updated one by one. Such a limit can be overcome by performing the simulated annealing algorithm. The above-described simulated annealing algorithm may be performed according to steps, such as those shown in FIG. 31.

The encoder/decoder performs initialization (S3101). The initialization may be performed identically with step S3001 of FIG. 30.

The encoder/decoder searches for a neighbor of a current LGT (S3102). In this case, the above-described random neighbor search algorithm may be performed.

The encoder/decoder searches for a local optimum based on the retrieved neighbor (S3103). That is, the encoder/decoder newly determines the local optimum based on layers initialized through the random neighbor search algorithm. In this case, the Descent algorithm described in FIG. 12 may be performed The encoder/decoder calculates a jump probability p (S3104), and determines whether to set the current local optimum as the local optimum retrieved in step S3103 based on a jump probability p value (S3105). In this case, the jump may mean newly obtained local optimum adoption, and the jump probability p may be determined based on the current number of iterations and a maximum number of iterations. In this case, the above-described acceptance determination algorithm may be performed.

If, as a result of the determination in step S3105, jump (or acceptance) is determined, the encoder/decoder sets a current LGT as the local optimum retrieved in step S3103 (S3106).

The encoder/decoder sequentially performs the steps from step S3102 to step S3106 repeatedly until a maximum number of iterations is reached (S3107).

When the current number of iterations reaches the maximum number of iterations, the encoder/decoder determines the current LGT as an optimal LGT (S3108).

Covariance Extension

In the case of the Gaussian process, the KLT corresponds to an optimal transform. It is assumed that the Gaussian process has a covariance matrix K satisfying Equation 52.

$$K = H\Lambda H^T \qquad \text{[Equation 52]}$$

In this case, H is the KLT, and Λ is the diagonal matrix of an Eigen value. If Equation 52 is used, Equation 28 may be arranged like Equation 53.

$$\min_{G} \|K - G\Lambda G^T\|_F \qquad \text{[Equation 53]}$$

The minimization of Equation 53 may be performed by repeatedly obtaining Gm using, for example, Equation 54.

$$G^m = \underset{G}{\mathrm{argmin}} \|K - G^{m-1} \Lambda G^T\|_F \qquad \text{[Equation 54]}$$

Equation 54 can be solved using the above-described methods described in the LGT design and LGT design algorithm. Furthermore, another minimization scheme (or optimization scheme) using the covariance matrix K may be used.

Training Data Extension

A sparse transform may be obtained using a training set of vectors arranged in the columns of a matrix X. In such a case, an LGT may be obtained using Equation 55.

$$\underset{G}{\min} \left\{ \underset{C}{\min} \|X - GC\|_F^2 + \lambda \|C\|_0 \right\} \qquad \text{[Equation 55]}$$

In this case, x indicates input data, C indicates an LGT coefficient obtained with respect to the columns of X, and $\|\bullet\|_0$ indicates L0 norm. Furthermore, λ is a value determined based on a quantization parameter. The input data may be a non-orthogonal matrix. Accordingly, the non-orthogonal matrix may be used to obtain the LGT. The minimization of Equation 55 may be performed by repeatedly obtaining C and Gm using Equation 56, for example.

$$C = \mathrm{hard\_threshold}\left( (G^{m-1})^T X, \sqrt{\lambda} \right) \qquad \text{[Equation 56]}$$
$$G^m = \underset{G}{\mathrm{argmin}} \|X - GC\|_F$$

In this case, hard_threshold( ) is a function that takes a value of 0 when it is smaller than a specific threshold. That is, when the size of an absolute value of the coefficient is smaller than $\sqrt{\lambda}$, the function may be set as a value of 0. Gm may be obtained using the methods described in the LGT design and LGT design algorithm. Furthermore, different minimization regarding X may be used.

FIG. 32 is an embodiment to which the present invention is applied and shows approximations by an LGT transform, a row-column transform and a separable transform.

Referring to FIG. 32, it is assumed that a target transform is a non-separable transform basis.

When compared with approximations using a row-column transform and separable transform, the LGT preserves high fidelity for a target transform basis compared to other transforms. That is, the LGT can obtain much higher approximation for a target transform than approximations using a row-column transform and separable transform.

Additional Embodiments

In an embodiment of the present invention, one or more LGTs may be used to transform N2 data signal values. For example, in the case of the decoder side, the decoder may select a specific LGT using information (i.e., an index indicating the specific LGT), received from the encoder, among several derived LGTs. Alternatively, the encoder/decoder may sequentially apply a plurality of LGTs. For example, the encoder/decoder may perform a transform using the LGT of a first stage, and then may additionally perform a transform using the LGT of a second stage.

In an embodiment of the present invention, a reduced dimensional LGT may be used to transform N2 data signal values as follows. A normal LGT (i.e., the above-described LGT) may be the same as that all N2 elements of X is transformed using an LGT G. That is, the normal LGT may be said to have an N2 dimension. In contrast, the encoder/decoder may perform a transform using reduced dimensional LGT.

It is assumed that N2×1 vectors obtained from N×N data blocks are x. In this case, for example, x may be vectors arranged in lexicographic order from the N×N data blocks.

A permutation matrix Q1(N2×N2) may be applied to X. A reduced dimensional LGT of an N1(N1≤N2) dimension may be applied to the first N1 element of Q1x (i.e., x to which Q1 has been applied). Furthermore, the remaining elements of Q1x may be delivered to form a transform coefficient vector y(N2×1), and another reduced dimensional LGT may be applied thereto.

For example, if another reduced dimensional LGT is applied to the remaining elements of Q1x, the encoder/decoder may apply the LGT of an N2-N1 dimension to the remaining elements of Q1x.

For example, if another reduced dimensional LGT is applied to the remaining elements of Q1x, the encoder/decoder may apply another reduced dimensional LGT to an N2 element among the N2-N1 elements, and may skip a transform for the remaining N2-N1-N2 elements or may recursively apply other N3 reduced dimensional LGTs.

Furthermore, y may be additionally transformed using a method similar to that described above using Q2(N2×N2) and N2.

Furthermore, an additional transform may be repeated by a specific number using Q1(N2×N2), N1(N1≤N2) and 1(1=1, . . . , L). The L may be a given positive integer, such as 1, 2, 7, 117, . . . . In this case, 1 indicates the number of times that a transform is repeatedly applied. In a process in which iterations are performed, the same value may be used as Q1(N2×N2) and N1(N1≤N2) and a different value may be used every iteration.

FIG. 33 is an embodiment to which the present invention is applied and is a diagram illustrating an example of a method of applying a reduced dimensional LGT.

Referring to FIG. 33, a reduced dimensional LGT may be applied in a subgroup unit within the range in which data to which a permutation matrix has been applied does not overlap.

In an embodiment of the present invention, the final permutation matrix Qfinal(N2×N2) may be applied to coefficients generated by a reduced dimensional LGT.

In an embodiment of the present invention, an LGT may be used to transform a pixel value.

In an embodiment of the present invention, an LGT may be used to additionally transform (i.e., secondary transform) the transform coefficient of a different transform. In this case, the different transform may be a DCT, DST, KLT, SOT, wavelet transform, etc.

In an embodiment of the present invention, the number M of LGT layers may be determined based on computational complexity in the encoder and may be transmitted to the decoder.

In an embodiment of the present invention, the number M of LGT layers may be determined in the encoder based on rate-distortion optimization and may be transmitted to the decoder.

In an embodiment of the present invention, rotation or rotation plus reflection, T(i,j) and the inverses thereof may be performed using parallel processing.

In an embodiment of the present invention, the encoder may select an LGT or a different transform (e.g., DCT) based on complexity and/or a rate-distortion viewpoint with respect to a data block, may transform the selected transform, and may signal the selected transform and/or related parameter information to the decoder.

In an embodiment of the present invention, both the encoder and the decoder may determine an LGT using previously decoded data. In this case, the encoder and the decoder may determine the LGT using a covariance or sparse modeling for the data. Furthermore, the encoder may transform and encode an LGT coefficient. The decoder may decode the transform coefficient and apply an inverse LGT. In this case, signaling on information related to the LGT selection may not be performed.

In an embodiment having an object of scalable compression applications, the encoder may apply M1 LGT layers to a data block, may quantize the layers, and may transmit an LGT result coefficient to a baseline decoder as a baseline coefficient. Furthermore, the encoder may further apply LGT layers to the data block, may calculate residual LGT coefficient information regarding the quantized baseline coefficient, and may transmit the residual information as an enhancement layer. An enhancement layer decoder may calculate an additional LGT layer starting as a decoded base line LGT coefficient, may perform an inverse transform by applying all LGT layers to the residual information, and may reconstruct data.

FIG. 34 is a diagram illustrating a schematic block diagram of a transform unit and quantization unit within an encoder to which the present invention is applied.

The encoder may select an LGT or a different transform (e.g., DCT) based on computational complexity or rate-distortion optimization, may transform the selected transform, and may signal the selected transform and/or related parameter information to the decoder.

Specifically, in FIG. 1, the transform unit 120 and the quantization unit 130 may be configured to include a DCT transform unit 3421, an LGT transform unit 3422, a first quantization unit 3431, a second quantization unit 3432 and an RDO determination unit 3435.

The DCT transform unit 3421 and/or the LGT transform unit 3422 may transmit a transform coefficient, transformed from a residual signal, to the first quantization unit 3431 and/or the second quantization unit 3432. Furthermore, the RDO determination unit 3435 may select a DCT transform or LGT transform based on RDO, and may transmit, to the entropy encoding unit 190, the dequantization unit 140 or the inverse transform unit 150, information related to the determined transform or parameter information related to the LGT transform.

FIG. 35 is a diagram illustrating a schematic block diagram of an inverse transform unit and dequantization unit within a decoder to which the present invention is applied.

The decoder may receive transform type information, parameter information related to a transform and/or a transform coefficient. The decoder may select an inverse transform based on the received transform type and may perform dequantization. Furthermore, the decoder may perform an inverse transform on the transform coefficient.

Specifically, in FIG. 2, the dequantization unit 220, the inverse transform unit 230 may be configured to include a first dequantization unit 3521, a second dequantization unit 3522, a DCT inverse transform unit 3531 and an LGT inverse transform unit 3532. The decoder may receive, from the encoder, information related to selected transform. When a DCT transform is selected, dequantization and an inverse transform may be performed by the first dequantization unit 3521 and the DCT inverse transform unit 3531. When an LGT transform is selected, dequantization and an inverse transform may be performed by the second dequantization unit 3522 and the LGT inverse transform unit 3532.

FIG. 36 is an embodiment to which the present invention is applied and is a flowchart for illustrating a process of performing encoding using a layered Givens transform.

The encoder derives at least one rotation layer and permutation layer based on a given transform matrix H and an error parameter (S3601). As described above, the permutation layer may include a permutation matrix obtained by substituting a row of an identity matrix. The permutation matrix may be obtained by performing a process of selecting two rows starting from an identity matrix and exchanging the rows once or multiple times.

Furthermore, the rotation layer may include a permutation matrix and a rotation matrix. The rotation matrix may include at least one pairwise rotation matrix As described above, the pairwise rotation matrix may be formed by taking into consideration pairwise rotation as in Equation 22 and may be formed by taking into consideration pair rotation plus reflection as in Equation 23.

Furthermore, the error parameter indicates a variable or matrix for calculating the approximation of a target transform, and may be denoted as an "error calculation method" or "weight matrix" or the like. The error parameter may be determined based on Equation 28, Equation 31 or Equation 43.

As described above with reference to FIG. 27, the permutation layer may be derived through an optimization process, and the optimization process may be performed based on matching between the layered givens transform matrix and the given transform matrix H. Here, the layered givens transform matrix may be derived from the rotation layer and the permutation layer using Equation 20 described above. The process of optimizing the permutation layer may be performed using a Hungarian algorithm. Specifically, the encoder may determine an optimal assignment that does not overlap between nodes by using Equation 33 described above.

As described in FIG. 28, the rotation layer or the permutation layer may be derived through an optimization process. The optimization process may be performed based on matching between a layered Givens transform matrix and the given transform matrix H. Specifically, the optimization process of the rotation layer may be performed by determining an optimal rotation angle of a rotation matrix within the rotation layer based on the matching between the layered Givens transform matrix and the given transform matrix H and determining non-overlapped pairs that maximize a total sum of gains determined based on the optimal rotation angle. As described in Equation 42, the encoder may search for a maximum matching pair of non-overlapped edges using the blossom algorithm.

Furthermore, the optimization process of the rotation layer may further include the step of setting at least one different rotation layer within the layered Givens transform matrix as an identity matrix. As described above in the simulated annealing algorithm, a global optimal value may be retrieved while comparing a newly derived optimal value with the existing optimal value through the initialization of neighbor layers.

The encoder obtains a layered Givens transform (LGT) coefficient based on the rotation layer and the permutation layer (S3602).

As described in FIG. 22, a layered Givens transform coefficient may be obtained by applying the rotation layer and the permutation layer to input data arranged in lexicographic order.

The encoder performs quantization and entropy encoding on the layered Givens transform (LGT) coefficient (S3603).

FIG. 37 is an embodiment to which the present invention is applied and is a flowchart for illustrating a process of performing decoding a layered Givens transform.

The decoder obtains a layered Givens transform (LGT) coefficient by performing entropy decoding and dequantization on a residual signal included in a video signal received from the encoder (S3701).

The decoder derives at least one rotation layer and permutation layer based on a given transform matrix H and an error parameter (S3702). As described above, the permutation layer may include a permutation matrix obtained by substituting a row of an identity matrix. Furthermore, the rotation layer may include a permutation matrix and a rotation matrix. The rotation matrix may include at least one pairwise rotation matrix.

As described above, the pairwise rotation matrix may be formed by taking into consideration pairwise rotation as in Equation 22, and may be formed by taking into consideration pair rotation plus reflection as in Equation 23.

Furthermore, the error parameter may be determined based on Equation 28, Equation 31 or Equation 43.

As described in FIG. 27, the permutation layer may be derived through an optimization process. The optimization process may be performed based on matching between a layered Givens transform matrix and the given transform matrix H. In this case, the layered Givens transform matrix may be derived from the rotation layer and the permutation layer using Equation 20. Furthermore, the optimization process of the permutation layer may be performed using the Hungarian algorithm. Specifically, the decoder may determine optimal assignment not overlapped between nodes using Equation 33.

As described in FIG. 28, the rotation layer or the permutation layer may be derived through an optimization process. The optimization process may be performed based on matching between a layered Givens transform matrix and the given transform matrix H. Specifically, the optimization process of the rotation layer may be performed by determining an optimal rotation angle of a rotation matrix within the rotation layer based on the matching between the layered Givens transform matrix and the given transform matrix H and determining non-overlapped pairs that maximize a total sum of gains determined based on the optimal rotation angle. As described in Equation 42, the decoder may search for a maximum matching pair of non-overlapped edges using the blossom algorithm.

Furthermore, the optimization process of the rotation layer may further include the step of setting at least one different rotation layer within the layered Givens transform matrix as an identity matrix. As described above in the simulated annealing algorithm, a global optimal value may be retrieved while comparing a newly derived optimal value with the existing optimal value through the initialization of neighbor layers.

The decoder performs an inverse transform on the layered Givens transform (LGT) coefficient based on the rotation layer and the permutation layer (S3703). The decoder reconstructs the video signal using the inverse-transformed coefficient (S3704).

Referring to FIG. 36, the step of deriving the LGT and the step of obtaining the LGT coefficient by applying the derived LGT may be included in the encoding process. Referring to FIG. 37, the step of deriving the LGT and the step of performing the inverse transform using the derived LGT may be included in the decoding process.

Meanwhile, in an embodiment of the present invention, an optimal LGT may be derived off-line using the above-described method. In this case, the encoder/decoder may select the offline derived optimal LGT based on a prediction mode or context, and may perform encoding/decoding using the selected LGT. Alternatively, the encoder may perform encoding on the offline derived optimal LGT based on rate-distortion optimization (RDO), and may signal, to the decoder, information related to the selected LGT. The decoder may perform decoding using the offline derived optimal LGT and LGT-related information received from the encoder.

FIG. 38 is a diagram illustrating, more specifically, a decoder to which the present invention is applied.

Referring to FIG. 38, the decoder 200 implements the functions, processes and/or methods proposed in FIGS. 2 to 20. Specifically, the decoder 200 may be configured to include an entropy decoding unit 3801, a dequantization unit 3802, a layer derivation unit 3803, an inverse transform unit 3804 and a reconstruction unit 3805. In FIG. 38, the layer derivation unit 3803 has been illustrated as being an element separated from the inverse transform unit 3804, but the layer derivation unit 3803 may be implemented as an element included in the inverse transform unit 3804.

The entropy decoding unit 3801 and the dequantization unit 3802 obtain a layered Givens transform coefficient by performing entropy decoding and dequantization on a residual signal included in a video signal received from an encoder.

The layer derivation unit 3803 derives at least one rotation layer and permutation layer based on a given transform matrix H and an error parameter (S2002). As described above, the permutation layer may include a permutation matrix obtained by substituting a row of an identity matrix. Furthermore, the rotation layer may include a permutation matrix and a rotation matrix, and the rotation matrix may include at least one pairwise rotation matrix.

As described above, the pairwise rotation matrix may be formed by taking into consideration pairwise rotation as in Equation 22 and may be formed by taking into consideration pair rotation plus reflection as in Equation 23.

Furthermore, the error parameter may be determined based on Equation 28, Equation 31 or Equation 43.

As described above with reference to FIG. 27, the permutation layer may be derived through an optimization process, and the optimization process may be performed based on matching between the layered givens transform matrix and the given transform matrix H. Here, the layered givens transform matrix may be derived from the rotation layer and the permutation layer using Equation 3 described above. The process of optimizing the permutation layer may be performed using a Hungarian algorithm. Specifically, the layer inducing unit 3803 may determine an optimal assignment that does not overlap between nodes by using Equation 41 described above.

As described in FIG. 28, the rotation layer or the permutation layer may be derived through an optimization process. The optimization process may be performed based on the matching between the layered Givens transform matrix and the given transform matrix H. Specifically, the optimization process of the rotation layer may be performed by determining an optimal rotation angle of a rotation matrix within the rotation layer based on the matching between the layered Givens transform matrix and the given transform matrix H and determining non-overlapped pairs that maximize a total sum of gains determined based on the optimal rotation angle. As described in Equation 42, the layer derivation unit 803 may search for a maximum matching pair of non-overlapped edges using the blossom algorithm.

Furthermore, the optimization process of the rotation layer may further include the step of setting at least one different rotation layer within the layered Givens transform matrix as an identity matrix. As described in the simulated annealing algorithm, a global optimal value may be retrieved while comparing a newly derived optimal value with the existing optimal value through the initialization of neighbor layers.

The inverse transform unit 3804 performs an inverse transform on a layered Givens transform (LGT) coefficient based on the rotation layer and the permutation layer. The reconstruction unit 3805 reconstructs the video signal using the inverse-transformed coefficient.

Hereinafter, a method for restrictively/selectively applying an layered givens transform (LGT) to a specific area will be described.

FIGS. 39 and 40 are views illustrating a low frequency region to which a 4×4 layered givens transform (LGT) is applied according to an embodiment of the disclosure.

In an embodiment of the disclosure, for convenience of description, a 4×4 LGT (that is, an LGT applicable to a 4×4 region) is mainly described, but the disclosure is not limited thereto, and various sizes (or various applicable areas) of LGTs may be used. For example, according to an embodiment of the disclosure, the LGTs applied to the restricted region may be 4×8, 8×4, or 8×8 LGT. As an example, such an LGT may be designed/derived using the method described above in connection with FIGS. 13 to 38.

Referring to FIG. 39, as a secondary transform, a 4×4 LGT may be applied to the top left region as illustrated in FIG. 39. The top left region represents a low frequency region. In the disclosure, the secondary transform represents a transform applied to a low frequency region of a specific size after a primary transform (or core transform) is applied at the encoder side. That is, at the decoder side, after the secondary transform is applied, the primary transform (or core transform) may be applied. The secondary transform may be denoted a low frequency transform, a low frequency separable transform, a low frequency non-separable transform, a low frequency reduced transform, or a low frequency reduced secondary transform.

In an embodiment of the disclosure, the encoder/decoder may apply the secondary transform to the top left region using the 4×4 LGT. For example, when the size of the region to which the secondary transform is applied is 4×4, 4×8, 8×4, or 8×8, the encoder/decoder may perform the secondary transform by applying the 4×4 LGT to each region. If the size of the region to which the secondary transform is applied is larger than 4×4 (that is, 4×8, 8×4, or 8×8), the region may be split in 4×4 units and the 4×4 LGT transform may be applied thereto.

Further, for example, when the region to which the secondary transform is applied is the top left 8×8 region as shown in FIG. 39, the encoder/decoder may divide the 8×8 region into four 4×4 regions (i.e., A, B, C, and D of FIG. 39) and apply the 4×4 LGT to the divided regions. In this case, the 4×4 LGT applied to the divided regions may be configured with the same transform or different transforms. If different 4×4 LGTs are applied, the 4×4 LGT applied to the remaining regions (B, C, D) except for region A may be designed to have a lower computational complexity than the LGT applied to region A.

In an embodiment, the encoder/decoder may determine the size of the region to which the secondary transform is applied based on the size of the current block (current processing block, current coding block). For example, when the size of the current block is larger than 8×8, the secondary transform may be applied to the top left 8×8 region and, when the size of the current block is smaller than 8×8, the secondary transform may be applied to the entire area of the current block or the top left 4×4 region of the current block. In another embodiment, the decoder may determine the size of the region to which the secondary transform is applied based on information signaled from the encoder.

Further, in an embodiment, the encoder/decoder may apply a combination of the 4×4 LGT and other transforms according to the size of the current block or the size of the region to which the secondary transform is applied. For example, when the size of the region to which the secondary transform is applied is 8×8, another transform (e.g., RST or NSST) of an 8×8 size may be applied and, when the size of the region to which the secondary transform is applied is 4×4, the 4×4 LGT may be applied. For example, the 4×4 LGT may be applied only to 4×4, 4×8, and 8×4 blocks, and the 4×8 block and 8×4 block may be divided into two 4×4 blocks, and the 4×4 LGT may be applied to each of the divided blocks.

Referring to FIG. 40, in an embodiment of the disclosure, the encoder/decoder may apply a secondary transform using the 4×4 LGT only on the top left 4×4 region (i.e., region A), thereby significantly reducing the computational complexity caused when performing the secondary transform.

In an embodiment, the encoder/decoder may determine which 4×4 LGT set to apply according to the intra prediction mode. For example, the encoder/decoder may determine the 4×4 LGT set to be applied according to the intra prediction mode based on the method described above with reference to FIG. 12. That is, the same transform set may be applied to the symmetric prediction directions. When the mode number of the prediction mode is greater than 34, the encoder/decoder may transpose input data and then apply a corresponding transform. In this case, in the case of DC and/or planar mode, the transform set may include two transforms, and in the other modes, the transform set may include three transforms.

Described below is a method for designing/implementing a layered givens transform (LGT) of a specific size for limited/selective application.

FIG. 41 is a view illustrating a structure of a layered givens transform (LGT) according to an embodiment of the disclosure.

Referring to FIG. 41, $x_i$ (where, i=0, 1, ..., 15) and $y_i$ (i=0, 1, ..., 15) denote the input vector and output vector, respectively. GRL denotes the givens rotation layer.

A 4×4 LGT according to an embodiment of the disclosure may include 5 GRLs and 6 permutation layers (or permutation matrices) as shown in FIG. 41. One GRL may include a plurality of givens rotations. In the disclosure, the case where one givens rotation layer in a 4×4 LGT includes eight givens rotations is mainly described, but the disclosure is not limited thereto. One GRL may include other various numbers of givens rotations than eight.

In an embodiment, the givens rotation may be performed by applying the method described above in connection with FIG. 12 and Equations 4 and 5. That is, as described above, one givens rotation may be expressed as one angle θ.

The encoder/decoder may configure a table in which indexes are allocated to quantized angles. The encoder/decoder represents the quantized angle as an index and, based on the index, may derive the angle (e.g., cosine or sine) of the givens rotation through a table look-up. The encoder/decoder may perform rotation using the derived angle and Equations 4 and/or 5.

In one embodiment, a total of 256 quantized angles may be used, and the index k (k=0, 1, . . . , 255) allocated to the quantized angle may have a value of $2\pi k/256$. Since the 4×4 LGT consists of a total of 5 GRLs, one transform (i.e., 4×4 LGT) may consist of 8×5=40 angles. As an example, as described above with reference to FIG. 12, assuming that a total of 35 transform sets are used, an angle index table as shown in Table 8 below may be configured in the encoder/decoder.

[Table 8]

```
const Int g_nsstLGTPar4x4[35][3][40] = {
{ //0
{ 10,9,14,12,9,12,14,12,0,10,239,14,10,15,254,6,8,250,12,12,6,241,248,0,10,10,84,6,16,21,211,236,16,61,168,193,121,76,232,58 },
{ 8,243,238,233,16,241,232,12,10,246,1,246,238,241,248,8,6,9,9,5,7,16,242,251,254,4,251,5,9,15,8,252,4,24,3,240,219,61,44,161 },
{ 0,0,0,0,0,0,0,0,0,0,0,0,0,0,0,0,0,0,0,0,0,0,0,0,0,0,0,0,0,0,0,0,0,0,0,0,0,0,0,0 } //Not used
},
{ //1
{ 0,254,8,7,10,16,17,8,213,69,206,209,219,10,20,96,247,21,239,6,15,242,27,241,9,242,15,236,9,14,238,245,0,12,236,14,249,254,11,249 },
{ 15,18,11,11,29,12,12,251,1,9,2,13,246,23,246,16,141,195,189,17,226,56,10,181,250,5,224,19,14,8,248,241,255,243,239,250,233,242,236,249 },
{ 0,0,0,0,0,0,0,0,0,0,0,0,0,0,0,0,0,0,0,0,0,0,0,0,0,0,0,0,0,0,0,0,0,0,0,0,0,0,0,0 } //Not used
},
```

{ //2

{ 215,63,56,83,229,253,19,47,241,21,232,10,25,40,13,20,8,32,12,226,27,24,227,245,255,252,33,22,238,25,17,0,254,13,243,243,229,255,242,244 },

{ 41,7,111,199,49,95,80,160,4,21,242,252,13,17,240,229,230,96,227,31,183,31,41,6,242,2,237,1,17,21,228,236,254,33,252,230,15,31,246,9 },

{ 193,139,133,137,166,170,52,196,3,20,241,14,237,14,250,250,7,31,24,15,234,255,93,18,12,230,232,255,9,246,18,24,4,15,23,249,8,28,2,27 }

},

{ //3

{ 245,220,3,14,20,207,198,207,25,24,118,252,143,148,210,107,6,26,223,232,245,22,5,233,8,20,227,240,247,235,0,14,1,4,22,241,249,240,248,203 },

{ 21,66,255,245,91,15,127,186,16,211,235,21,255,22,231,241,252,232,33,14,233,30,40,233,8,23,245,23,34,35,235,18,249,15,232,240,26,240,21,242 },

{ 147,134,185,22,35,180,106,196,1,25,12,240,14,244,244,9,12,229,250,29,14,233,234,229,0,239,243,17,14,25,242,246,0,250,244,11,11,18,240,247 }

},

{ //4

{ 4,6,12,3,224,19,225,26,2,15,233,29,240,232,24,25,201,94,184,203,143,198,162,29,9,14,9,35,228,19,31,217,253,19,16,248,240,10,11,8 },

{ 93,87,155,64,87,218,147,199,9,28,250,20,16,42,228,240,6,9,247,0,20,7,28,241,17,25,184,13,37,242,222,246,1,228,4,246,246,244,12,239 },

{ 120,168,112,177,134,189,50,239,21,222,96,29,20,28,225,232,0,17,10,240,20,243,237,223,244,235,238,1,234,35,246,241,1,249,23,253,4,234,241,12 }

},

{ //5

{ 251,6,33,239,252,27,31,255,153,213,84,220,90,98,148,3,21,26,1,223,31,21,19,237,250,227,246,19,15,25,31,14,254,231,244,249,6,228,15,207 },

{ 82,75,81,191,106,208,227,94,12,14,241,227,11,233,34,6,255,6,12,231,239,24,246,241,7,12,9,244,27,242,239,21,3,237,1,31,247,12,27,9 },

{ 9,16,238,238,40,227,67,7,219,148,29,97,164,215,214,191,244,4,8,24,34,248,57,31,1,1,13,252,237,22,245,10,3,2,245,14,233,15,20,224 }

},
{ //6

{ 253,139,16,41,192,176,146,155,252,36,241,22,226,20,1,19,249,247,245,243,253,14,247,4,84,23,50,74,231,50,27,39,255,241,236,235,14,245,243,16 },

{ 4,16,17,220,11,229,239,224,91,71,94,126,21,233,213,7,29,226,28,7,13,236,233,22,24,11,30,252,7,7,234,24,254,234,255,239,26,19,28,247 },

{ 172,226,217,164,254,199,166,81,246,229,19,224,0,243,224,31,253,245,242,252,24,25,25,13,255,13,15,248,242,231,31,240,249,247,240,21,7,255,12,250 }

},
{ //7

{ 4,11,251,10,15,26,15,7,86,72,64,163,83,14,86,205,13,241,11,27,1,23,242,28,255,245,244,247,4,240,15,238,252,246,247,24,247,242,251,234 },

{ 223,82,118,17,81,179,225,87,233,8,20,235,12,233,18,242,239,215,18,248,234,231,19,226,12,5,236,22,3,13,13,18,7,231,240,247,252,245,251,241 },

{ 9,65,208,136,213,17,243,9,241,25,27,234,230,192,1,247,2,241,24,225,239,229,246,245,250,248,9,31,244,28,242,228,255,250,23,19,243,30,245,254 }

},
{ //8

{ 145,8,123,194,177,86,6,158,238,16,17,245,246,229,5,1,250,33,10,31,247,234,3,19,0,214,89,222,11,14,234,23,255,236,244,9,14,243,14,250 },

{ 153,191,149,78,214,219,26,47,4,13,220,37,240,238,0,16,19,25,31,31,220,190,40,163,14,228,97,247,227,15,234,9,254,237,30,25,239,26,30,33 },

{ 157,206,142,160,214,63,15,39,33,233,237,21,13,243,231,221,6,28,234,3,1,240,18,229,237,20,241,255,252,17,241,13,247,251,10,249,8,248,247,246 }

},
{ //9

{ 1,230,9,252,19,13,19,19,253,16,7,250,11,19,9,25,104,115,34,85,163,200,167,208,14,19,23,26,225,7,246,31,251,239,21,244,26,18,216,229 },

{ 95,11,129,221,21,64,152,96,247,234,85,192,27,237,105,21,22,180,26,105,36,233,211,228,244,220,226,255,247,31,19,215,9,222,191,41,40,18,254,7 },

{ 0,17,236,228,20,17,22,227,1,238,0,251,18,28,19,26,218,178,206,7,127,41,95,20,11,13,30,27,233,28,21,242,255,247,205,234,245,248,242,237 }

},

{ //10

{ 16,119,7,153,82,181,215,244,245,238,225,24,30,225,10,238,254,20,22,238,27,10,243,243,9,245,22,13,40,232,21,7,10,244,21,220,18,245,18,236 },

{ 223,22,216,252,101,111,61,22,16,33,16,219,237,156,101,25,251,67,39,245,97,192,231,172,232,7,238,21,243,17,234,243,20,19,218,247,16,14,236,235 },

{ 208,133,10,213,126,248,219,24,241,237,231,244,20,35,245,252,253,16,9,23,243,13,238,253,253,11,254,247,19,239,11,244,1,248,242,13,236,246,244,7 }

},

{ //11

{ 129,11,218,211,226,206,238,150,244,242,250,29,12,243,24,246,252,242,13,247,248,240,28,238,2,246,241,245,18,5,241,251,7,18,13,229,30,32,8,22 },

{ 80,182,67,218,88,129,217,117,221,15,82,229,243,234,251,203,13,28,249,14,237,24,240,37,10,233,237,255,30,232,244,238,237,8,7,26,21,233,239,250 },

{ 12,48,193,185,128,41,128,67,255,218,7,11,238,221,227,18,241,32,24,79,233,23,234,26,246,245,245,0,13,235,23,236,2,230,239,10,9,25,13,13 }

},

{ //12

{ 220,207,29,5,17,72,216,125,17,20,13,93,22,37,228,81,3,6,30,28,228,231,19,227,250,226,19,23,19,236,246,30,254,228,241,19,18,37,5,240 },

{ 35,97,52,43,75,220,82,174,14,241,242,10,11,23,231,227,245,249,14,13,238,244,21,3,19,236,252,239,247,10,250,237,13,3,25,14,14,0,23,28 },

{ 209,139,26,78,141,57,201,13,19,8,243,25,233,24,27,17,0,236,24,19,242,25,248,221,254,19,251,21,1,13,31,235,4,234,9,255,20,18,17,233 }

},

{ //13

{ 22,15,228,18,30,15,210,35,254,5,236,253,21,1,235,11,76,214,205,88,143,95,175,161,252,23,246,226,3,227,244,11,192,124,32,0,74,128,59,107 },

{ 29,231,158,149,191,218,136,206,249,3,29,23,230,249,14,22,8,238,12,49,28,27,13,244,6,3,2 32,246,24,1,14,234,250,16,245,231,249,9,23,14 },

{ 225,226,9,216,8,234,24,219,6,88,31,154,62,102,96,85,245,12,1,234,28,24,15,219,4,18,13,24 ,244,17,1,11,5,249,254,248,251,20,18,241 }

},

{ //14

{ 20,21,2,228,217,247,214,23,29,32,216,22,175,136,94,6,5,12,249,31,9,248,5,5,4,255,15,250, 238,7,242,254,250,16,15,23,13,240,1,18 },

{ 4,15,9,14,9,8,15,10,3,137,72,212,79,202,78,49,238,34,243,16,228,234,250,115,2,234,231,23 3,23,239,240,233,0,5,244,12,245,248,253,8 },

{ 89,220,26,95,72,30,152,211,238,226,17,4,17,29,10,7,245,240,11,21,24,239,242,254,2,254,2 40,236,27,27,27,226,1,231,242,14,3,224,16,28 }

},

{ //15

{ 144,90,255,240,204,212,75,145,244,244,253,3,246,231,20,35,2,247,0,9,17,253,239,236,4,10 ,4,12,226,10,234,241,249,246,243,16,11,236,240,6 },

{ 17,192,156,42,18,64,35,156,27,170,245,7,37,227,12,238,236,226,244,19,15,28,248,254,16,2 ,11,245,247,234,230,11,241,246,250,247,26,22,11,225 },

{ 96,105,33,128,64,168,109,238,7,220,13,216,17,6,4,236,251,27,240,5,29,27,33,253,9,13,9,23 7,246,242,225,255,3,11,245,244,246,229,8,9 }

},

{ //16

{ 223,218,219,179,187,78,21,255,237,240,18,13,24,255,112,50,17,18,233,10,8,0,52,30,253,24 3,13,15,239,255,16,12,252,22,18,26,31,8,248,234 },

{ 150,153,3,118,64,196,200,3,6,226,33,11,225,246,11,246,253,2,24,5,220,29,198,29,251,5,24 9,242,253,30,15,239,253,249,251,6,5,5,4,3 },

{ 33,16,71,217,145,211,63,152,24,242,21,8,229,248,250,31,13,247,245,244,18,229,9,13,231,0 ,33,226,42,58,227,252,242,0,245,229,30,226,15,20 }

},

{ //17

{ 6,17,18,13,246,12,246,246,160,32,34,34,11,17,78,221,226,243,23,24,236,227,237,36,246,249,14,17,250,15,253,13,249,255,255,15,249,253,241,243 },

{ 221,177,29,166,190,64,65,70,248,20,251,0,211,28,170,29,12,9,26,0,230,28,225,242,0,14,15,230,16,246,247,252,4,20,16,6,237,11,245,255 },

{ 255,12,128,144,10,139,9,204,245,247,10,252,38,239,0,252,11,246,237,5,230,250,242,247,246,15,246,6,253,244,245,4,8,243,238,8,9,6,23,253 }

},

{ //18

{ 10,9,5,13,237,244,13,9,144,80,64,135,148,192,187,153,245,233,12,254,22,240,228,240,1,241,14,234,251,246,240,8,0,251,22,10,248,11,248,12 },

{ 18,145,200,23,210,86,20,68,16,226,228,17,28,20,44,14,5,225,8,18,19,234,62,240,1,14,13,12,156,247,245,252,3,13,22,10,31,242,255,233 },

{ 34,100,184,33,190,132,64,62,250,214,38,236,0,247,19,226,2,225,5,18,14,234,221,27,251,240,252,243,254,4,10,12,251,21,245,0,251,246,7,245 }

},

{ //19

{ 152,21,151,154,2,143,0,9,3,254,10,3,1,252,7,0,245,228,240,229,223,30,252,251,1,243,25,251,22,25,241,32,1,247,22,252,246,250,255,242 },

{ 65,127,3,16,71,132,128,64,4,250,9,250,244,241,254,5,15,244,15,237,233,245,18,242,244,6,25,15,13,250,10,3,253,2,4,249,241,16,252,5 },

{ 93,78,77,13,77,10,74,76,230,246,245,229,253,241,232,233,238,246,253,242,234,22,251,17,243,1,22,234,8,246,236,6,0,7,20,239,9,232,234,24 }

},

{ //20

{ 25,9,189,212,64,19,31,205,220,245,230,40,239,0,19,15,3,223,240,243,250,27,5,247,19,5,244,16,5,1,252,12,224,0,21,224,218,250,5,236 },

{ 156,226,44,126,132,128,59,6,235,223,21,32,249,241,223,10,1,24,33,15,246,228,18,27,243,5,13,251,6,16,5,9,244,6,247,11,3,7,3,3 },

{ 151,155,87,86,126,12,12,45,228,98,112,100,96,154,226,210,10,27,220,232,227,232,15,10,253,246,236,0,239,28,236,18,247,9,244,5,23,13,19,247 }

},

{ //21
{ 213,217,28,55,201,117,149,193,33,145,12,226,1,17,205,207,6,236,8,22,251,232,254,253,246,25,7,235,249,6,6,9,230,41,220,21,223,232,13,22 },

{ 152,160,93,94,15,20,150,122,251,21,4,22,17,20,249,5,254,226,19,242,239,241,13,226,5,251,10,244,16,24,1,237,4,252,253,7,8,13,245,19 },

{ 4,59,193,96,56,52,179,118,253,10,13,10,237,247,236,16,254,9,13,255,10,239,243,9,242,231,241,22,234,18,238,242,251,253,6,5,9,13,5,251 }
},

{ //22
{ 230,137,74,51,12,202,143,142,228,253,223,89,46,226,21,5,245,242,28,12,8,19,11,89,248,247,248,225,243,246,22,0,4,6,7,247,253,7,30,4 },

{ 23,218,161,185,1,30,53,214,251,249,10,5,12,249,248,246,0,13,29,26,231,28,33,255,252,27,22,24,12,25,23,242,3,8,6,8,239,12,242,251 },

{ 230,112,49,73,234,18,52,87,20,226,28,228,248,253,24,37,233,6,20,244,8,244,23,229,241,222,240,36,6,13,18,237,238,241,244,248,5,1,250,232 }
},

{ //23
{ 18,83,25,146,145,254,139,196,234,25,227,1,243,33,5,245,0,243,255,228,29,33,11,7,7,251,234,253,2,242,241,17,253,2,237,255,11,234,235,233 },

{ 95,161,226,227,155,193,209,211,12,244,243,242,8,25,240,7,244,19,228,232,232,228,27,10,3,7,15,29,28,17,2,2,253,7,8,5,11,250,3,8 },

{ 252,25,15,20,225,16,245,8,0,247,5,252,10,245,16,253,141,147,191,255,242,20,43,42,239,153,214,83,81,1,24,78,253,243,18,8,7,241,9,227 }
},

{ //24
{ 192,206,13,212,53,240,221,155,12,226,21,17,237,222,230,239,244,3,13,228,20,246,9,26,10,8,243,227,235,236,5,11,251,228,238,16,245,249,252,238 },

{ 16,237,243,250,250,248,242,6,180,245,249,0,241,55,243,248,247,20,235,206,237,144,5,23,3,253,15,241,236,248,5,7,5,241,252,28,252,250,20,237 },

{ 19,250,29,77,29,231,35,117,233,34,24,237,246,215,19,0,2,18,0,8,12,43,22,27,7,29,41,226,222,11,39,217,2,231,237,22,18,221,250,20 }

},
{ //25
{ 17,146,151,187,190,244,128,189,243,245,12,30,27,233,232,15,255,25,24,217,236,163,228,19,1,11,243,4,227,233,21,24,5,8,231,228,242,234,254,17 },

{ 24,34,227,105,207,68,155,210,254,246,243,11,21,239,224,16,12,253,9,19,4,30,244,231,252,14,245,23,13,18,6,26,9,243,5,247,14,4,22,247 },

{ 87,218,200,83,201,216,83,27,235,243,243,7,15,11,238,38,11,6,252,228,9,253,17,245,247,3,14,242,13,238,12,236,18,8,250,17,235,236,239,236 }
},
{ //26
{ 20,246,231,207,153,1,245,35,251,244,15,1,20,43,237,14,3,10,253,233,234,246,12,250,114,140,177,44,41,50,193,76,5,9,19,237,235,235,13,3 },

{ 7,6,232,255,222,247,234,238,210,23,158,25,249,32,96,196,7,236,30,23,231,21,244,37,253,237,250,27,239,240,24,229,2,231,242,251,2,1,240,12 },

{ 127,31,36,50,221,172,221,8,10,16,23,21,27,238,233,22,228,237,252,223,243,14,224,14,234,7,44,233,10,0,228,243,254,15,248,20,238,233,238,3 }
},
{ //27
{ 89,220,31,228,149,173,109,31,8,233,224,13,226,26,10,239,4,236,227,12,249,248,9,237,255,15,241,7,16,235,11,32,247,233,28,252,11,30,26,239 },

{ 18,27,30,18,214,16,24,27,245,25,10,232,221,25,14,249,213,158,250,35,216,85,31,152,241,236,14,225,17,15,31,238,250,5,249,255,242,239,249,249 },

{ 212,16,221,1,164,142,186,172,7,249,12,230,19,0,21,233,8,20,12,21,100,5,32,204,0,15,13,250,10,245,21,21,3,255,18,252,13,237,30,234 }
},
{ //28
{ 0,222,10,6,229,238,242,238,239,232,42,42,139,27,238,48,245,13,254,16,231,13,248,238,3,11,13,4,10,32,0,242,250,239,248,252,20,8,34,228 },

{ 17,250,18,144,20,235,198,168,239,28,223,2,231,125,21,228,0,247,239,250,244,248,237,17,8,239,247,16,242,230,218,250,6,16,35,33,235,22,12,234 },

{ 143,176,0,168,35,198,182,86,225,231,225,30,34,21,3,30,25,251,228,229,15,225,34,241,26,250,242,233,236,8,243,10,11,0,234,6,238,247,9,248 }

},

{ //29

{ 142,228,177,209,150,153,239,215,10,243,32,253,18,28,219,226,10,231,234,9,17,240,23,233,0,20,14,248,238,241,25,230,252,12,10,4,19,240,14,243 },

{ 4,14,3,253,240,236,50,233,64,117,239,169,95,97,33,59,26,237,254,18,237,23,235,227,249,6,237,247,17,23,1,9,241,8,20,10,246,250,253,9 },

{ 22,22,153,217,192,254,244,182,7,217,238,227,33,22,17,8,248,248,1,249,10,235,224,24,253,10,241,1,244,9,12,244,253,8,229,233,6,217,217,37 }

},

{ //30

{ 5,19,222,241,7,250,50,203,146,94,92,104,157,63,106,238,245,5,50,25,175,221,224,33,8,249,251,18,230,22,234,28,8,17,28,252,21,8,27,13 },

{ 86,155,90,21,154,129,253,103,225,20,252,242,252,26,19,17,25,3,45,34,31,1,36,240,238,0,231,32,13,31,87,229,5,9,255,9,23,239,16,234 },

{ 109,254,113,1,204,153,149,192,247,22,226,232,26,30,11,237,2,18,20,18,15,255,245,12,7,12,1,11,248,16,247,14,251,232,14,241,223,235,16,254 }

},

{ //31

{ 4,242,247,24,241,233,221,5,8,232,0,12,30,242,28,17,248,7,3,4,236,9,240,24,174,106,202,230,170,75,220,16,251,246,10,14,250,250,8,242 },

{ 6,13,0,14,243,25,247,12,248,235,18,34,24,251,10,33,144,99,42,221,168,39,89,213,242,230,12,23,232,26,27,21,243,243,9,228,27,246,11,239 },

{ 219,222,161,14,16,68,34,227,19,230,230,251,238,14,37,239,255,233,236,224,7,229,230,14,242,238,9,11,230,242,18,21,13,23,18,243,15,255,236,245 }

},

{ //32

{ 217,73,31,32,10,37,40,101,4,19,224,18,7,23,228,242,5,30,242,245,239,7,214,229,248,243,17,243,16,25,231,12,4,237,3,4,232,233,30,9 },

{ 162,244,82,93,96,22,119,252,30,229,242,244,4,39,22,238,12,10,249,253,240,246,236,9,226,225,228,251,29,22,7,30,234,226,19,27,254,15,5,28 },

{ 138,175,188,179,84,197,101,185,4,12,23,227,244,5,248,48,17,239,21,242,245,7,229,219,2,245,236,228,242,1,22,230,251,15,5,14,246,5,253,7 }

},

{ //33

{ 64,163,169,255,81,164,223,41,3,226,241,7,19,7,11,247,248,250,247,28,244,26,9,235,0,10,19,14,28,23,22,253,229,228,234,1,235,235,27,246 },

{ 54,172,84,60,232,78,216,234,22,12,16,234,40,227,225,249,228,0,237,244,251,252,241,34,20,238,14,4,18,244,235,21,21,237,237,240,11,241,255,240 },

{ 8,12,1,245,229,244,250,245,4,249,245,3,15,247,247,11,169,159,192,1,224,248,246,52,7,224,241,28,4,13,163,22,16,10,239,17,240,247,234,238 }

},

{ //34

{ 163,227,37,65,3,155,95,157,237,225,96,82,227,32,180,68,248,246,29,2,236,26,31,23,229,17,9,251,13,244,229,231,239,7,224,1,239,12,23,247 },

{ 88,28,152,224,174,104,21,136,32,243,232,228,252,24,225,230,11,241,43,252,242,231,250,247,250,6,23,14,233,241,9,237,240,250,235,8,7,24,250,13 },

{ 93,203,216,223,226,37,13,133,1,225,236,14,21,21,20,172,11,25,18,232,221,242,223,169,12,236,13,232,21,17,23,251,251,7,245,232,6,227,237,13 }

}
};

Referring to Table 8, it is assumed that a total of 35 transform sets are configured, but the disclosure is not limited thereto. For example, as described above with reference to FIG. 12, any one of 35 transform sets may be determined according to the intra prediction mode. The decoder may determine the rotation angle of the LGT applied to the secondary transform of the current block based on the index value transmitted from the encoder within the transform set determined according to the intra prediction mode.

In Table 8, the angle index table of 4×4 LGT may be expressed as g_nsstLGTPar4×4[35][3][40]. Here, [35] denotes that the number of possible transform sets is 35. [3] denotes that a maximum of three transforms exist per transform set, and [40] denotes that the number of givens rotations in the givens rotation layer is 40.

As described above, since in the planar mode and the DC mode, the number of transforms included in the corresponding transform set is two, g_nsstLGTPar4×4[0][2][ . . . ] and g_nsstLGTPar4×4[1] [2][ . . . ] may not be used.

As illustrated in FIG. 41, 16 inputs ($x_i$(i=0, 1, . . . , 15)) may correspond to an array configured by scanning 4×4 blocks in a row-first order. 16 outputs ($y_i$(i=0, 1, . . . , 15)) may be arranged according to the forward scan order. For example, they may be, or may not be, arranged according to a mode dependent coefficient scanning (MDCS) scheme. That is, when the MDCS is not applied, 16 output values may be arranged in the 4×4 block region according to a general scan order (e.g., a diagonal scan order).

FIG. 42 illustrates an example permutation process according to an embodiment of the disclosure.

FIG. 42 illustrates an example as to how a permutation process is performed in the permutation block illustrated in FIG. 41 described above. Here, an array of 16 elements (or coefficients) [11, 7, 13, 5, 0, 8, 4, 15, 1, 6, 14, 2, 10, 3, 12, 9] corresponds to the permutation matrix (or permutation layer) shown in FIG. 42. When this array is expressed as Z and the ith element is expressed as Z(i)(i=0, 1, . . . , 15), $p_{2j}$ and $p_{2j+1}$ (j=0, 1, . . . , 7) generated from the jth givens rotation may be connected to $q_{Z(2j)}$ and $q_{Z(2j+1)}$. In the permutation 0 block of FIG. 41 described above, $p_{2j}$ and $p_{2j+1}$ correspond to input data that is not generated by the jth givens rotation, but the operation method is the same as that of other permutation blocks. As shown in FIG. 41, since the 4×4 LGT includes 6 permutation blocks, a total of 16×6=96 elements (or coefficients) are required. Table 9 below shows an index table including all permutation information.

[Table 9]

```
const UChar g_nsstLGTPermut4x4[35][3][96] = {
{ //0
{ 0,2,1,4,6,8,7,9,10,3,11,5,12,14,13,15,0,3,2,9,4,11,6,5,8,10,7,12,1,15,14,13,0,14,2,4,6,10,3,1,
8,11,7,12,5,15,9,13,0,10,2,1,4,9,5,8,3,13,6,12,14,7,11,15,0,3,1,6,4,2,5,11,8,10,7,14,15,9,12,13,
0,1,2,4,6,8,5,3,11,7,14,10,15,13,12,9 },
{ 0,2,4,6,1,3,5,7,8,10,9,12,14,11,15,13,0,3,1,6,2,8,4,10,12,9,7,14,11,15,13,5,0,2,4,8,6,15,5,3,9,
12,10,7,1,13,14,11,0,5,2,12,4,8,3,13,6,1,10,15,11,7,9,14,0,8,2,4,1,7,3,11,6,13,10,12,9,14,15,5,
0,4,2,1,8,15,3,5,6,7,9,11,12,10,14,13 },
{ 0,1,2,3,4,5,6,7,8,9,10,11,12,13,14,15,0,1,2,3,4,5,6,7,8,9,10,11,12,13,14,15,0,1,2,3,4,5,6,7,8,9
,10,11,12,13,14,15,0,1,2,3,4,5,6,7,8,9,10,11,12,13,14,15,0,1,2,3,4,5,6,7,8,9,10,11,12,13,14,15,
0,1,2,3,4,5,6,7,8,9,10,11,12,13,14,15 }
},
{ //1
{ 0,2,3,4,6,8,7,10,12,13,9,5,14,11,15,1,0,15,1,2,4,11,6,8,3,10,5,13,7,9,12,14,2,0,4,3,6,10,1,5,8,
11,9,12,7,14,15,13,0,10,2,6,3,1,4,11,8,14,7,5,12,9,15,13,0,3,2,4,6,12,8,10,5,1,9,13,7,15,14,11,
0,14,1,2,3,6,12,13,4,5,8,11,7,9,10,15 },
{ 0,1,2,4,6,3,7,8,10,12,14,5,15,11,13,9,0,2,4,8,5,12,6,3,10,15,9,14,7,13,11,1,0,12,2,8,3,4,1,9,6,
5,10,7,11,14,13,15,0,5,2,4,6,9,1,8,7,3,10,12,14,13,11,15,0,5,2,1,4,6,3,10,8,7,11,13,12,14,9,15,
0,7,4,5,1,3,2,8,10,9,6,13,11,15,12,14 },
{ 0,1,2,3,4,5,6,7,8,9,10,11,12,13,14,15,0,1,2,3,4,5,6,7,8,9,10,11,12,13,14,15,0,1,2,3,4,5,6,7,8,9
,10,11,12,13,14,15,0,1,2,3,4,5,6,7,8,9,10,11,12,13,14,15,0,1,2,3,4,5,6,7,8,9,10,11,12,13,14,15,
0,1,2,3,4,5,6,7,8,9,10,11,12,13,14,15 }
},
```

{ //2

{ 0,1,2,4,6,7,8,10,5,9,12,14,3,11,15,13,2,0,4,3,6,10,8,1,9,11,14,5,15,12,13,7,0,3,2,7,4,10,6,15,
8,1,12,5,14,11,13,9,0,12,2,8,4,3,6,13,10,9,14,15,7,5,1,11,0,11,2,12,3,14,4,9,6,1,8,15,7,13,10,5,
0,4,2,8,5,12,1,3,11,13,14,15,10,6,9,7 },

{ 0,1,2,4,6,8,10,12,9,11,3,14,5,13,15,7,0,2,13,1,14,4,6,3,8,12,10,9,15,7,5,11,0,4,2,1,6,15,8,12,
10,7,3,5,9,11,14,13,0,13,7,2,11,4,3,6,1,5,8,12,10,14,9,15,0,3,2,9,4,5,6,10,8,1,12,11,7,15,14,13,
0,13,1,9,14,6,12,5,7,10,2,4,11,15,8,3 },

{ 0,2,4,1,6,5,3,8,10,7,12,13,11,14,15,9,6,0,10,2,1,4,11,8,7,12,14,9,3,5,13,15,0,3,2,11,4,12,6,13
,8,14,5,1,7,9,10,15,0,10,2,8,4,1,6,9,5,14,7,12,15,3,11,13,0,8,2,5,1,4,3,12,6,10,7,9,11,15,14,13,
0,3,9,8,6,7,5,1,2,4,15,11,10,14,12,13 }

},

{ //3

{ 0,2,4,6,3,8,5,7,10,1,9,12,13,11,14,15,0,11,1,6,2,10,5,4,8,3,15,9,14,12,7,13,0,2,13,4,6,12,9,5,
3,8,1,10,11,7,15,14,0,11,5,1,2,4,3,13,6,9,8,14,10,12,15,7,0,2,3,4,6,11,8,9,10,13,12,14,5,1,15,7,
0,15,1,13,14,7,4,12,5,8,2,6,9,3,11,10 },

{ 0,2,4,5,1,6,8,10,12,9,3,14,15,11,13,7,0,8,2,1,6,4,15,10,11,9,7,3,14,12,5,13,0,9,2,14,4,11,6,3,
8,10,1,13,12,5,7,15,0,5,2,9,3,14,4,13,6,12,8,15,7,10,11,1,0,9,2,4,6,10,8,1,12,14,11,3,15,13,5,7,
0,3,14,12,10,15,8,11,1,2,5,7,13,6,9,4 },

{ 0,1,2,3,4,6,8,10,5,9,7,12,11,14,13,15,0,2,3,1,4,12,5,6,8,13,9,10,7,15,14,11,0,4,2,6,7,3,8,13,1
0,5,11,15,1,12,9,14,0,3,2,11,4,14,5,6,8,1,9,7,10,12,13,15,0,15,2,12,1,6,4,3,8,10,7,13,14,11,9,5,
0,10,1,13,5,12,6,3,7,9,8,15,2,4,11,14 }

},

{ //4

{ 0,1,2,4,6,8,10,5,9,11,12,3,7,13,14,15,0,2,4,14,6,7,3,11,8,10,5,9,12,1,15,13,0,13,2,6,4,8,5,9,1,
7,3,12,10,15,11,14,10,0,7,2,4,6,8,1,12,5,14,9,13,3,15,11,0,12,2,7,4,10,6,11,8,13,3,9,1,14,5,15,
0,13,3,2,12,15,5,8,11,7,9,6,1,4,10,14 },

{ 0,2,4,6,1,8,3,5,10,12,9,14,15,11,13,7,6,0,2,7,4,10,13,5,12,8,11,9,1,15,14,3,0,9,2,11,4,6,8,10,
1,7,12,15,13,5,14,3,0,9,2,13,4,11,6,5,8,3,1,15,10,12,14,7,0,8,2,12,9,4,1,11,6,5,10,7,13,14,3,15,
0,10,9,12,7,1,2,5,4,6,14,13,3,8,11,15 },

{ 0,2,4,6,1,3,8,10,12,14,5,9,13,15,11,7,0,8,2,1,11,4,15,6,10,14,5,7,12,9,3,13,0,8,2,12,15,4,11,6
,3,5,10,9,1,13,7,14,0,12,2,1,3,13,4,7,6,5,8,10,14,9,11,15,0,8,2,4,6,9,3,15,7,11,10,14,1,13,12,5,
0,9,4,2,7,12,10,8,1,5,14,11,6,3,13,15 }

},

{ //5

{ 0,2,4,6,8,1,10,12,14,3,9,15,7,5,11,13,0,3,2,9,4,11,6,14,1,10,8,13,7,15,5,12,0,6,2,1,3,9,10,4,7, 8,12,11,14,13,15,5,0,8,2,1,4,5,3,6,10,14,12,9,7,13,15,11,0,4,2,14,6,11,8,7,3,1,5,13,10,15,12,9, 0,8,1,3,7,5,10,4,2,11,13,9,14,12,15,6 },

{ 0,2,4,6,1,8,3,5,9,10,12,14,15,13,11,7,6,0,8,1,10,2,4,15,7,3,12,9,5,11,13,14,0,2,3,8,4,15,6,14, 10,7,12,9,5,11,13,1,0,5,2,4,6,13,8,1,10,7,12,14,11,15,3,9,0,15,2,1,4,11,5,13,6,3,8,10,9,7,12,14, 0,1,4,3,7,13,8,5,6,9,11,10,15,14,12,2 },

{ 0,2,3,4,1,6,8,5,7,9,10,12,14,11,15,13,0,4,1,2,3,8,5,7,6,10,11,9,12,15,14,13,0,2,1,3,4,6,5,8,14, 10,7,11,15,12,13,9,0,3,2,4,6,13,8,7,10,15,12,9,5,1,11,14,0,13,2,5,4,14,1,12,6,10,8,11,9,7,15,3, 2,1,0,7,12,6,3,4,9,13,5,11,8,15,14,10 }

},

{ //6

{ 0,2,4,6,1,8,9,7,10,3,12,5,11,14,15,13,0,6,7,2,4,14,5,12,8,10,13,1,3,15,9,11,0,14,2,12,4,6,8,5, 10,9,1,11,7,3,13,15,0,3,2,10,4,12,6,8,1,15,5,11,14,9,13,7,8,0,12,2,4,10,1,6,5,7,15,13,14,3,11,9, 0,15,2,6,10,7,14,11,1,4,5,13,12,9,3,8 },

{ 0,2,4,6,8,10,3,12,11,9,14,7,13,15,1,5,0,11,2,10,4,5,6,14,1,3,8,13,12,15,9,7,0,8,2,9,4,11,6,13, 1,10,15,3,12,5,7,14,0,7,1,5,2,12,4,3,6,11,8,15,10,14,13,9,0,2,4,5,6,8,1,15,3,7,10,14,12,11,9,13, 2,0,4,6,7,10,11,9,14,15,5,8,12,13,3,1 },

{ 0,2,4,6,1,3,5,8,10,11,12,7,14,15,13,9,8,0,1,2,4,10,9,6,7,12,5,14,13,11,3,15,0,5,2,13,4,12,6,15 ,8,7,10,14,3,11,9,1,0,3,2,7,4,9,6,15,8,13,10,14,12,11,1,5,0,3,2,9,4,11,6,14,8,10,12,5,15,1,7,13, 0,4,6,7,5,13,15,14,1,10,2,9,8,11,12,3 }

},

{ //7

{ 0,2,1,4,6,8,3,10,12,7,9,11,14,13,15,5,0,3,2,8,4,11,1,9,6,12,10,14,7,13,5,15,6,0,2,1,4,3,8,7,10, 12,15,9,11,14,5,13,0,4,2,14,6,11,5,12,8,1,10,13,7,15,9,3,0,10,2,11,4,1,6,3,5,14,8,12,9,7,13,15, 0,1,6,9,3,5,7,8,4,2,15,11,10,12,13,14 },

{ 0,2,3,4,1,6,8,5,7,10,12,9,11,13,14,15,0,8,2,4,6,3,5,9,7,12,11,1,14,10,15,13,0,15,2,12,4,8,6,10 ,5,14,11,3,9,13,1,7,0,14,7,2,1,3,4,13,6,11,8,9,5,15,10,12,0,4,2,8,6,12,10,1,7,11,5,3,14,13,9,15, 2,8,10,5,3,1,15,13,0,4,7,12,11,14,6,9 },

{ 0,1,2,4,6,8,10,5,3,7,9,11,12,14,13,15,0,2,4,7,6,12,1,8,13,5,3,10,14,9,15,11,0,3,2,12,4,8,6,5,1, 14,10,13,7,11,15,9,0,8,2,9,4,12,6,3,1,15,10,14,13,7,11,5,0,8,2,1,3,15,4,11,6,9,10,5,12,7,14,13, 0,10,3,6,13,12,4,8,2,1,14,15,5,11,7,9 }

},

{ //8

{ 0,2,4,6,1,3,8,10,12,13,11,14,5,7,15,9,0,3,1,2,13,4,6,14,8,11,7,9,5,10,15,12,0,10,2,8,4,9,6,3,12,14,7,1,5,11,15,13,0,11,2,9,4,3,5,1,6,10,7,14,8,13,12,15,0,10,14,2,6,4,7,8,1,9,11,3,12,15,13,5,0,12,15,3,9,10,7,2,1,5,11,4,13,6,8,14 },

{ 0,2,4,6,1,8,10,3,9,12,5,7,14,13,11,15,0,1,7,2,4,12,11,6,3,5,8,13,15,10,9,14,0,6,2,1,3,12,4,10,8,5,14,11,9,15,13,7,0,8,1,2,4,11,9,6,7,14,15,10,12,13,3,5,0,2,4,9,11,6,3,10,8,13,7,15,12,1,5,14,0,11,3,2,8,12,13,14,1,5,4,10,6,7,9,15 },

{ 0,2,4,5,1,6,8,10,7,3,12,9,14,11,15,13,8,0,2,9,4,6,10,1,12,5,14,7,15,13,3,11,0,3,2,14,4,13,6,5,8,12,10,15,9,7,11,1,0,3,2,1,4,14,6,15,7,9,8,10,5,12,11,13,0,12,2,13,4,1,6,3,5,8,10,15,14,9,11,7,1,4,3,0,8,5,12,15,14,9,10,13,2,6,7,11 }

},

{ //9

{ 0,2,4,1,6,8,10,12,14,11,15,5,3,7,9,13,0,6,2,9,4,13,8,11,10,15,12,3,7,5,1,14,0,9,2,12,4,11,6,10,1,15,8,13,5,7,14,3,0,8,13,2,4,10,6,5,12,9,7,15,3,1,11,14,0,9,2,14,4,15,3,10,6,8,1,13,12,7,11,5,0,5,7,9,12,8,1,6,4,2,14,15,3,11,10,13 },

{ 0,2,4,5,1,6,8,10,7,3,9,12,14,11,15,13,8,0,1,2,4,6,9,7,13,10,12,15,14,11,5,3,0,1,2,15,4,14,10,6,8,3,11,7,9,12,13,5,0,11,1,2,4,14,6,15,3,8,10,9,12,5,7,13,0,14,2,12,4,9,6,11,1,10,8,15,13,3,5,7,0,4,11,6,13,9,12,14,7,5,10,8,2,15,1,3 },

{ 0,2,4,6,8,10,3,1,12,9,11,7,14,13,15,5,0,12,2,10,4,15,5,13,6,3,8,14,9,11,1,7,0,7,2,10,4,6,1,13,3,9,8,11,5,14,12,15,8,0,2,1,4,3,5,6,7,9,10,13,11,12,15,14,0,8,2,12,4,1,6,14,3,10,9,15,7,11,13,5,0,12,5,1,14,15,9,11,3,10,2,4,7,13,8,6 }

},

{ //10

{ 0,2,4,5,1,6,8,10,3,12,7,9,11,14,13,15,0,8,1,2,6,4,9,10,12,14,7,13,5,15,3,11,0,14,2,5,4,1,6,11,8,3,10,13,12,7,15,9,0,12,2,14,4,13,6,11,8,1,9,3,10,15,7,5,0,3,2,5,4,15,6,9,7,8,10,12,14,11,1,13,0,1,5,2,10,7,6,8,4,3,15,12,13,14,11,9 },

{ 0,2,4,6,1,8,10,12,9,14,5,13,3,7,15,11,0,8,2,5,11,4,14,6,9,3,10,15,12,13,1,7,0,13,2,1,4,7,5,9,6,12,14,8,3,10,11,15,0,8,7,2,6,4,3,15,1,10,13,12,14,9,5,11,0,11,1,6,2,14,4,15,7,12,3,9,8,5,10,13,2,3,11,5,10,13,0,8,15,12,1,4,7,6,14,9 },

{ 0,1,2,3,4,6,8,10,7,5,12,14,11,13,15,9,2,0,3,4,1,6,8,7,10,15,5,11,9,12,13,14,0,3,2,4,5,9,6,10,1,13,7,8,11,14,12,15,0,3,2,13,4,6,8,10,1,5,12,11,9,14,7,15,0,7,2,8,4,5,1,14,6,11,10,12,3,9,13,15,0,12,2,5,6,13,4,8,3,1,9,10,11,7,14,15 }

},

{ //11

{ 0,2,4,1,3,6,5,8,10,12,7,9,13,11,14,15,0,4,3,1,2,8,6,12,14,9,7,13,10,5,15,11,0,2,4,1,6,15,8,12,7,10,5,11,14,3,9,13,0,6,1,11,2,12,4,8,3,15,5,9,10,13,14,7,0,2,4,10,6,12,8,14,11,15,5,1,3,13,9,7,0,2,1,3,7,6,13,11,4,5,12,9,15,14,8,10 },

{ 0,2,4,5,1,6,8,10,7,9,3,12,14,11,13,15,0,3,11,2,4,6,1,7,8,12,13,10,9,5,14,15,0,9,2,1,15,4,6,3,8,5,10,12,7,14,13,11,0,7,2,8,4,12,6,11,3,9,10,13,1,14,15,5,0,7,1,5,2,11,3,4,6,9,8,10,12,15,13,14,1,2,13,6,0,3,12,5,11,4,9,10,8,15,14,7 },

{ 0,1,2,4,6,8,10,12,13,14,11,15,5,3,7,9,0,2,4,13,5,1,6,15,3,8,9,12,10,7,11,14,0,13,2,15,4,6,8,3,10,5,12,11,14,7,9,1,0,3,2,11,4,10,15,6,8,5,7,9,12,14,13,1,0,13,2,1,4,9,3,6,5,14,8,12,10,7,11,15,0,1,5,9,12,11,15,6,7,4,13,10,3,2,14,8 }

},

{ //12

{ 0,2,4,6,1,3,5,7,8,10,12,14,11,9,15,13,6,0,2,1,4,8,5,10,7,13,12,3,15,9,14,11,0,7,12,1,2,4,9,6,11,8,10,14,13,5,15,3,0,2,4,11,6,15,8,5,3,1,10,14,12,9,7,13,0,5,2,7,4,1,6,13,8,3,10,14,9,15,12,11,0,2,9,3,4,5,10,11,1,6,8,12,13,14,15,7 },

{ 0,2,4,6,1,3,8,7,10,11,12,14,9,13,5,15,8,0,2,10,4,15,6,12,3,5,1,9,11,14,7,13,0,12,1,8,2,14,4,3,6,9,7,13,10,5,15,11,0,2,4,15,6,5,8,10,12,1,14,11,9,13,3,7,0,9,2,14,4,12,6,15,3,5,8,7,10,1,11,13,2,3,5,0,10,6,11,9,4,1,8,13,15,14,7,12 },

{ 0,2,4,5,1,6,8,9,10,3,7,12,11,14,13,15,6,0,1,2,3,4,9,7,8,5,10,14,11,12,15,13,0,5,2,4,1,10,6,8,9,14,12,3,11,13,7,15,0,4,2,13,6,11,8,3,10,1,5,14,9,15,12,7,0,12,2,9,4,10,1,3,6,14,8,5,11,15,13,7,0,7,4,6,12,2,1,15,5,3,13,11,9,14,8,10 }

},

{ //13

{ 0,2,4,6,1,8,5,10,9,3,12,7,14,13,15,11,0,3,2,12,4,1,6,14,8,11,10,7,9,5,13,15,0,5,1,6,2,9,4,13,8,11,3,7,10,15,12,14,2,0,9,3,8,4,10,1,6,7,11,14,13,5,12,15,0,8,2,4,6,15,7,14,5,10,12,13,11,1,9,3,15,0,3,8,9,6,12,5,4,1,13,11,2,7,10,14 },

{ 0,2,4,6,1,3,5,7,8,10,12,9,11,14,15,13,0,6,8,1,2,10,11,4,5,7,12,9,14,3,13,15,0,2,4,7,6,12,8,3,1,14,10,5,9,13,11,15,0,7,2,1,3,10,4,11,6,14,8,13,12,5,9,15,0,14,2,4,6,13,8,5,3,9,10,7,11,12,1,15,0,4,3,9,6,5,14,15,2,8,10,13,12,11,1,7 },

{ 0,2,4,6,1,3,8,5,10,12,14,9,11,13,15,7,0,8,2,10,4,7,6,13,5,12,3,14,1,15,11,9,0,14,12,2,7,3,4,10,6,13,8,15,5,11,1,9,0,14,1,2,4,13,5,6,9,3,8,12,10,15,11,7,0,2,1,8,4,6,10,12,9,13,3,14,5,11,7,15,0,5,3,1,14,15,12,4,7,9,11,13,8,10,6,2 }

},

{ //14

{ 0,2,3,4,1,6,8,9,7,10,12,13,11,5,14,15,0,4,1,2,3,13,5,9,6,8,10,14,7,12,11,15,0,2,3,1,6,4,8,12,9,10,7,11,15,5,13,14,0,4,2,6,3,9,8,13,10,1,12,14,5,7,15,11,0,9,2,8,4,12,6,15,1,11,5,14,7,3,10,13,0,5,2,3,11,13,6,9,1,4,12,8,14,15,10,7 },

{ 0,2,4,6,8,10,11,5,1,9,12,14,3,13,15,7,0,12,2,14,4,10,6,11,3,9,1,8,5,13,7,15,0,6,4,1,2,5,11,3,8,14,13,10,12,7,15,9,0,2,4,6,8,1,10,3,9,15,5,12,11,13,7,14,0,7,2,14,4,12,6,3,8,10,9,11,13,5,1,15,0,12,1,9,11,15,10,6,4,5,7,8,13,14,2,3 },

{ 0,2,4,6,1,3,5,7,8,10,12,14,9,11,13,15,8,0,2,1,10,4,12,6,14,9,11,3,5,15,13,7,0,10,2,5,4,7,6,13,8,1,11,14,12,15,9,3,0,9,2,14,4,13,1,11,6,12,8,10,5,3,7,15,0,4,1,15,2,10,6,5,8,13,7,14,12,9,3,11,0,10,11,13,9,5,3,4,2,6,14,15,7,1,8,12 }

},

{ //15

{ 0,1,2,3,4,6,8,10,12,9,14,15,7,13,5,11,0,2,4,3,1,6,8,15,14,10,5,12,11,7,9,13,0,3,2,4,6,5,8,15,10,13,9,1,7,11,12,14,0,12,2,15,4,7,3,11,6,10,8,5,1,13,9,14,0,3,2,6,4,7,8,15,10,13,12,14,9,5,1,11,0,2,3,6,7,11,10,14,12,8,5,1,9,4,13,15 },

{ 0,2,4,6,1,8,5,10,11,9,12,7,14,15,13,3,6,0,2,9,4,3,5,11,8,12,1,10,14,13,7,15,0,9,12,2,4,6,8,1,10,5,14,15,13,3,7,11,0,11,2,13,4,9,6,5,8,14,10,15,12,1,7,3,0,9,2,5,4,11,3,14,6,13,8,7,10,15,12,1,3,7,13,12,6,10,0,5,4,9,11,8,1,2,15,14 },

{ 0,2,4,6,1,3,5,8,10,9,12,14,11,7,13,15,0,6,5,2,8,4,15,3,1,10,13,7,9,12,14,11,0,3,2,4,1,8,6,9,10,7,12,15,11,5,14,13,0,4,2,11,6,9,8,7,1,10,3,12,5,13,14,15,0,7,1,8,2,3,4,13,6,11,5,10,9,14,12,15,0,9,6,10,7,2,1,3,11,13,5,4,12,8,14,15 }

},

{ //16

{ 0,2,4,6,1,3,5,8,10,11,12,14,15,13,7,9,0,3,8,2,10,4,6,14,7,15,9,1,13,5,12,11,0,7,2,6,3,5,4,10,12,8,9,1,14,13,11,15,0,13,2,4,6,14,1,12,3,8,10,5,9,15,11,7,0,1,2,8,4,14,6,15,7,5,10,11,3,12,9,13,3,0,2,1,4,9,11,13,7,5,15,12,6,10,8,14 },

{ 0,2,4,6,1,3,7,8,10,12,11,5,9,14,13,15,0,4,1,6,2,14,8,3,10,9,12,5,13,11,7,15,0,2,1,4,3,11,15,6,12,8,10,14,5,7,9,13,0,4,2,8,6,12,10,7,14,5,1,9,15,13,3,11,0,3,2,1,4,7,6,5,8,11,10,9,12,14,13,15,0,5,3,2,6,13,11,12,1,7,9,4,8,15,10,14 },

{ 0,1,2,4,6,7,5,8,10,11,3,9,12,14,15,13,2,0,1,4,5,6,8,3,7,12,9,10,15,11,13,14,0,3,2,8,4,10,6,12,1,11,9,14,7,15,5,13,0,8,2,13,4,15,6,5,10,14,7,1,12,3,9,11,0,12,2,15,14,4,6,10,5,8,9,1,7,11,13,3,2,1,0,13,11,7,10,8,6,9,5,12,4,3,15,14 }

},

```
{ //17
    { 0,2,3,1,4,6,7,8,5,10,9,12,11,14,15,13,0,3,1,2,4,8,5,6,7,11,10,9,12,13,14,15,2,0,1,4,3,6,7,5,13,
    8,12,10,14,11,15,9,0,6,2,8,4,10,1,7,12,15,11,5,9,3,13,14,0,7,2,1,4,15,6,9,8,14,10,12,3,13,11,5,
    2,3,0,6,11,9,5,4,1,8,12,13,14,15,7,10 },

{ 0,2,4,6,1,8,5,10,11,3,12,9,13,14,15,7,8,0,2,14,4,10,13,6,7,15,1,12,9,5,11,3,0,10,2,13,3,9,4,5,
    6,11,8,14,15,7,1,12,0,5,2,4,6,10,8,7,12,3,14,9,15,13,11,1,0,15,1,9,2,11,4,3,6,7,8,13,5,14,10,12,
    0,4,5,8,15,14,3,6,12,9,1,2,7,11,10,13 },

{ 0,2,3,4,6,8,10,12,5,1,14,15,7,9,11,13,0,5,4,2,12,6,1,8,9,7,3,14,10,15,13,11,0,14,2,8,1,9,4,6,5,
    15,10,3,12,13,11,7,0,4,2,11,1,6,8,15,7,13,10,9,12,14,5,3,0,3,1,5,2,11,4,7,6,13,8,14,9,10,12,15,
    0,6,2,3,5,4,10,9,12,8,7,1,13,14,11,15 }
},

{ //18
    { 0,2,4,5,6,7,8,10,1,3,9,11,12,13,14,15,0,11,1,5,2,4,6,8,9,3,10,12,7,14,15,13,0,2,12,3,4,10,1,6,
    7,8,5,9,15,11,13,14,0,9,2,4,6,8,1,3,5,10,11,14,12,7,13,15,0,8,2,10,4,7,6,11,9,3,12,5,14,1,15,13,
    0,13,2,1,6,9,7,8,5,3,4,10,12,15,11,14 },

{ 0,1,2,4,6,7,3,8,10,11,9,5,12,13,14,15,0,2,3,4,12,6,1,8,9,7,5,10,11,14,13,15,0,6,1,5,2,10,4,11,
    8,3,7,9,12,15,14,13,0,2,4,8,6,5,3,1,7,11,10,12,9,15,14,13,0,12,2,6,1,5,4,3,14,8,10,7,13,9,11,15,
    0,4,2,7,5,9,1,6,14,10,8,11,3,12,13,15 },

{ 0,2,4,6,1,3,8,7,10,5,11,12,13,9,14,15,6,0,1,2,3,14,4,10,8,15,7,12,9,11,5,13,0,8,2,4,6,15,5,12,
    3,13,1,14,10,7,9,11,0,12,2,10,4,8,6,15,5,13,3,7,9,1,11,14,0,13,2,10,3,8,4,14,6,12,9,11,7,1,5,15,
    0,5,7,4,13,15,1,9,2,11,8,12,3,6,10,14 }
},

{ //19
    { 0,2,4,6,1,3,5,7,8,10,11,9,12,14,15,13,0,8,2,5,1,4,6,9,10,14,12,11,13,7,3,15,0,5,1,13,2,8,4,12,
    6,10,7,3,9,15,11,14,0,2,4,12,1,3,6,10,7,14,8,13,9,15,5,11,0,3,2,9,4,15,6,8,5,14,10,1,7,12,13,11,
    0,6,2,7,14,15,1,9,5,4,3,8,12,10,13,11 },

{ 0,2,4,1,3,6,8,10,5,7,9,12,14,13,11,15,4,0,6,2,10,3,8,12,11,7,5,15,13,9,14,1,0,3,2,1,4,12,6,10,
    8,15,9,14,7,5,13,11,0,2,1,11,4,9,6,10,3,7,5,13,8,15,12,14,0,2,4,7,6,8,1,9,10,13,3,15,11,14,5,12,
    0,4,1,7,2,10,8,5,9,6,12,11,15,13,14,3 },

{ 0,1,2,3,4,5,6,7,8,9,10,11,12,13,14,15,0,2,4,1,6,3,7,8,12,10,13,5,14,11,9,15,0,3,2,6,4,11,1,9,8,
    14,7,12,5,10,13,15,0,6,2,5,4,7,8,1,10,12,13,14,9,3,11,15,0,3,2,11,4,6,8,10,9,1,5,15,7,12,14,13,
    2,5,0,3,11,12,6,8,4,1,7,9,10,13,14,15 }
},
```

{ //20

{ 0,1,2,4,6,7,5,8,10,11,3,12,9,14,15,13,2,0,1,4,6,8,7,3,14,9,10,5,12,11,13,15,0,5,1,6,2,12,4,3,8, 10,7,11,9,15,14,13,0,2,1,6,4,11,8,3,10,12,7,15,5,13,9,14,0,4,2,7,6,14,8,12,10,15,1,11,3,9,13,5, 5,10,0,14,11,15,3,4,8,9,1,2,13,12,6,7 },

{ 0,2,4,6,1,3,7,8,10,9,5,12,14,15,13,11,8,0,2,10,4,13,6,12,7,11,9,14,5,15,1,3,0,14,2,5,4,13,6,11 ,1,15,8,3,9,12,10,7,0,6,2,1,4,14,5,11,8,7,10,12,13,3,15,9,0,10,2,15,4,6,8,7,9,1,12,13,14,3,11,5, 3,1,10,13,8,5,9,6,0,2,4,7,15,12,14,11 },

{ 0,2,4,6,1,3,5,7,8,10,11,9,12,14,13,15,0,3,1,2,7,4,6,5,11,8,10,9,14,12,13,15,8,0,6,2,1,9,4,10,1 1,5,7,3,14,12,15,13,0,4,2,1,7,6,8,12,5,9,3,10,14,13,11,15,0,14,2,9,4,3,6,5,8,1,10,13,12,15,7,11, 0,5,1,2,11,13,14,15,4,8,12,9,7,10,3,6 }

},

{ //21

{ 0,2,4,6,1,3,5,7,8,10,9,12,11,14,15,13,0,8,2,5,4,3,6,7,10,1,11,9,13,12,14,15,0,9,10,2,4,8,12,6, 5,15,14,11,7,13,1,3,0,15,2,13,4,8,6,11,5,9,1,14,10,7,3,12,0,8,2,10,4,7,3,14,6,12,5,11,1,15,13,9, 3,5,15,13,10,6,0,2,9,7,8,12,1,4,14,11 },

{ 0,2,4,6,1,3,5,7,8,10,12,14,9,11,13,15,0,6,5,2,8,1,10,4,7,12,3,9,15,13,14,11,0,4,2,5,1,8,6,9,10, 3,12,15,7,13,14,11,0,6,15,2,4,9,8,14,3,1,10,5,12,11,13,7,0,5,2,1,4,15,6,9,3,13,8,11,10,7,12,14, 0,2,10,3,5,1,9,15,11,12,13,14,6,4,8,7 },

{ 0,1,2,4,6,8,10,3,12,11,9,14,7,13,15,5,0,2,4,10,15,5,3,9,12,6,8,11,1,7,14,13,0,10,2,8,4,6,1,15, 9,14,3,5,11,12,7,13,0,10,2,12,4,14,6,7,8,3,11,13,15,5,9,1,0,15,2,11,4,13,6,5,8,1,10,12,7,14,3,9, 0,1,3,9,13,14,11,7,4,12,5,6,8,15,10,2 }

},

{ //22

{ 0,1,2,4,6,8,9,10,7,12,3,5,13,14,15,11,0,2,1,4,14,3,6,11,10,8,12,9,7,15,5,13,0,3,2,1,15,4,5,6,8, 11,10,7,12,13,9,14,0,6,2,7,4,12,1,3,8,11,5,9,10,15,13,14,0,3,2,1,4,8,5,7,6,11,9,12,10,13,14,15, 2,1,0,3,5,6,13,11,4,15,9,8,14,10,7,12 },

{ 0,2,4,6,1,3,5,8,10,9,12,14,11,13,7,15,0,8,5,2,1,4,6,14,12,10,3,11,9,13,7,15,0,3,2,7,4,8,1,14,6, 11,9,10,12,5,13,15,0,3,1,8,2,14,4,11,6,10,5,7,12,9,13,15,0,2,4,6,3,9,8,12,5,15,1,7,10,14,13,11, 0,4,2,1,13,6,11,3,8,5,14,12,7,9,15,10 },

{ 0,2,4,6,1,8,5,10,9,12,14,11,3,13,15,7,8,0,2,11,4,10,6,15,3,1,7,14,12,9,13,5,0,8,2,11,4,7,6,12, 3,5,10,1,9,14,15,13,0,11,2,8,4,1,6,13,10,3,5,9,12,15,7,14,0,15,2,14,4,9,6,5,8,1,10,3,12,11,13,7, 2,3,7,5,8,14,10,11,0,6,1,13,15,12,9,4 }

},

{ //23

{ 0,1,2,4,6,7,3,5,8,9,10,11,12,14,13,15,0,2,4,3,6,7,1,8,9,10,5,12,11,14,13,15,0,8,2,7,4,14,6,10,
3,9,15,12,11,1,5,13,0,15,2,5,4,9,6,8,1,12,7,14,10,13,11,3,0,3,2,11,4,8,6,5,1,14,9,13,10,7,12,15,
0,6,2,1,9,13,10,8,4,7,3,5,14,11,12,15 },

{ 0,2,4,6,1,3,5,7,8,10,12,14,9,11,13,15,8,0,2,10,7,4,6,12,1,9,11,3,14,5,15,13,0,7,1,9,2,14,4,10,
6,13,8,12,3,15,11,5,0,2,3,12,4,13,6,14,8,7,10,9,15,1,11,5,0,9,2,4,6,15,8,5,7,14,10,13,3,11,12,1,
0,6,1,8,4,3,15,10,5,9,13,14,2,7,12,11 },

{ 0,1,2,4,6,8,3,5,7,9,10,12,11,14,13,15,0,2,4,3,6,10,5,12,8,7,11,13,14,15,9,1,0,5,2,8,4,1,6,13,3,
7,10,14,12,9,11,15,0,8,9,2,13,4,15,6,14,10,11,12,5,1,7,3,0,10,2,15,4,7,5,11,6,3,1,12,8,13,9,14,
0,7,5,1,4,11,3,6,14,10,2,8,13,15,9,12 }

},

{ //24

{ 0,2,4,5,3,6,8,1,10,7,12,9,13,11,14,15,10,0,2,1,6,4,9,7,11,8,3,12,13,14,5,15,0,8,2,1,4,13,6,10,
7,12,14,5,3,9,11,15,0,15,2,9,4,10,3,8,6,12,7,14,1,11,5,13,0,14,2,6,4,11,3,1,8,12,10,13,9,5,7,15,
0,7,1,3,12,14,6,8,9,5,13,15,10,11,4,2 },

{ 0,2,4,6,8,5,10,12,1,9,13,11,3,14,7,15,0,5,2,7,4,1,6,15,3,9,8,14,10,12,11,13,8,0,6,1,7,2,11,4,1
0,5,3,14,9,13,15,12,0,2,4,8,3,6,10,1,5,9,12,11,7,15,14,13,0,7,2,6,4,8,3,13,1,12,10,14,9,15,11,5,
0,6,1,4,2,15,7,3,5,9,8,13,10,11,12,14 },

{ 0,1,2,4,6,7,8,5,10,9,12,3,11,13,14,15,0,2,4,7,10,6,8,1,3,5,9,14,12,11,13,15,0,8,2,14,3,10,4,13
,6,11,12,5,15,1,9,7,0,15,2,4,6,13,3,14,8,11,9,7,5,12,10,1,0,9,2,6,4,10,5,12,8,3,13,1,11,14,15,7,
0,7,1,2,9,11,8,12,3,4,14,10,6,5,13,15 }

},

{ //25

{ 0,2,4,6,1,3,5,8,9,10,11,12,13,14,15,7,0,6,1,8,2,10,4,13,7,12,3,9,5,14,11,15,0,2,4,9,6,7,3,12,8,
14,10,15,1,5,13,11,0,12,2,6,3,7,13,4,8,14,5,15,9,10,11,1,0,15,2,4,6,10,8,3,1,5,11,12,7,14,9,13,
0,3,2,10,4,5,15,12,1,6,8,9,7,11,14,13 },

{ 0,2,4,6,1,3,5,7,8,10,11,12,9,14,15,13,0,8,2,10,12,4,14,6,1,9,5,3,7,15,13,11,0,7,2,14,3,11,4,13
,6,1,8,15,10,9,12,5,0,3,2,1,4,13,6,9,8,14,11,5,10,12,7,15,0,2,1,11,4,9,6,3,8,10,5,12,14,13,7,15,
0,1,4,3,8,14,5,9,6,7,10,2,13,15,11,12 },

{ 0,1,2,3,4,6,7,8,5,10,11,9,12,13,14,15,0,2,6,4,8,1,10,3,12,11,14,5,15,9,7,13,0,9,2,8,3,7,4,13,5,
11,6,14,10,15,12,1,0,14,2,4,1,6,8,12,7,5,10,3,11,13,9,15,0,4,2,7,1,12,3,8,6,15,10,14,13,11,9,5,
2,6,0,4,10,15,9,7,3,8,14,12,1,5,11,13 }

},

{ //26

{ 0,2,4,6,3,5,8,10,1,12,14,7,9,15,13,11,0,10,2,6,1,3,12,4,14,8,5,7,9,13,11,15,0,3,2,6,4,10,1,5,8, 13,12,7,11,15,9,14,0,8,2,4,6,15,1,12,7,3,10,13,5,9,11,14,0,6,2,11,4,10,3,8,12,1,7,9,14,5,15,13, 0,1,3,9,2,6,5,11,12,13,8,7,4,10,14,15 },

{ 0,2,4,6,3,5,8,10,12,1,9,14,7,13,15,11,0,11,2,1,4,3,6,12,8,5,7,15,10,14,9,13,4,0,5,1,2,9,3,7,12, 6,8,10,14,11,13,15,0,2,1,4,6,8,5,10,7,9,3,15,12,11,14,13,0,4,2,14,6,10,8,12,7,1,11,5,15,3,13,9, 0,6,5,8,7,14,10,2,1,9,13,15,4,11,3,12 },

{ 0,2,4,6,8,9,5,7,3,10,12,14,15,13,11,1,3,0,11,2,7,4,6,5,8,10,15,9,12,14,1,13,0,7,2,9,4,5,12,6,8, 3,10,14,13,15,11,1,0,11,2,1,3,10,4,13,6,9,8,15,5,12,7,14,0,12,2,4,3,6,5,10,1,15,8,7,9,11,14,13, 10,1,3,9,6,2,15,14,12,13,5,11,7,4,8,0 }

},

{ //27

{ 0,2,4,6,1,3,5,7,8,10,12,14,9,13,11,15,8,0,2,10,1,4,12,6,11,3,14,9,5,15,7,13,0,11,2,1,4,15,6,13 ,8,3,10,9,12,7,14,5,0,5,2,15,4,14,6,13,8,3,9,7,10,11,1,12,0,12,2,14,4,9,6,3,8,1,10,13,11,7,5,15, 0,2,5,4,8,6,9,15,3,10,14,12,11,13,1,7 },

{ 0,1,2,4,6,7,3,5,8,9,10,12,14,15,11,13,0,2,4,8,5,10,6,3,12,7,13,15,14,11,1,9,0,13,2,6,3,4,1,12, 8,11,10,5,7,14,15,9,0,4,1,2,3,9,6,12,8,13,15,10,5,7,14,11,0,4,2,6,5,1,3,10,7,13,8,12,9,15,11,14, 1,8,5,3,2,0,10,12,14,11,4,7,13,15,9,6 },

{ 0,2,4,6,1,3,5,8,10,11,12,9,7,14,13,15,6,0,2,1,3,8,13,4,10,11,7,9,12,15,14,5,0,8,2,4,6,15,3,7,1 0,1,12,5,13,11,14,9,0,12,2,6,4,14,5,9,13,3,8,15,10,1,7,11,0,12,2,7,4,3,6,11,1,10,8,15,9,13,14,5, 0,4,1,10,8,9,2,5,7,3,6,13,11,12,15,14 }

},

{ //28

{ 0,2,4,5,6,3,8,1,10,9,12,14,7,11,15,13,0,7,2,1,4,6,3,14,5,9,8,15,10,13,12,11,0,8,2,6,10,3,12,4, 1,7,14,9,5,13,15,11,0,5,2,4,6,7,8,11,10,15,3,14,12,13,9,1,0,14,2,10,4,9,6,5,1,13,8,12,11,7,15,3, 0,1,2,8,6,14,11,15,4,3,9,13,12,5,7,10 },

{ 0,1,2,4,6,7,8,5,10,3,9,12,11,13,14,15,0,2,3,4,6,10,1,8,9,5,7,12,13,14,15,11,0,8,2,1,4,9,3,5,6,1 2,13,10,7,15,14,11,0,14,1,4,2,9,6,7,8,10,12,5,11,13,3,15,0,2,4,13,6,9,1,10,3,11,8,12,5,15,7,14, 0,3,2,1,13,8,6,11,5,12,4,9,7,14,10,15 },

{ 0,1,2,4,6,3,8,10,12,7,9,11,13,5,14,15,2,0,1,8,14,4,6,3,11,5,10,12,13,7,15,9,0,4,2,9,6,8,3,5,7,1 5,10,1,12,14,13,11,0,12,2,7,4,10,1,6,3,5,8,15,9,14,11,13,0,8,2,5,1,12,4,6,7,3,10,14,11,13,9,15, 5,1,0,11,10,4,6,15,8,14,3,12,2,7,9,13 }

},

{ //29

{ 0,1,2,4,6,7,3,5,8,9,10,12,13,11,14,15,0,2,9,4,10,6,8,3,1,12,13,14,11,5,7,15,0,3,2,8,4,11,6,13,
1,7,10,15,12,9,14,5,0,8,2,9,3,1,4,10,6,11,12,7,14,13,15,5,0,13,2,4,6,11,1,3,8,12,10,15,5,7,9,14,
0,1,3,9,7,14,12,15,2,8,6,13,4,11,10,5 },

{ 0,2,4,6,1,8,10,7,12,3,9,11,14,13,15,5,0,3,2,10,4,13,6,5,8,12,7,14,1,9,15,11,0,12,8,2,11,4,10,6
,9,13,3,7,14,1,5,15,0,5,2,15,4,1,6,3,8,10,9,11,12,14,13,7,0,14,2,9,4,7,6,5,3,10,8,12,13,11,1,15,
6,2,1,4,13,14,12,10,7,11,8,15,5,0,9,3 },

{ 0,2,4,6,1,3,5,7,8,10,12,14,11,13,15,9,0,6,1,8,5,2,10,4,12,7,9,14,13,15,3,11,0,2,4,15,3,8,6,5,1,
13,10,9,11,14,7,12,0,5,2,6,4,15,8,7,1,13,10,12,14,9,3,11,0,7,2,15,4,6,1,12,3,14,8,11,10,9,5,13,
0,9,1,2,8,13,3,4,15,11,12,14,5,10,7,6 }

},

{ //30

{ 0,2,1,4,3,6,8,9,10,11,7,5,12,14,13,15,0,4,2,1,6,5,3,12,8,7,10,9,14,11,13,15,0,6,1,2,4,9,10,3,8,
5,12,7,15,11,13,14,0,10,2,6,14,4,8,3,15,1,5,13,12,9,11,7,0,8,1,14,2,10,3,13,4,15,6,9,11,7,5,12,
0,1,10,7,4,5,6,14,3,12,15,8,13,9,2,11 },

{ 0,1,2,4,6,7,3,5,8,9,10,12,13,14,15,11,0,2,4,8,6,5,3,1,9,10,11,15,7,12,14,13,0,6,2,8,1,10,4,13,
5,9,3,12,14,7,15,11,0,4,2,14,6,12,8,15,10,1,5,3,13,7,11,9,0,3,2,15,4,13,6,9,8,7,10,5,14,12,11,1,
2,11,0,1,5,8,13,9,6,7,4,3,12,10,14,15 },

{ 0,2,4,6,8,1,3,5,9,10,12,7,14,13,11,15,0,5,8,2,4,10,12,6,1,9,7,3,15,11,14,13,0,8,2,7,4,9,6,3,10,
1,12,14,15,11,13,5,0,12,2,13,1,14,4,15,6,8,3,5,10,9,7,11,0,3,2,1,4,15,6,5,8,13,7,14,10,12,9,11,
0,3,8,7,14,13,5,11,2,6,1,4,12,15,10,9 }

},

{ //31

{ 0,2,1,4,3,6,8,5,7,10,12,9,14,13,11,15,0,2,1,6,4,12,8,3,10,14,11,7,13,9,5,15,0,2,3,7,4,11,6,14,
8,1,10,9,12,5,13,15,0,14,2,4,5,10,6,9,1,7,3,12,8,11,13,15,10,0,12,2,4,6,8,1,13,5,14,7,3,9,15,11,
0,4,8,9,10,11,6,13,1,12,2,15,3,5,14,7 },

{ 0,2,3,4,6,8,10,12,13,14,9,15,1,7,11,5,0,14,2,4,6,13,8,15,1,7,10,5,12,9,3,11,0,3,2,9,4,11,6,5,1,
12,8,14,10,15,13,7,0,3,7,2,12,4,6,15,1,8,10,13,9,5,11,14,0,9,2,8,4,1,6,10,7,5,11,15,13,3,12,14,
0,6,1,7,4,13,8,12,2,3,5,10,11,14,9,15 },

{ 0,1,2,4,6,7,8,5,9,3,10,12,14,11,15,13,2,0,1,4,6,10,8,3,11,9,12,15,14,7,13,5,0,11,2,6,3,15,4,13
,8,10,12,9,5,1,14,7,0,9,2,4,6,14,8,13,3,10,1,12,7,5,15,11,0,8,1,7,2,9,4,10,6,15,12,5,3,13,14,11,
0,2,8,3,14,9,5,1,6,10,12,15,4,11,13,7 }

},

{ //32

{ 0,1,2,3,4,5,6,8,10,7,11,12,14,15,13,9,2,0,4,1,8,6,3,14,5,10,7,12,13,15,11,9,0,3,2,8,4,11,1,7,6, 13,10,14,9,12,5,15,0,6,2,5,4,12,3,11,1,10,8,15,13,7,14,9,0,6,2,5,4,1,3,13,8,15,9,11,10,12,14,7, 0,6,2,5,13,1,3,10,11,15,9,4,8,7,12,14 },

{ 0,2,4,6,1,8,3,7,10,9,12,5,11,13,14,15,8,0,12,2,4,3,6,5,10,1,13,9,11,14,7,15,0,14,2,5,4,9,6,3,1, 12,8,11,10,15,13,7,0,6,2,9,3,7,4,5,8,12,10,14,13,15,11,1,0,15,2,4,6,3,8,14,10,7,12,11,13,9,1,5, 1,5,13,15,8,11,14,12,0,10,7,3,2,9,4,6 },

{ 0,1,2,4,6,8,10,3,9,7,12,14,11,5,15,13,0,2,10,3,4,11,6,1,8,12,9,14,5,13,7,15,0,11,2,4,6,9,8,13, 7,10,12,5,1,14,15,3,0,12,2,9,4,1,6,5,8,13,10,3,7,15,11,14,0,13,2,9,4,10,6,14,8,7,12,15,3,1,5,11, 0,7,2,3,6,15,13,8,4,1,5,12,9,10,11,14 }

},

{ //33

{ 0,2,4,6,3,8,10,5,9,11,12,14,1,7,15,13,0,7,2,6,1,10,15,4,5,12,8,11,3,13,9,14,0,4,2,11,6,1,8,3,1 0,7,12,9,13,14,15,5,0,7,2,14,4,11,3,13,6,10,8,15,1,9,12,5,0,9,2,1,4,7,6,8,10,3,12,5,13,14,11,15, 12,9,1,5,11,8,3,15,7,6,2,0,10,14,13,4 },

{ 0,2,4,6,3,1,8,10,5,9,12,14,7,11,15,13,0,3,2,5,1,4,14,6,7,8,13,10,9,12,11,15,0,9,2,8,4,3,6,5,10, 1,12,7,13,14,11,15,0,15,1,6,2,12,4,13,7,10,8,11,3,5,9,14,0,2,4,7,6,12,8,10,3,1,5,14,9,13,15,11, 5,12,1,3,6,8,10,13,4,9,0,2,14,15,11,7 },

{ 0,2,3,4,6,8,7,5,1,10,9,12,13,14,11,15,0,9,2,4,6,5,8,12,10,1,3,7,13,14,15,11,0,12,2,9,4,10,6,5, 3,7,1,15,8,14,13,11,7,0,2,6,13,1,8,4,10,3,9,5,14,11,15,12,0,4,2,8,6,10,1,3,5,11,12,7,9,14,13,15, 0,2,1,3,6,10,4,9,5,12,11,13,8,7,14,15 }

},

{ //34

{ 0,2,4,6,1,3,8,9,10,11,5,12,14,15,7,13,8,0,2,9,3,4,6,11,5,10,1,12,14,13,15,7,0,8,12,2,7,4,6,11, 5,1,3,15,13,10,9,14,0,5,2,10,4,8,6,12,3,1,9,14,11,15,7,13,0,12,2,9,4,3,6,7,8,1,5,11,10,14,13,15, 4,6,3,0,5,10,13,15,2,1,8,12,9,11,14,7 },

{ 0,2,4,6,1,3,5,8,10,12,14,7,11,13,15,9,0,3,2,8,10,4,6,13,12,7,9,1,11,14,5,15,0,9,2,8,4,11,6,7,1 0,12,1,3,5,15,13,14,0,7,2,14,4,8,3,9,1,11,6,15,10,12,5,13,0,8,2,6,4,12,10,7,5,13,9,3,11,14,1,15, 5,4,1,2,9,14,8,3,0,10,7,12,13,15,11,6 },

{ 0,2,4,6,1,3,8,7,5,9,10,12,14,13,15,11,3,0,5,2,4,9,10,6,8,12,15,1,13,11,7,14,0,5,1,4,2,6,3,9,8,1 1,10,12,7,15,13,14,0,2,4,6,8,5,9,1,15,10,7,3,11,12,13,14,0,14,2,1,4,3,6,13,8,10,12,5,11,9,15,7, 0,5,3,4,8,14,7,13,1,9,6,12,11,10,2,15 }

```
}
};
```

Referring to Table 9, it is assumed that a total of 35 transform sets are configured, but the disclosure is not limited thereto. For example, as described above with reference to FIG. 12, any one of 35 transform sets may be determined according to the intra prediction mode. The decoder may determine the permutation matrix (or permutation block or permutation layer) of the LGT applied to the secondary transform of the current block based on the index value transmitted from the encoder within the transform set determined according to the intra prediction mode. That is, Table 9 above may include element (or coefficient) information for the permutation matrix of the givens rotation.

In Table 9, the permutation element index table of 4×4 LGT may be expressed as g_nsstLGTPermut4×4[35] [3] [96]. Here, [35] denotes the total number of transform sets, [3] denotes that a maximum of three transforms are included in each transform set, and [96] denotes that the number of elements for a total of six permutation blocks is 96. In planar mode and DC mode, each transform set includes two transforms, so that g_nsstLGTPermut4×4[0] [2] [ . . . ] and g_nsstLGTPermut4×4[1] [2][ . . . ] may not be used In FIG. 41 described above, elements for the kth permutation block (permutation k) correspond to g_nsstLGT-Permut4×4[ . . . ][ . . . ][16*k] to g_nsstLGTPermut4× 4[ . . . ][16*k+15]. The Z array for the permutation k block may consist of such 16 elements. The inverse 4×4 LGT may be performed in the opposite direction to the forward 4×4 LGT. That is, when the inverse 4×4 LGT is applied, the encoder/decoder may perform it in the order from the bottom to top of FIG. 41 described above. In this case, −θ may be applied instead of θ, which is an angle in the forward direction.

The above-described embodiments may be applied individually or in combination.

FIG. 43 is a flowchart illustrating an example of decoding a video signal based on a layered givens transform (LGT) according to an embodiment of the disclosure.

Referring to FIG. 43, a decoder is mainly described for convenience of description, but the method for processing a video signal based on the LGT described in an embodiment of the disclosure may be applied likewise to an encoder.

The decoder generates a transform block by performing entropy decoding and inverse quantization on the current block (S4301).

The decoder performs an inverse secondary transform on a top left specific region of the transform block using the layered givens transform (S4302). As described above, the layered givens transform includes a plurality of rotation layers and permutation matrixes.

The decoder performs an inverse primary transform on the inverse secondary-transformed block (S4303).

The decoder reconstructs the current block using the inverse primary-transformed block (S4304).

As described above, the top left specific region which undergoes the inverse secondary transform may be determined based on the size of the current block, and the inverse secondary transform may be performed using a 4×4 layered givens transform for the determined top left specific region.

As described above, the top left specific region which undergoes the inverse secondary transform may be set to a top left 4×4 region of the transform block.

Further, as described above, the decoder may determine a transform set applied to the inverse secondary transform according to the intra prediction mode of the current block within a plurality of predefined transform sets, and a transform applied to the inverse secondary transform may be determined within the determined transform set.

As described above, the rotation layer may include a plurality of rotation matrixes, and the plurality of predefined transform sets may include angle information for the plurality of rotation matrixes included in the transforms in each transform set.

As described above, the plurality of predefined transform sets may include permutation element information for a plurality of permutation matrixes included in the transforms in each transform set.

FIG. 44 illustrates a device for decoding a video signal based on a layered givens transform (LGT) according to an embodiment of the disclosure.

Referring to FIG. 44, the device for decoding a video signal implements the above-proposed functions, processes, and/or methods. Specifically, the device for decoding a video signal may include an entropy decoding unit 4401, an inverse quantization unit 4402, an inverse transform unit 4403, and a reconstruction unit 4404.

The entropy decoding unit 4401 entropy-decodes the current block, and the inverse quantization unit 4402 performs inverse quantization on the current block, thereby generating a transform block.

The inverse transform unit 4403 performs an inverse secondary transform on a specific top left region of the transform block by using a layered givens transform and performs an inverse primary transform on the block which has undergone the inverse secondary transform. As described above, the layered givens transform includes a plurality of rotation layers and permutation matrixes.

The reconstruction unit 4404 reconstructs the current block by using the block which has undergone the inverse primary transform.

As described above, the top left specific region which undergoes the inverse secondary transform may be determined based on the size of the current block, and the inverse secondary transform may be performed using a 4×4 layered givens transform for the determined top left specific region.

As described above, the top left specific region which undergoes the inverse secondary transform may be set to a top left 4×4 region of the transform block.

Further, as described above, the inverse transform unit 4403 may determine a transform set applied to the inverse secondary transform according to the intra prediction mode of the current block within a plurality of predefined transform sets, and a transform applied to the inverse secondary transform may be determined within the determined transform set.

As described above, the rotation layer may include a plurality of rotation matrixes, and the plurality of predefined transform sets may include angle information for the plurality of rotation matrixes included in the transforms in each transform set.

As described above, the plurality of predefined transform sets may include permutation element information for a plurality of permutation matrixes included in the transforms in each transform set.

FIG. 45 illustrates a video coding system to which the present disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

FIG. 46 is a configuration diagram of a content streaming system as an embodiment to which the present disclosure is applied.

The content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the present disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony video device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for reconstructing a video signal using a layered givens transform by an apparatus, the method comprising:
   generating a transform block by performing entropy decoding and de-quantization on a current block;
   determining a transform set applied to an inverse secondary transform based on an intra prediction mode of the current block in a plurality of predefined transform sets;
   determining the layered givens transform applied to the inverse secondary transform in the transform set;
   performing the inverse secondary transform on a top left specific region of the transform block using the layered givens transform;
   performing an inverse primary transform on the inverse secondary transformed block; and
   reconstructing the current block using the inverse primary transformed block,
   wherein the layered givens transform includes a plurality of rotation layers and permutation matrixes, each rotation layer includes a plurality of rotation matrixes, and the transform set includes angle information for the plurality of rotation matrixes included in the layered givens transform.

2. The method of claim 1, wherein the top left specific region which undergoes the inverse secondary transform is determined based on a size of the current block, and
   wherein the inverse secondary transform is performed using a 4×4 layered givens transform on the determined top left specific region.

3. The method of claim 1, wherein the top left specific region which undergoes the inverse secondary transform is set to a top left 4×4 region of the transform block.

4. The method of claim 1, wherein the transform set includes permutation element information for the permutation matrixes included in the layered givens transform.

5. The method of claim 1, wherein the angle information is represented as indexes indicating quantized angles and rotation angles of the rotation matrixes are derived through a look-up table based on the indexes.

6. The method of claim 1, wherein coefficients in the top left specific region are scanned in an order determined based on the intra prediction mode and arranged as an input to the layered givens transform.

7. A method for encoding a video signal using a layered givens transform by an apparatus, comprising:
   generating a residual block of a current block in an intra prediction mode;
   performing a primary transform on the residual block to generate a primary transformed block;
   determining a transform set applied to a secondary transform based on the intra prediction mode in a plurality of predefined transform sets;
   determining the layered givens transform applied to the secondary transform in the transform set;
   performing the secondary transform on a top left specific region of the primary transformed block using the layered givens transform to generate a secondary transformed block; and
   performing quantization and entropy encoding on the secondary transformed block,
   wherein the layered givens transform includes a plurality of rotation layers and permutation matrixes, each rotation layer includes a plurality of rotation matrixes, and the transform set includes angle information for the plurality of rotation matrixes included in the layered givens transform.

8. The method of claim 7, wherein the top left specific region which undergoes the secondary transform is determined based on a size of the current block, and
   wherein the secondary transform is performed using a 4×4 layered givens transform on the determined top left specific region.

9. The method of claim 7, wherein the top left specific region which undergoes the secondary transform is set to a top left 4×4 region of the primary transformed block.

10. The method of claim 7, wherein the transform set includes permutation element information for the permutation matrixes included in the layered givens transform.

11. The method of claim 7, wherein the angle information is represented as indexes indicating quantized angles and rotation angles of the rotation matrixes are derived through a look-up table based on the indexes.

12. The method of claim 7, wherein coefficients in the top left specific region are scanned in an order determined based on the intra prediction mode and arranged as an input to the layered givens transform.

13. A non-transitory computer-readable storage medium for storing encoded picture information generated by performing the steps of:
  generating a residual block of a current block in an intra prediction mode;
  performing a primary transform on the residual block to generate a primary transformed block;
  determining a transform set applied to a secondary transform based on the intra prediction mode in a plurality of predefined transform sets;
  determining the layered givens transform applied to the secondary transform in the transform set;
  performing the secondary transform on a top left specific region of the primary transformed block using the layered givens transform to generate a secondary transformed block; and
  performing quantization and entropy encoding on the secondary transformed block,
  wherein the layered givens transform includes a plurality of rotation layers and permutation matrixes, each rotation layer includes a plurality of rotation matrixes, and the transform set includes angle information for the plurality of rotation matrixes included in the layered givens transform.

* * * * *